(12) United States Patent
Kawakami et al.

(10) Patent No.: US 9,913,107 B2
(45) Date of Patent: Mar. 6, 2018

(54) COMMUNICATION DEVICE, COMMUNICATION CONTROL METHOD, AND PROGRAM

(71) Applicant: Sony Corporation, Tokyo (JP)

(72) Inventors: Daisuke Kawakami, Kanagawa (JP); Hideyuki Suzuki, Tokyo (JP); Katsutoshi Itoh, Tokyo (JP); Katsuhito Ishida, Kanagawa (JP); Junya Ohde, Ibaraki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/218,384

(22) Filed: Jul. 25, 2016

(65) Prior Publication Data

US 2016/0337821 A1 Nov. 17, 2016

Related U.S. Application Data

(63) Continuation of application No. 14/390,235, filed as application No. PCT/JP2013/057914 on Mar. 19, 2013, now Pat. No. 9,451,648.

(30) Foreign Application Priority Data

Apr. 10, 2012 (JP) ................................. 2012-089762
Jun. 1, 2012 (JP) ................................. 2012-125917
(Continued)

(51) Int. Cl.
*H04W 4/08* (2009.01)
*H04W 8/00* (2009.01)
(Continued)

(52) U.S. Cl.
CPC ............ *H04W 4/08* (2013.01); *G06F 21/445* (2013.01); *G06F 21/74* (2013.01); *G06F 21/85* (2013.01);
(Continued)

(58) Field of Classification Search
CPC .. H04B 5/0031; H04B 7/2121; H04B 7/2123; H04W 12/06; H04W 4/008; H04W 4/08;
(Continued)

(56) References Cited

U.S. PATENT DOCUMENTS 8,112,036 B2 2/2012 Matsuo et al.
8,224,246 B2 * 7/2012 Suumaki ............ G06K 7/10237
455/41.1

(Continued)

FOREIGN PATENT DOCUMENTS

EP 2169905 A1 3/2010
JP 2005354136 A 12/2005
(Continued)

OTHER PUBLICATIONS

Japanese Office Action for Application No. 2014-510098 dated Sep. 20, 2016.
(Continued)

*Primary Examiner* — Robert Lopata
(74) *Attorney, Agent, or Firm* — Lerner, David, Littenberg, Krumholz & Mentlik, LLP

(57) ABSTRACT

There is provided a communication device including an obtaining unit configured to obtain first state information representing a state of a first wireless communication device regarding a direct connection between devices via wireless communication and second state information representing a state of a second wireless communication device regarding the direct connection, and a control unit configured to establish a connection between the first wireless communication device and the second wireless communication device via the wireless communication on the basis of the first state information and the second state information. At least one of the first state information and the second state information is obtained via near-field communication.

19 Claims, 48 Drawing Sheets

(30) Foreign Application Priority Data

Jun. 11, 2012 (JP) ................................ 2012-131853
Jul. 17, 2012 (JP) ................................ 2012-159092

(51) Int. Cl.

| | | |
|---|---|---|
| H04W 76/02 | (2009.01) | |
| H04B 5/00 | (2006.01) | |
| H04W 4/00 | (2018.01) | |
| G06F 21/44 | (2013.01) | |
| G06F 21/74 | (2013.01) | |
| G06F 21/85 | (2013.01) | |
| H04W 12/06 | (2009.01) | |
| H04W 84/12 | (2009.01) | |
| H04W 88/06 | (2009.01) | |
| H04L 29/06 | (2006.01) | |

(52) U.S. Cl.
CPC ......... *H04B 5/0025* (2013.01); *H04B 5/0031* (2013.01); *H04L 63/18* (2013.01); *H04W 4/008* (2013.01); *H04W 8/005* (2013.01); *H04W 12/06* (2013.01); *H04W 76/023* (2013.01); *G06F 2221/2103* (2013.01); *H04L 69/24* (2013.01); *H04W 84/12* (2013.01); *H04W 88/06* (2013.01)

(58) Field of Classification Search
CPC ... H04W 76/023; H04W 84/12; H04W 88/06; H04W 72/04; H04W 72/12; H04W 76/00; H04J 2203/0069; H04Q 2213/394
USPC ........................................................ 370/329
See application file for complete search history.

(56) References Cited

U.S. PATENT DOCUMENTS

| | | | |
|---|---|---|---|
| 8,260,205 B2 | 9/2012 | Matsuo et al. | |
| 8,301,124 B2 | 10/2012 | Soma et al. | |
| 8,433,246 B2 | 4/2013 | Matsuo et al. | |
| 8,761,118 B2 | 6/2014 | Aibara et al. | |
| 9,319,106 B2 | 4/2016 | Itoh | |
| 2007/0001853 A1* | 1/2007 | Otranen | G06K 7/0008 340/572.1 |
| 2008/0121687 A1 | 5/2008 | Buhot | |
| 2008/0162312 A1 | 7/2008 | Sklovsky et al. | |
| 2009/0203315 A1 | 8/2009 | Kawabata et al. | |
| 2009/0221271 A1 | 9/2009 | Soma | |
| 2010/0075605 A1 | 3/2010 | Yoneda et al. | |
| 2010/0167650 A1 | 7/2010 | Ueda et al. | |
| 2010/0325459 A1 | 12/2010 | Kangude et al. | |
| 2011/0188391 A1 | 8/2011 | Sella et al. | |
| 2011/0225305 A1 | 9/2011 | Vedantham et al. | |
| 2011/0275316 A1* | 11/2011 | Suumaki | G06K 7/10237 455/41.1 |
| 2011/0294474 A1 | 12/2011 | Barany et al. | |
| 2011/0320612 A1 | 12/2011 | Oka et al. | |
| 2012/0077433 A1* | 3/2012 | Walker | H04M 1/7253 455/41.1 |
| 2012/0134349 A1 | 5/2012 | Jung et al. | |
| 2012/0233266 A1 | 9/2012 | Hassan et al. | |
| 2012/0265913 A1* | 10/2012 | Suumaki | H04W 4/008 710/303 |
| 2012/0309309 A1* | 12/2012 | Cho | H04W 76/023 455/41.1 |
| 2012/0329388 A1 | 12/2012 | Royston et al. | |
| 2013/0036231 A1 | 2/2013 | Suumaki | |
| 2013/0100855 A1 | 4/2013 | Jung et al. | |
| 2013/0137373 A1 | 5/2013 | Choi et al. | |
| 2013/0157566 A1* | 6/2013 | Oguchi | H04W 4/008 455/41.1 |
| 2013/0170482 A1 | 7/2013 | Jung | |
| 2013/0194962 A1 | 8/2013 | Abraham et al. | |
| 2013/0225083 A1 | 8/2013 | Matsuo et al. | |
| 2013/0229690 A1 | 9/2013 | Sumita et al. | |
| 2013/0322296 A1* | 12/2013 | Arunan | H04L 61/20 370/254 |
| 2014/0004846 A1* | 1/2014 | Dua | G06F 17/30058 455/422.1 |
| 2014/0079043 A1 | 3/2014 | Montemurro et al. | |
| 2014/0087660 A1 | 3/2014 | Kim et al. | |
| 2014/0087662 A1 | 3/2014 | Itoh | |
| 2014/0087705 A1* | 3/2014 | Wooster | H04B 5/0031 455/416 |
| 2014/0091987 A1 | 4/2014 | Lee et al. | |
| 2014/0126461 A1 | 5/2014 | Ghosh et al. | |
| 2014/0148098 A1* | 5/2014 | Song | H04W 76/023 455/41.1 |
| 2014/0206285 A1 | 7/2014 | Jance et al. | |
| 2014/0320925 A1 | 10/2014 | Shibata | |
| 2015/0066158 A1 | 3/2015 | Kim et al. | |
| 2015/0223046 A1 | 8/2015 | Patil et al. | |
| 2015/0327172 A1* | 11/2015 | Kusakabe | H04W 52/0229 370/331 |

FOREIGN PATENT DOCUMENTS

| | | |
|---|---|---|
| JP | 2006309458 A | 11/2006 |
| JP | 2006310996 A | 11/2006 |
| JP | 2008-271150 A | 11/2008 |
| JP | 2009-207069 A | 9/2009 |
| JP | 2010050905 A | 3/2010 |
| JP | 2010-079423 A | 4/2010 |
| JP | 2010-245748 A | 10/2010 |
| JP | 2010287964 A | 12/2010 |
| JP | 2011-087249 A | 4/2011 |
| JP | 2011114377 A | 6/2011 |
| JP | 2011135166 A | 7/2011 |

OTHER PUBLICATIONS

International Search Report from International Publication PCT/JP2013/057914 dated Jun. 11, 2013.
Extended European Search Report for EP Application No. 13774992.5, dated Nov. 4, 2015.
Japanese Office Action for Application No. 2014-510098 dated May 10, 2016.
Japanese Office Action for Application No. 2017-017441 dated Dec. 26, 2017, 3 pages.

* cited by examiner

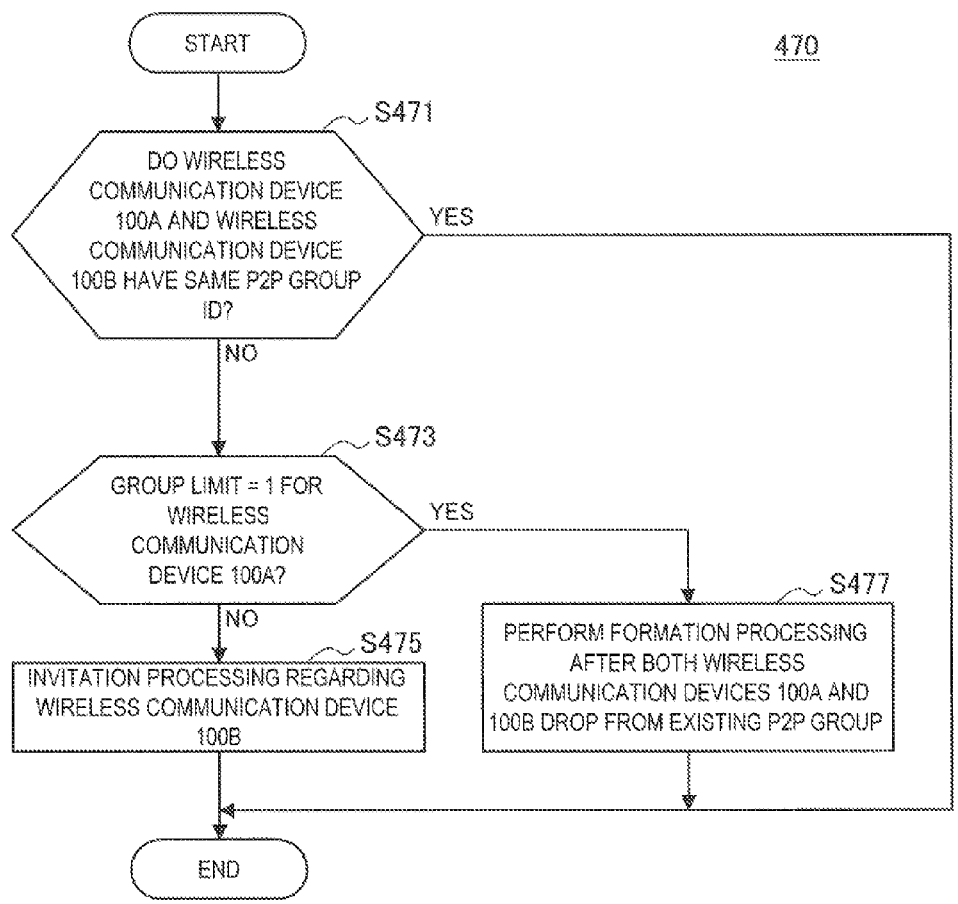

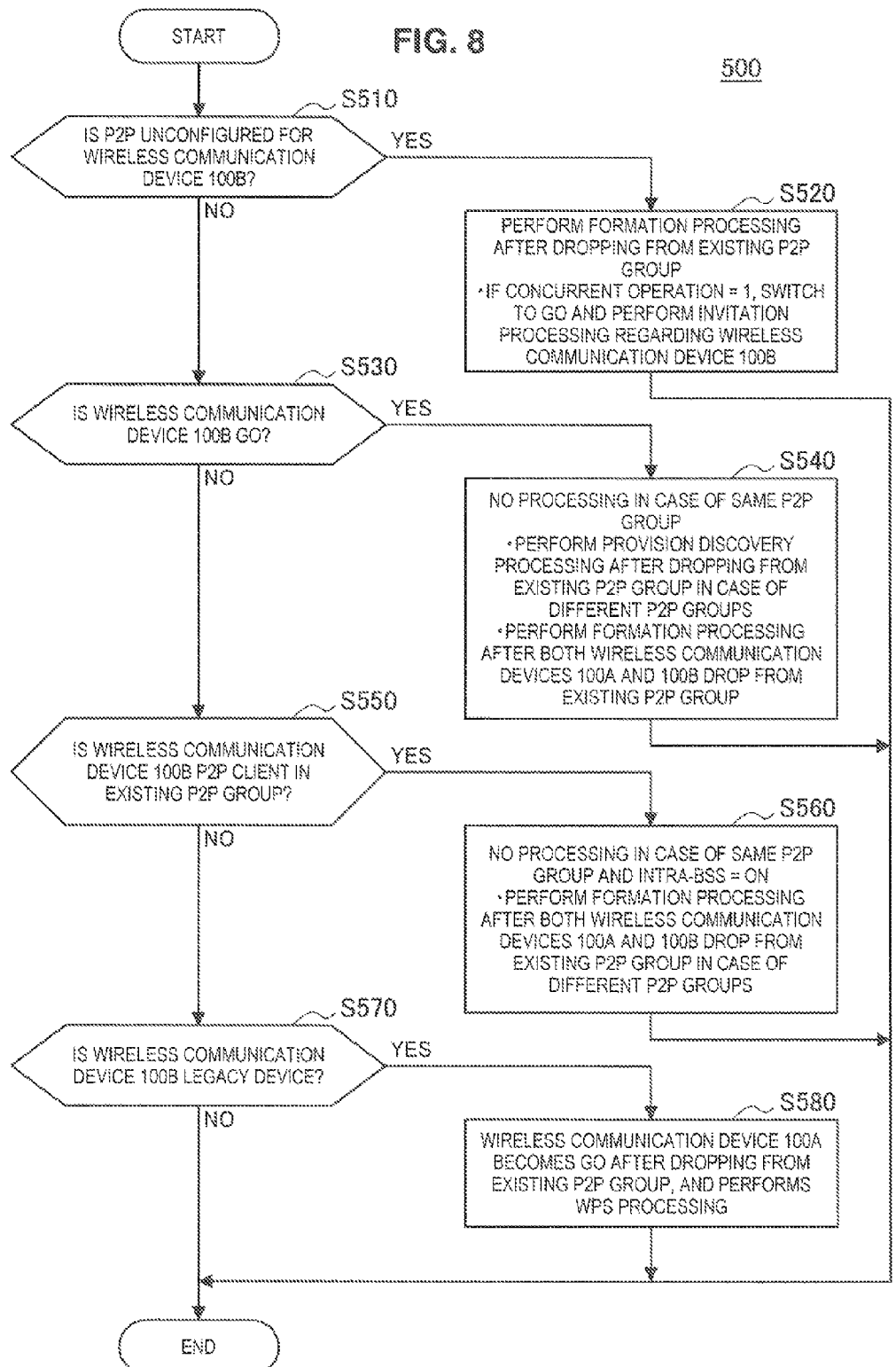

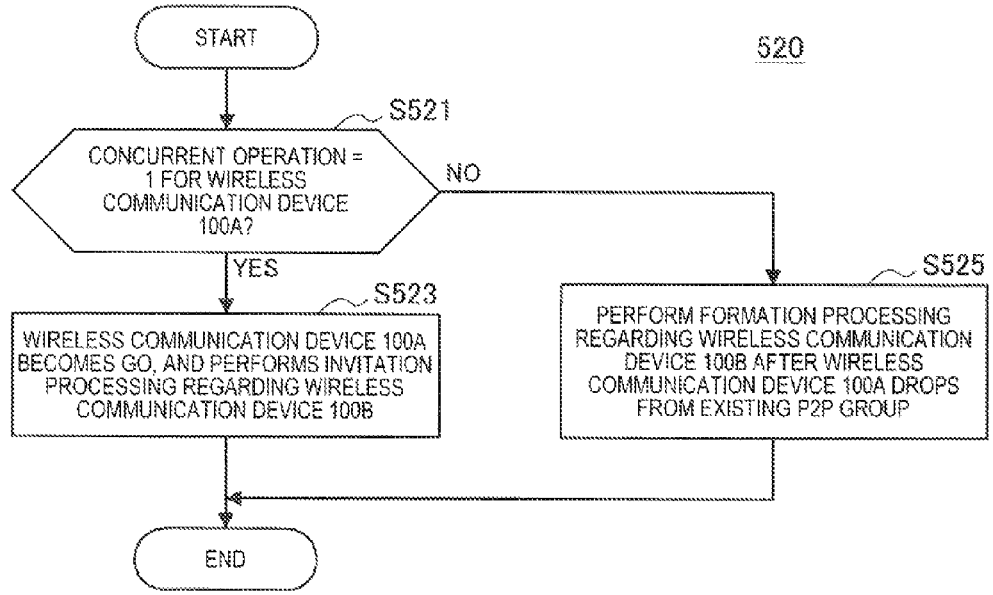
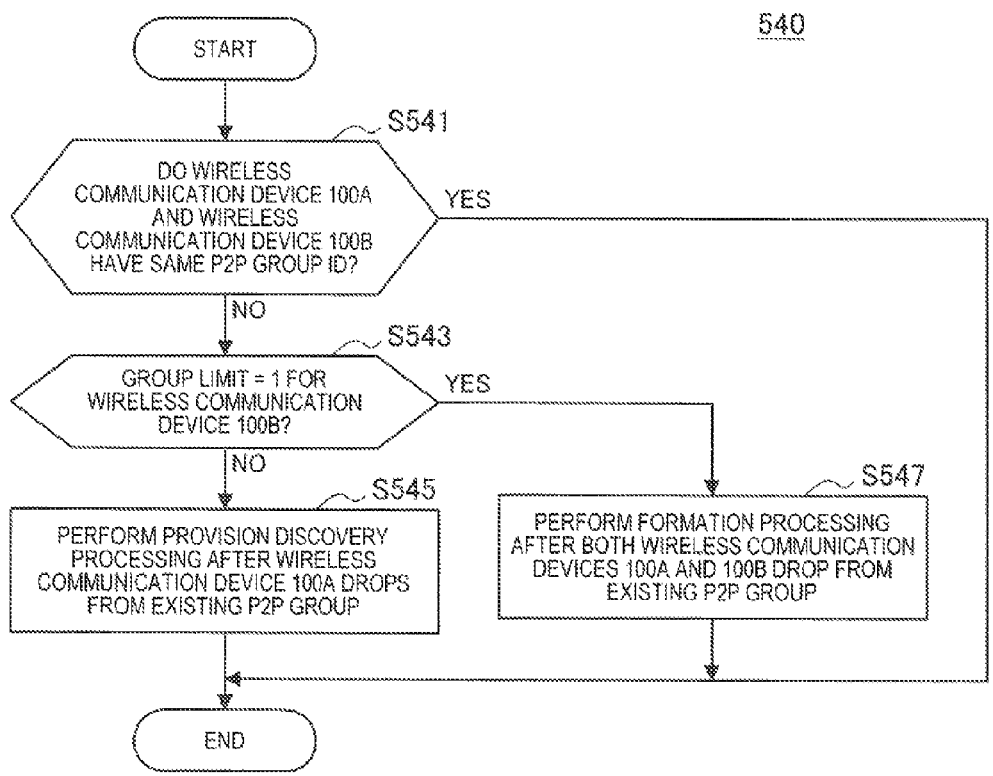

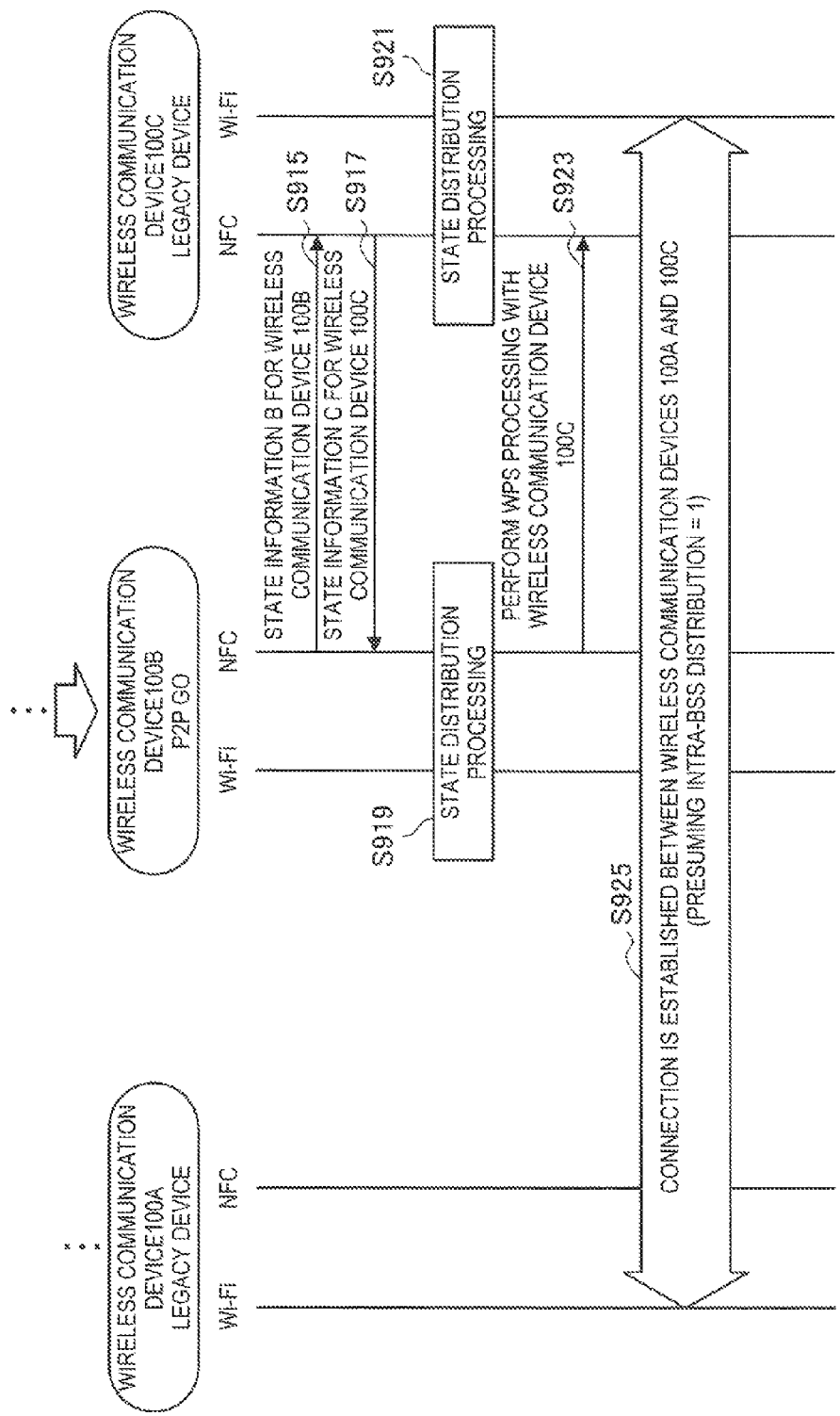

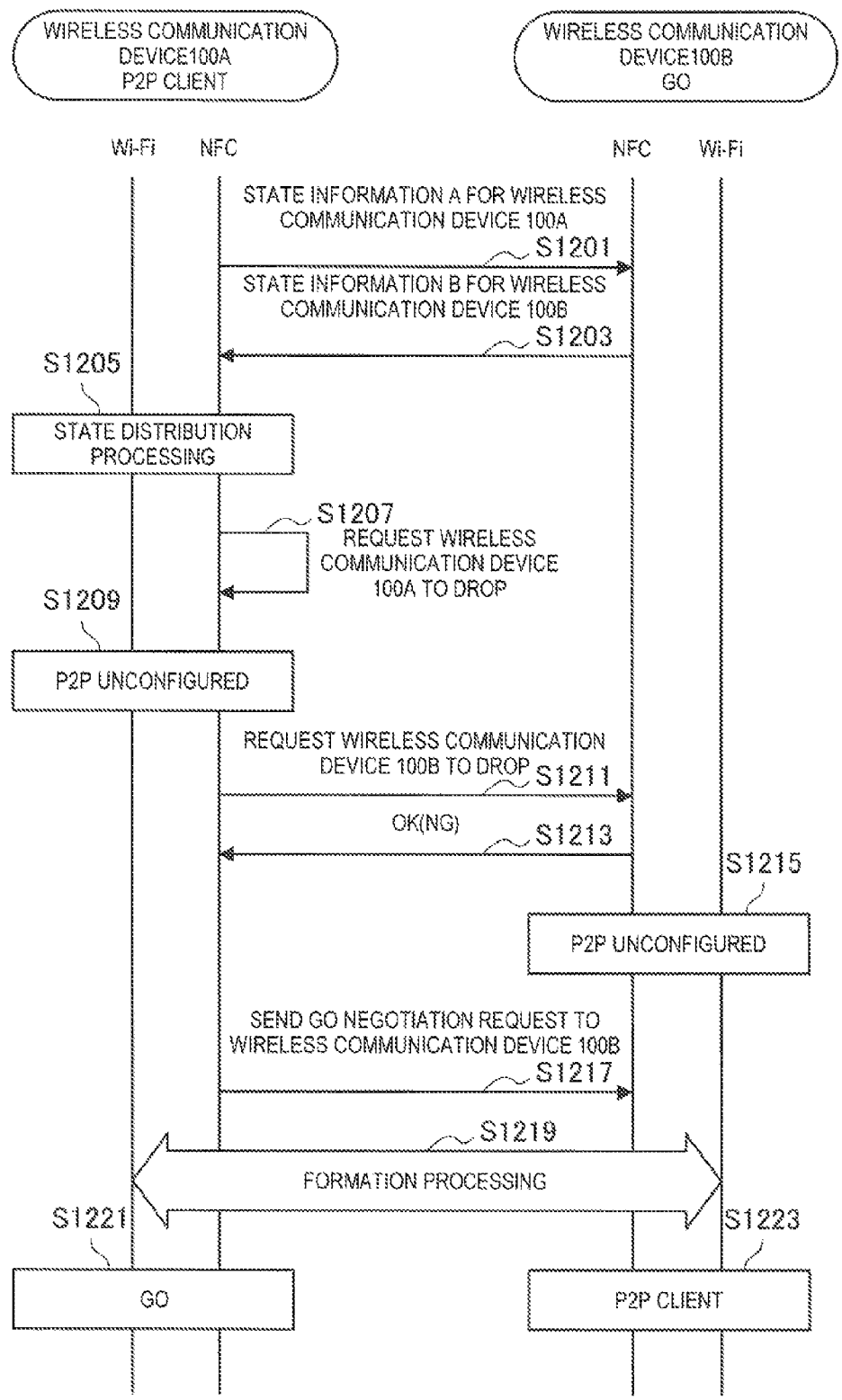

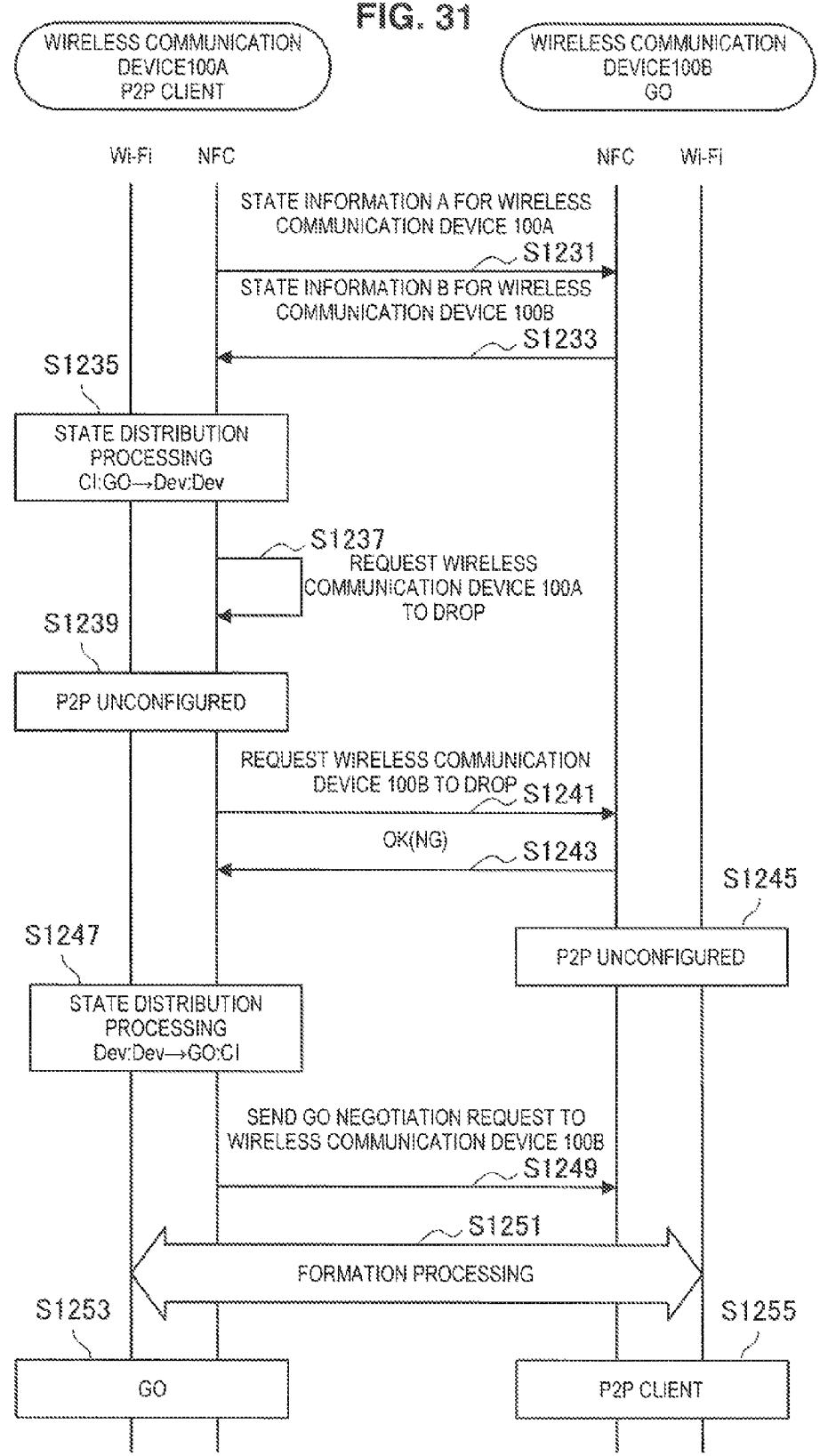

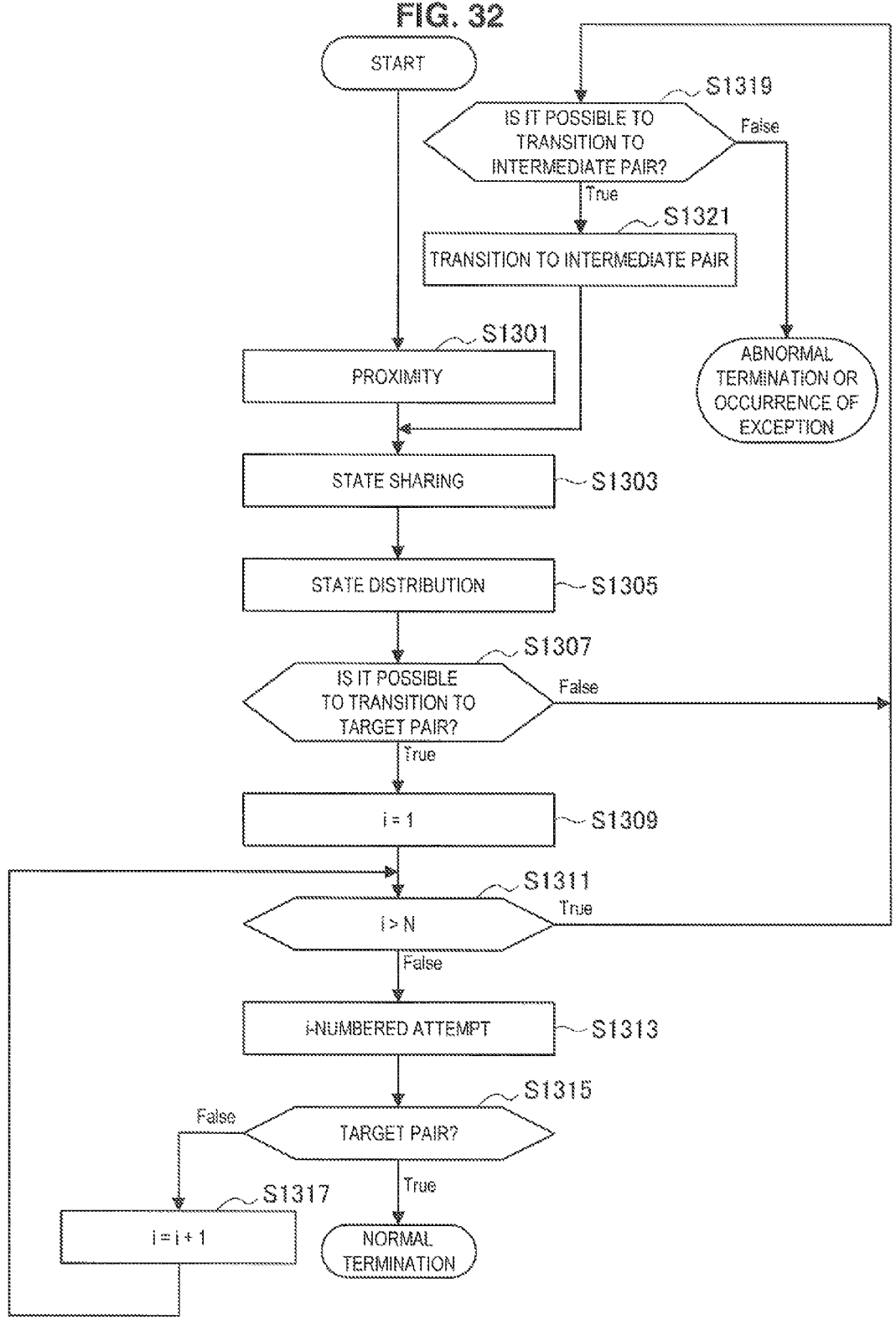

COMMUNICATION DEVICE, COMMUNICATION CONTROL METHOD, AND PROGRAM

CROSS-REFERENCE TO RELATED APPLICATIONS

The present application is a continuation of U.S. patent application Ser. No. 14/390,235, filed on Oct. 2, 2014, which application is a national phase entry under 35 U.S.C. § 371 of International Application No. PCT/JP2013/057914 filed Mar. 19, 2013, which claims priority from JP 2012-159092 filed Jul. 17, 2012; JP 2012-131853 filed Jun. 11, 2012; JP 2012-125917 filed Jun. 1, 2012; and JP 2012-089762 filed Apr. 10, 2012, all of which are incorporated herein by reference.

TECHNICAL FIELD

The present disclosure relates to a communication device, communication control method, and program.

BACKGROUND ART

Wireless local area network (LAN) systems typified by Institute of Electrical and Electronics Engineers (IEEE) 802.11 standards have recently been replacing wired networks due to advantages such as a high level of flexibility with devices. These wireless LAN systems operate, for example, in infrastructure mode in which multiple wireless communication devices communicate through access points.

Conversely, Wi-Fi Direct, which was developed by the Wi-Fi Alliance, supports a direct communication mode in which multiple wireless communication devices connect directly and groups are formed. According to this direct communication mode, communication starts after a connection is established between wireless communication devices by device discovery and formation. Device discovery is processing to discover surrounding wireless communication devices, and formation includes processing to determine which wireless communication device becomes the group owner, authentication processing (provisioning), and similar.

There are also wireless communication devices capable of performing communication by switching between the aforementioned infrastructure mode and direct communication mode. In addition, communication within a proximity closer than that of wireless communication such as with wireless LAN is widely used. For example, Patent Literature 1 discloses a communication device equipped with both a near-field communication unit for performing near-field communication and a wireless communication unit for performing wireless communication.

CITATION LIST

Patent Literature

Patent Literature 1: JP 2008-271150A

SUMMARY OF INVENTION

Technical Problem

However, regarding Wi-Fi Direct, there are cases in which processing such as formation and invitation succeed to establish connection between two wireless communication devices, and there are cases in which the same processing fails to result in establishing a connection, for example, such as in the case when P2P is unconfigured (P2P Dev) on these devices. When both devices are the group owner, or when one device is a Peer-to-Peer (P2P) client and the other device is a legacy device, for example, there are cases in which a connection cannot be established between the two devices by processing such as formation and invitation.

Thus, when a connection cannot be established between wireless communication devices by a predetermined processing for establishing connections, it is preferable to provide a mechanism which may still establish a connection between the wireless communication devices.

Solution to Problem

According to the present disclosure, there is provided a communication device including an obtaining unit configured to obtain first state information representing a state of a first wireless communication device regarding a direct connection between devices via wireless communication and second state information representing a state of a second wireless communication device regarding the direct connection, and a control unit configured to establish a connection between the first wireless communication device and the second wireless communication device via the wireless communication on the basis of the first state information and the second state information. At least one of the first state information and the second state information is obtained via near-field communication.

According to the present disclosure, there is provided a communication control method including receiving first state information via near-filed communication, the first state information representing a state of a first wireless communication device regarding a direct connection to another device via wireless communication, and establishing a connection between the first wireless communication device and the second wireless communication device via the wireless communication on the basis of the received first state information and second state information representing a state of a second wireless communication device regarding the direct connection.

According to the present disclosure, there is provided a program for causing a computer to function as an obtaining unit configured to obtain first state information representing a state of a first wireless communication device regarding a direct connection between devices via wireless communication and second state information representing a state of a second wireless communication device regarding the direct connection, and a control unit configured to establish a connection between the first wireless communication device and the second wireless communication device via the wireless communication on the basis of the first state information and the second state information. At least one of the first state information and the second state information is obtained via near-field communication.

Advantageous Effects of Invention

According to the present disclosure and as previously described, a connection between the wireless communication devices may still be established when a connection cannot be established between wireless communication devices by a predetermined processing for establishing direct connections.

BRIEF DESCRIPTION OF DRAWINGS

FIG. 7 is a flowchart illustrating an example of an overall flow of a processing when the other wireless communication device is a P2P client.

FIG. 8 is a flowchart illustrating an example of an overall flow of a processing when the device is a P2P client.

FIG. 9 is a flowchart illustrating an example of an overall flow of a processing when P2P is unconfigured for the other wireless communication device.

FIG. 10 is a flowchart illustrating an example of an overall flow of a processing when the other wireless communication device is a group owner.

FIG. 22B is a second sequence diagram schematically illustrating a third example of an operation of a wireless communication system according to a modification in which a connection is established between two wireless communication devices by an intermediary third wireless communication device.

FIG. 30 is a sequence diagram illustrating a first specific example of a processing for changing the states of two wireless communication devices to a target pair.

FIG. 31 is a sequence diagram illustrating a second specific example of a processing for changing the states of two wireless communication devices to a target pair.

FIG. 32 is a second flowchart illustrating an example flow of a more generic processing for changing the states of two wireless communication devices to a target pair.

FIG. 33A is a first portion of a state transition chart illustrating each state transition and processing for changing the states of two wireless communication devices to a target pair.

FIG. 33B is a second portion of a state transition chart illustrating each state transition and processing for changing the states of two wireless communication devices to a target pair.

FIG. 33C is a third portion of a state transition chart illustrating each state transition and processing for changing the states of two wireless communication devices to a target pair.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The following literature will be referenced as needed for the embodiments.

Reference Literature 1

Wi-Fi P2P Technical Specification v1.1 (Wi-Fi Direct)

Reference Literature 2

Wi-Fi Simple Configuration Technical Specification v2.0.1 (WPS)

Reference Literature 3

NFC Forum Technical Specification Connection Handover 1.2

The description will follow in the order below.
1. Configuration of Wireless Communication System
2. Configuration of Wireless Communication Device
3. Operation of Wireless Communication System
4. Operation of Wireless Communication Device
   4.1 Flow of Overall Processing
   4.2 Flow of Processing When Device is Group Owner
   4.3 Flow of Processing When Device is P2P Client in Existing P2P Group
   4.4 Flow of Processing When Device is Legacy Station
   4.5 Processing When P2P is Unconfigured
5. Other Individual Operations
6. Modifications
   6.1 Establishing Direct Connection through Intermediary
   6.2 Establishing Direct Connection through One-Way Reading via NFC
7. State Transitions of Wireless Communication Device
   7.1 Overview of State Transitions
   7.2 Flow of Processing with Focus on State Transitions
   7.3 Flow of More Generic Processing
   7.4 Efficient Transitions to Given Target Pair
8. Processing for Starting Services
   8.1 DLNA Service
   8.2 Mirroring Service
9. Hardware Configuration <<1. Configuration of Wireless Communication System>>

Figure 1:
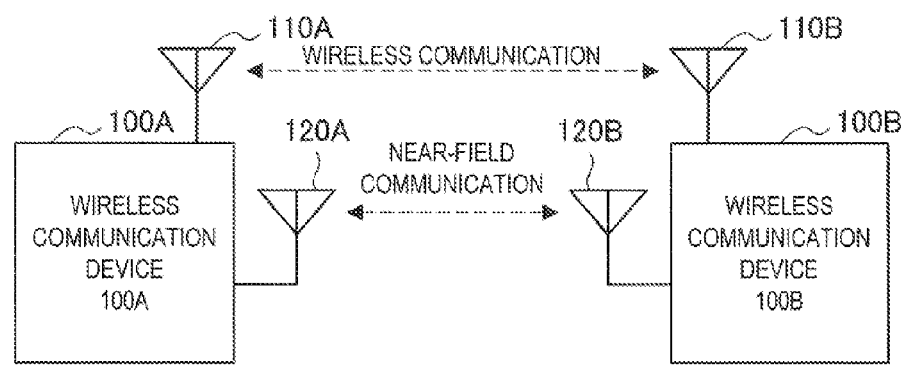
FIG. 1 is an explanatory diagram illustrating an example of an overall configuration of a wireless communication system according to an embodiment.

First, an overall configuration of a wireless communication system according to an embodiment of the present disclosure will be described with reference to FIG. 1. FIG. 1 is an explanatory diagram illustrating an example of an overall configuration of a wireless communication system according to an embodiment. Referring to FIG. 1, a communication system according to the present embodiment includes multiple wireless communication devices.

A wireless communication device 100 has a wireless communication function via wireless LAN, and performs wireless communication with surrounding wireless communication devices 100 using a wireless antenna 110. For example, the wireless communication device 100 also operates in either an infrastructure mode or a direct communication mode. The wireless communication device 100 communicates with other wireless devices through an access point when operating in the infrastructure mode. Conversely, the wireless communication device 100 performs direct communication with surrounding wireless communication devices 100 without an access point when operating in the direct communication mode.

In addition, the direct communication mode may be Wi-Fi Direct, which is standardized by the Wi-Fi Alliance. According to this direct communication mode, communication starts after a connection between wireless communication devices is established by device discovery processing, formation processing, or similar, for example. In addition, the device discovery processing discovers surrounding wireless communication devices. According to this device discovery processing, a beacon, probe request, and probe response are communicated to scan, wait for a response, and search. Conversely, the formation processing establishes a direct connection between devices via wireless communication and forms groups of wireless communication devices. This formation processing includes processing to determine which wireless communication device will be the group owner, authentication processing (provisioning), and other processing. According to the direct communication mode, after a connection is established between wireless communication devices and a group is formed, other wireless communication devices are added to the group by the invitation processing. The invitation processing adds surrounding wireless communication devices to groups. According to the invitation processing, setting information is exchanged between the wireless communication devices. In addition, after a connection is established between the wireless communication devices and the group is formed, other wireless communication devices are added to the group by provision discovery processing. The provision discovery processing adds devices to the formed group.

According to the direct communication mode, the wireless communication device 100 is in one of several states including the group owner (GO), a P2P client, or a P2P unconfigured state (P2P Device), for example. The wireless communication device 100 which is the group owner establishes a direct connection with each wireless communication device (P2P clients) in the wireless communication device group formed by direct connection via wireless communication. In addition, the wireless communication device 100 which is the group owner, for example, performs beacon transmission, authentication of wireless communication devices added to the group, provisioning of connection setting information (credentials) to the wireless communication devices added to the group, and so on. That is to say, the wireless communication device 100 which is the group owner serves as an access point for the group. In addition, the wireless communication device 100 which is a P2P client establishes a direct connection with the wireless communication device which is the group owner regarding the group of wireless communication devices formed by direct connection between devices via wireless communication, for example. That is to say, the wireless communication device 100 which is a P2P client communicates with the wireless communication device which is the group owner or communicates with the wireless communication devices which are other P2P clients through the wireless communication device which is the group owner. In addition, the wireless communication device 100 for which P2P is unconfigured does not establish a direct connection between other devices via wireless communication.

Further, the group owner state includes a persistent GO and a temporary GO. The persistent GO is a group owner that stores connection setting information of connecting wireless communication devices after the P2P connection session ends so that reconnection is possible in response to an Invitation Request and provision discovery request from the wireless communication device. Conversely, the temporary GO is a group owner which stores connection setting information only during the P2P session and discards the connection setting information after the P2P connection session ends.

In addition, the wireless communication device 100 has a near-field communication (NFC) communication function and performs NFC communication (near-field communication) with surrounding wireless communication devices using an NFC antenna 120.

Regarding the wireless communication device 100, the NFC communication function is in a state, for example, in which communication may be started when the wireless communication devices 100 are in proximity to each other. In addition, the wireless communication function may be on or off.

Further, the wireless communication device 100 may operate only in the infrastructure mode, for example, or may not be operable in the direct communication mode. That is to say, the wireless communication device 100 may be a legacy device that does not have a function of a direct connection with other devices via wireless communication.

In addition, the wireless communication device 100 may be an information processing device such as a personal computer (PC), a home gaming machine, a home appliance, a cellular phone, a personal handy-phone system (PHS), a portable music playback device, or a portable video processing device.

In addition, the wireless communication device 100 may communicate audio data such as music, lectures, radio programs, video data such as movies, video programs, photographs, documents, paintings, diagrams, and content data such as games and software.

<<2. Configuration of Wireless Communication Device>>

Figure 2:
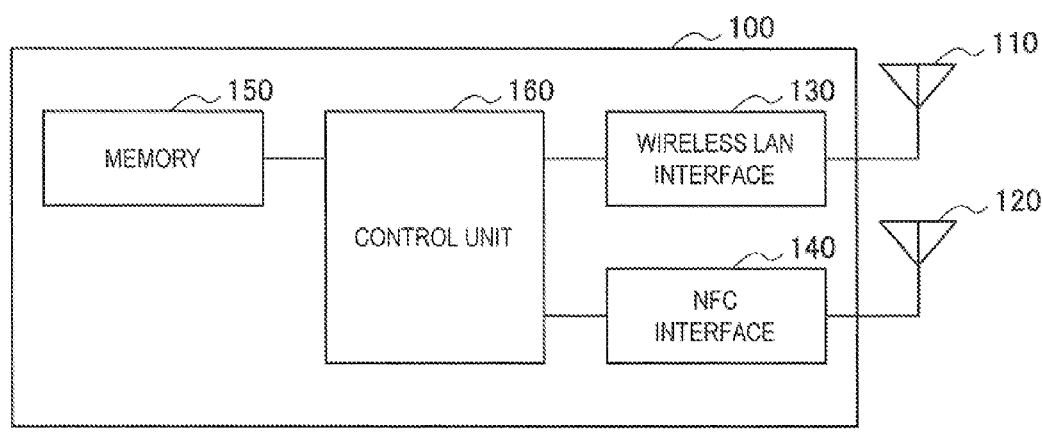
FIG. 2 is a block diagram illustrating an example configuration of a wireless communication device according to an embodiment.

An example of wireless communication device 100 according to the present embodiment will be described with reference to FIG. 2. FIG. 2 is a block diagram illustrating an example configuration of the wireless communication device 100 according to an embodiment. Referring to FIG. 2, the wireless communication device 100 is provisioned with the wireless antenna 110, the NFC antenna 120, a wireless LAN interface 130, an NFC interface 140, a memory 150, and a control unit 160.

(Wireless LAN Interface 130)

In accordance with control by the control unit 160, the wireless LAN interface 130 performs processing for establishing connection with surrounding wireless communication devices 100 and performs direct communication with surrounding wireless communication devices 100 in conjunction with the wireless antenna 110. For example, the wireless LAN interface 130 conducts receive processing on the wireless signal received by the wireless antenna 110 such as down-conversion, demodulation, and decoding, and then supplies the receive data obtained from this receive processing to the control unit 160. In addition, the wireless LAN interface 130 conducts transmission processing on transmission data supplied from the control unit 160 such as encoding, modulation, and up-conversion, and then outputs a high frequency signal obtained from this transmission processing to the wireless antenna.

(NFC Interface 140)

In accordance with control by the control unit 160, the NFC interface 140 performs NFC communication with surrounding wireless communication devices 100 in conjunction with the NFC antenna 120. For example, the NFC interface 140 may communicate with other wireless communication devices 100 by transmitting radio waves that reach short distances of approximately 10 cm from the NFC antenna 120, which causes a response in the NFC antenna 120 of other wireless communication devices 100 included in this reachable radio wave range.

(Memory 150)

The memory 150 stores programs for operating the wireless communication device 100, information for connecting to other wireless communication devices 100, and other information. For example, the memory 150 stores wireless LAN communication settings, and settings information exchanged by NFC.

(Control Unit 160)

The control unit 160 controls the overall operation of the wireless communication device 100. For example, the control unit 160 switches the communication mode (infrastructure mode and direct communication mode) of the wireless LAN interface 130, and performs control of the wireless LAN power supply. In addition, the control unit 160 controls processing such as device discovery processing by the wireless LAN interface 130, formation processing, invitation processing, and provision discovery processing.

The control unit 160 also obtains a state information A representing the state of a wireless communication device 100A regarding a direct connection between devices via wireless communication, and a state information B representing the state of a wireless communication device 100B regarding this direct connection. The control unit 160 also establishes connections between the wireless communication device 100A and the wireless communication device 100B via wireless communication on the basis of the state information A and state information B. The wireless communication is, for example, wireless local area network (LAN) communication, and the direct connection conforms to the Wi-Fi Direct standard. In addition, either one or both of the state information A and the state information B is obtained through near-field communication. For example, the portion of the state information A and the state information B regarding the actual device is obtained from the memory 150, and the portion of the state information A and the state information B regarding the state information of other devices is obtained from the NFC interface 140 which received this information.

Either the wireless communication device 100A or the wireless communication device 100B is, for example, the wireless communication device 100. Thus, when the wireless communication device 100A is the wireless communication device 100, the state information B is obtained through near-field communication, and when the wireless communication device 100B is the wireless communication system 100, the state information A is obtained through near-field communication.

More specifically, the wireless communication device 100A has, for example, a function of a direct connection, and the control unit 160 changes the state of the wireless communication device 100A. In this way, a processing to determine the manner in which states are changed is performed before changing the state of the wireless communication device 100, and this processing is hereafter referred to as a state distribution processing. The possible states include a first state in which a direct connection is established with other wireless communication devices in the wireless communication device group (hereafter, P2P group) formed by the direct connection (which is to say, the group owner state), a second state in which a direct connection is established with the wireless communication device in the first state in the P2P group (which is to say, the P2P client state), or a third state in which the direct connection is not established (which is to say, the P2P unconfigured state). In addition, the control unit 160 changes the state of the wireless communication device 100A from one of the possible states including the group owner state, the P2P client state, or the P2P unconfigured state to one of the possible states including the group owner state, the P2P client state, or the P2P unconfigured state. According to such state transitions, connection may be established between devices having a function to connect directly. Further, when the state is either the group owner state or the P2P client state, the state information includes information on the group to which the wireless communication device 100 belongs (for example, a group ID).

When the state of the wireless communication device 100A is either the group owner state or the P2P client state, and the wireless communication device 100A and the wireless communication device 100B cannot communicate in the P2P group, for example, the control unit 160 changes the state of the wireless communication device 100A from either the group owner state or the P2P client state to the P2P unconfigured state. In cases when a direct connection between both devices cannot be established by formation processing, invitation processing, provision discovery processing, or other processing, after such a state change is made, it will then be possible to establish a direct connection by formation processing, invitation processing, provision discovery processing, or other processing. Further, the changing of the wireless communication device from either the group owner or the P2P client to P2P unconfigured is hereafter referred to as dropping the wireless communication device.

Further, the state of the wireless communication device 100A may be the group owner state for some P2P group, and also be the P2P client state for some other P2P group. That is to say, the wireless communication device 100A is capable of concurrent operation (according to the present specification, for example, the capability to perform concurrent operation is described as "concurrent operation=1"). Taking this into consideration, when the state of the wireless communication device 100A is the group owner state for a first P2P group, the control unit 160 changes the state of the wireless communication device 100A, for example, so that the state of the wireless communication device 100A is the group owner state for the first P2P group and the P2P client state for a second P2P group. According to such a state change, the wireless communication device 100A continues to be the group owner for the existing P2P group, and the wireless communication device 100A and the wireless communication device 100B are capable of establishing a connection. In addition, when the state of the wireless communication device 100A is the P2P client state for the first P2P group, the control unit 160 changes the state of the wireless communication device 100A, so that the state of the wireless communication device 100A is the P2P client state for the first P2P group and the group owner state for the second P2P group. According to such a state change, the wireless communication device 100A continues to be the P2P client for the existing P2P group, and the wireless communication device 100A and the wireless communication device 100B are capable of establishing a connection. Further, the concurrent operation includes P2P concurrency and WLAN concurrency. P2P concurrency is a function that enables a device to be the group owner for some P2P while being a P2P client for some other P2P group. In addition, WLAN concurrency is a function that enables a device to operate in both direct communication mode and infrastructure mode simultaneously.

The control unit 160 also obtains, for example, a constraint information A representing constraints on the wireless communication device 100A regarding a direct connection, and a constraint information B representing constraints on the wireless communication device 100B regarding this direct connection. Either one or both of the combination of the state information A and the constraint information A and the combination of the state information B and the constraint information B is obtained through near-field communication. For example, the combination of the state information A and the state information A or the combination of the state information B and the constraint information B for the actual device is obtained from the memory 150. In addition, the combination of the state information A and the state information A or the combination of the state information B and the constraint information B for the other device is obtained from the NFC interface 140 which received this information.

The constraint information includes for example, information representing if the wireless communication device 100A is capable of being the group owner for some P2P group, and also being the P2P client for some other P2P group. That is to say, the constraint information includes information representing whether or not concurrent operation is enabled. In addition, the constraint information includes for example, information representing if additional wireless communication devices may be added to the P2P group when the wireless communication device 100A is the group owner for some P2P group. That is to say, the constraint information includes information representing a group limit. In addition, the constraint information includes information representing if the wireless communication device 100A is capable of operating as terminal equivalent to an access point. That is to say, the constraint information includes information representing the on/off state for Intra-BSS. The constraint information also includes, for example, information representing if the wireless communication device 100A is capable of establishing connections between other wireless communication devices and access points. That is to say, the constraint information includes information representing the existence of an external registrar function. The constraint information may also include information representing the on/off state of a direct communication function (for example, the Wi-Fi P2P Power State), information representing whether or not the supply of authentication and connection settings information for connecting directly via wireless communication may be executed (for example, WPS (Wi-Fi Protected Setup) Capability), channel information (for example, listen/operating channel), and information related to wireless communication interfaces (for example, MAC addresses of wireless communication interfaces, the number of interfaces, and so on).

In addition, the control unit 160 selects, for example, a target pair of the wireless communication device 100A state and the wireless communication device 100B state that enables a connection between the wireless communication device 100A and wireless communication device 100B, and then changes the state of the wireless communication device 100A so that state of the wireless communication device 100A and the state of the wireless communication device 100B match this target pair. In this case, the control unit 160 may change both the state of the wireless communication device 100A and the state of the wireless communication device 100B. The control unit 160 also selects, for example, a target pair with a high level of priority from multiple target pairs. For example, if the wireless communication device 100A and the wireless communication device 100B have been provided with a GO Intent representing a priority in determining the group owner, the target pair that aligns with this GO Intent is selected. If the wireless communication device 100A has a higher GO Intent than the wireless communication device 100B, for example, the control unit 160 selects a target pair in which the state wireless communication device 100A is the group owner state, and the state of the wireless communication device 100B is the P2P client state. According to such a state change, not only is a connection readily established between the wireless communication device 100A and the wireless communication device 100B, but the state of the wireless communication device 100A and the state of the wireless communication device 100B may be changed to predetermined states. A direct connection may be enabled between the wireless communication device 100A and the wireless communication device 100B, for example, if either the state of the wireless communication device 100A or the wireless communication device 100B is in the group owner state. In addition, either the wireless communication device 100A or the wireless communication device 100B may be specified as the group owner.

In addition, the control unit 160, for example, may obtain the target pair of the state of the wireless communication device 100A and the state of the wireless communication device 100B that enables a connection between the wireless communication device 100A and the wireless communication device 100B. In this case, the control unit 160 may change the state of the wireless communication device 100A so that the state of the wireless communication device 100A and the state of the wireless communication device 100B align with the target pair. According to such a state change, if a predetermined state is given beforehand, the state of the wireless communication device 100A and the state of the wireless communication device 100B may be changed to predetermined states. Further, the control unit 160 in the wireless communication device 100B may obtain the state information A for the wireless communication device 100A and the target pair through near-field communication, for example. Then, the control unit 160 in the wireless communication device 100B may change the state of the wireless communication device 100B on the basis of the target pair before sending the state information B for the wireless communication device 100B to the wireless communication device 100A. According to such a state change, the state for one of the wireless communication devices may be changed in advance before sharing state information, which reduces a number of processing steps after the state information is shared.

The control unit 160 may also, for example, control processing for starting services between the wireless communication device 100A and the wireless communication device 100B after a connection is established between the wireless communication device 100A and the wireless communication device 100B via wireless communication. These services include, for example, services usable after the establishment of a wireless connection such as the digital living network alliance (DLNA) service, video and/or audio streaming services, and so on. According to such a processing control, services may be used immediately after establishing a wireless communication connection. The control unit 160 may also obtain information used to start services through near-field communication, and may control processing for starting the services on the basis of this information. The information used for these services includes, for example, device model information related to services and service information related to these services. By obtaining such information through NFC, processing (such as disconnecting a connection between wireless communication devices, searching for devices, reestablishing connection between wireless communication devices) for obtaining information performed when starting services such as mirroring, for example, may not have to be executed. That is to say, this may reduce user operation, simplify processing, and shorten processing time. The information used to start the services may also be obtained through near-field communication when either or both of the state information A for the wireless communication device 100A and the state information B for the wireless communication device 100B are obtained though near-field communication. That is to say, the information used for starting services may be obtained together with the state information. By obtaining information through NFC regarding such a connection processing, the user may only have to perform one near-field operation of the wireless communication device, which reduces user operation load. In addition, this may reduce the time from the first near-field operation to the starting of services.

Further, the wireless communication device 100B does not have to have the function of a direct connection, and the state of the wireless communication device 100B may be a fourth state representing that the device does not have the function of a direct connection (hereafter, referred to as the legacy device state). In this case, the control unit 160 changes the state of the wireless communication device 100A from either the P2P client or the P2P unconfigured state to the group owner state when the state of the wireless communication device 100A is either the P2P client state or the P2P unconfigured state. According to such a state change, a device having the function of a direct connection is capable of establishing a connection with a legacy device.

In addition, the wireless communication device 100A and the wireless communication device 100B do not have to have the function of a direct connection, and the state of the wireless communication device 100A and the state of the wireless communication device 100B may be the legacy device state representing that the device does not have the function of a direct connection. In this case, the control unit 160 may establish a connection for the wireless communication device 100A and the wireless communication device 100B to the same access point. According to such a processing, a connection is capable of being established between legacy devices.

According to such a configuration, state information and constraint information is shared via NFC between wireless communication devices attempting to connect, and when it is determined that wireless LAN communication is problematic, the states of the wireless communication devices are changed to enable a connection to be established between the wireless communication devices. As a result, the user is able to obtain the predetermined connection status with only a near-field operation and is unaware of the state of the wireless communication device 100. In addition, wireless communication devices not having a function of a direct connection such as with legacy devices are also capable of establishing connections. That is to say, when a connection cannot be established between wireless communication devices by a predetermined processing for establishing direct connections, a connection may be still be established between these wireless communication devices.

<<3. Operation of Wireless Communication System>>

Figure 3:
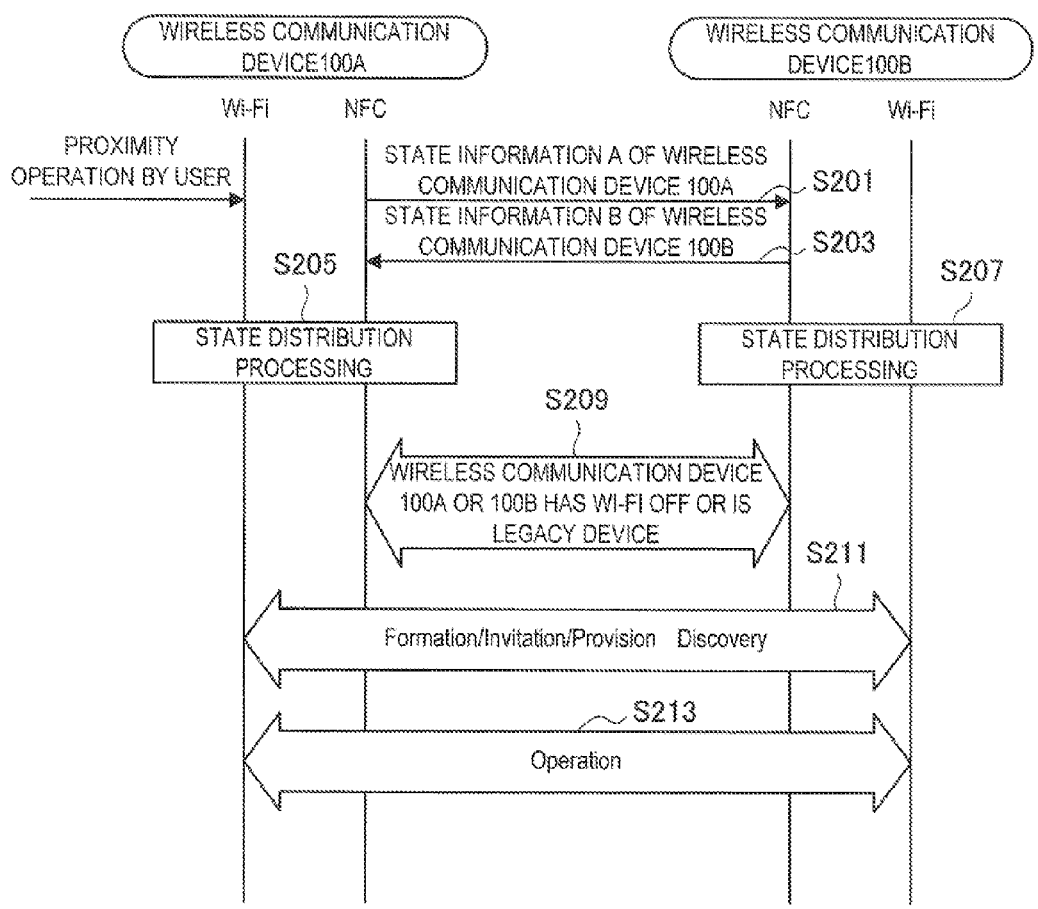
FIG. 3 is a sequence diagram schematically illustrating an operation of the wireless communication system according to an embodiment.

Next, the operation of the wireless communication system will be generally described with reference to FIG. 3. FIG. 3 is a sequence diagram schematically illustrating an operation of the wireless communication system.

Processing starts when the wireless communication device 100A is in proximity to the wireless communication device 100B. At step S201, the wireless communication device 100A sends the state information A for the wireless communication device 100A to the wireless communication device 100B through the NFC interface 140. As previously described, the state information represents, for example, one of the states including the group owner, P2P client, P2P unconfigured, or legacy device. When information directly representing the group owner, P2P client, or P2P unconfigured is included, for example, the state information represents the state indicated by this information. When this information is not included, the state information represents a legacy device. In addition, the wireless communication device 100A sends the constraint information A (not illustrated) for the wireless communication device 100A to the wireless communication device 100B through the NFC interface 140. As previously described, the constraint information includes, for example, information representing whether or not concurrent operation is enabled, information representing the group limit, information representing the on/off state of Intra-BSS, and information representing the existence of the external registrar function.

Next, at step S203, the wireless communication device 100B sends the state information B for the wireless communication device 100B to the wireless communication device 100A through the NFC interface 140. In addition, the wireless communication device 100B sends the constraint information B (not illustrated) for the wireless communication device 100B to the wireless communication device 100A.

Then, at steps S205 and S207, the wireless communication device 100A and the wireless communication device 100B execute the state distribution processing for the wireless communication device 100A and the wireless communication device 100B on the basis of the state information for the wireless communication device 100A and the wireless communication device 100B. That is to say, the wireless communication device 100A and the wireless communication device 100B determine the manner in which the states of the wireless communication device 100A and the wireless communication device 100B will be changed so that a connection may be established between the wireless communication device 100A and the wireless communication device 100B.

In this case, one or both of the wireless communication device 100A and the wireless communication device 100B turns the wireless LAN interface (Wi-Fi) off, or if the device is a legacy device, communication via NFC is performed at step S209.

In addition, the wireless communication device 100A and the wireless communication device 100B performs communication via wireless LAN communication at step S211 when wireless LAN communication can be performed or after wireless LAN communication becomes capable of being performed by turning on the wireless LAN interface or some other processing. Specifically, processing for establishing the direct connection such as formation processing, invitation processing, provision discovery processing, and so on is performed between the wireless communication device 100A and the wireless communication device 100B.

Then, at step S213, the wireless communication device 100A and the wireless communication device 100B start direct communication (operation).

Further, at steps S205 and S207, both the wireless communication device 100A and the wireless communication device 100B may autonomously execute the state distribution processing, or whichever wireless communication device between the wireless communication device 100A and the wireless communication device 100B that is the primary device may execute the state distribution processing. When the operation mode is such that both devices execute the state distribution processing autonomously, for example, and if there is contention on which of the two devices will become the group owner, the operation mode may be switched to a mode in which the state distribution processing will be executed by one of the two devices.

<<4. Operation of Wireless Communication Device>>

Next, the operation of the wireless communication device 100 will be described with reference to FIG. 4 through FIG. 15.

<4.1 Flow of Overall Processing>

Figure 4:
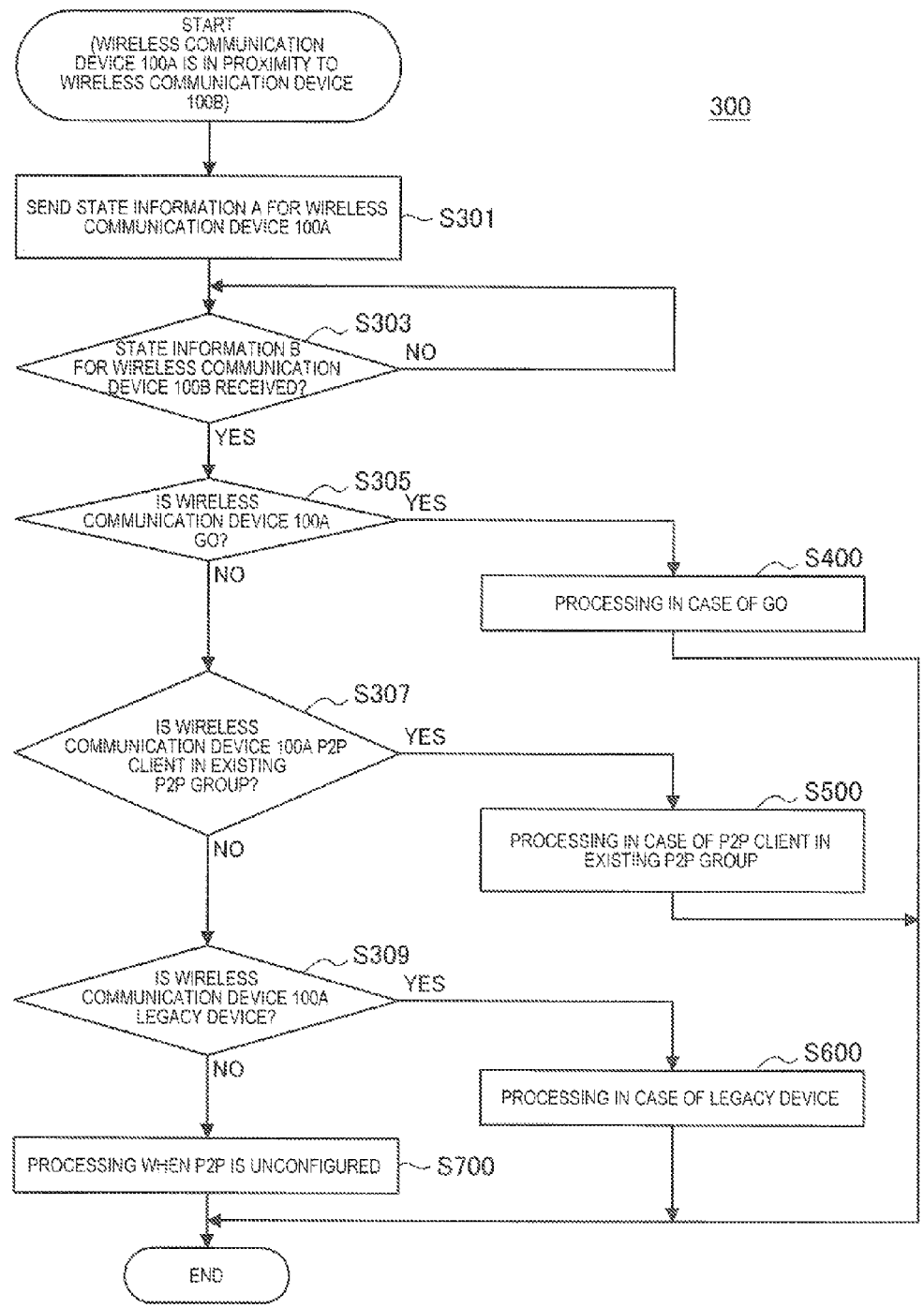
FIG. 4 is a flowchart illustrating an example of a communication processing by a wireless communication device according to an embodiment.

FIG. 4 is a flowchart illustrating an example of a communication processing by the wireless communication device 100A according to the present embodiment. Processing starts when the wireless communication device 100A is in proximity to the wireless communication device 100B.

At step S301, the NFC interface 140 sends the state information A for the wireless communication device 100A to the wireless communication device 100B. The NFC interface 140 also sends, for example, the constraint information A for the wireless communication device 100A to the wireless communication device 100B.

At step S303, the control unit 160 determines whether or not the state information B for the wireless communication device 100B has been received through the NFC interface 140. If the state information B has been received, then the processing proceeds to step S305. If it has not been received, then the processing repeats step S303. The NFC interface 140 also receives, for example, the constraint information B for the wireless communication device 100B together with the state information B for the wireless communication device 100B.

At step S305, the control unit 160 determines whether or not the wireless communication device 100A is the group owner for the existing P2P group from the state information A for the wireless communication device 100A. If the wireless communication device 100A is the group owner, then the processing proceeds to step S400. If it is not, then the processing proceeds to step S307.

At step S307, the control unit 160 determines whether or not the wireless communication device 100A is the P2P client for the existing P2P group from the state information for the wireless communication device 100A. If the wireless communication device 100A is the P2P client, then the processing proceeds to step S500. If it is not, then the processing proceeds to step S309.

At step S309, the control unit 160 determines whether or not the wireless communication device 100A is the legacy device from the state information for the wireless communication device 100A. If the wireless communication device 100A is the legacy device, then the processing proceeds to step S600. If it is not, then the processing proceeds to step S700.

The processing when the device is the group owner, the processing when a P2P client, the processing when a legacy device, and the processing when P2P is unconfigured is executed during steps S400, S500, S600, and S700, respectively, as described later. Then, the processing finishes.

<4.2 Flow of Processing when Device is Group Owner>

Figure 5:
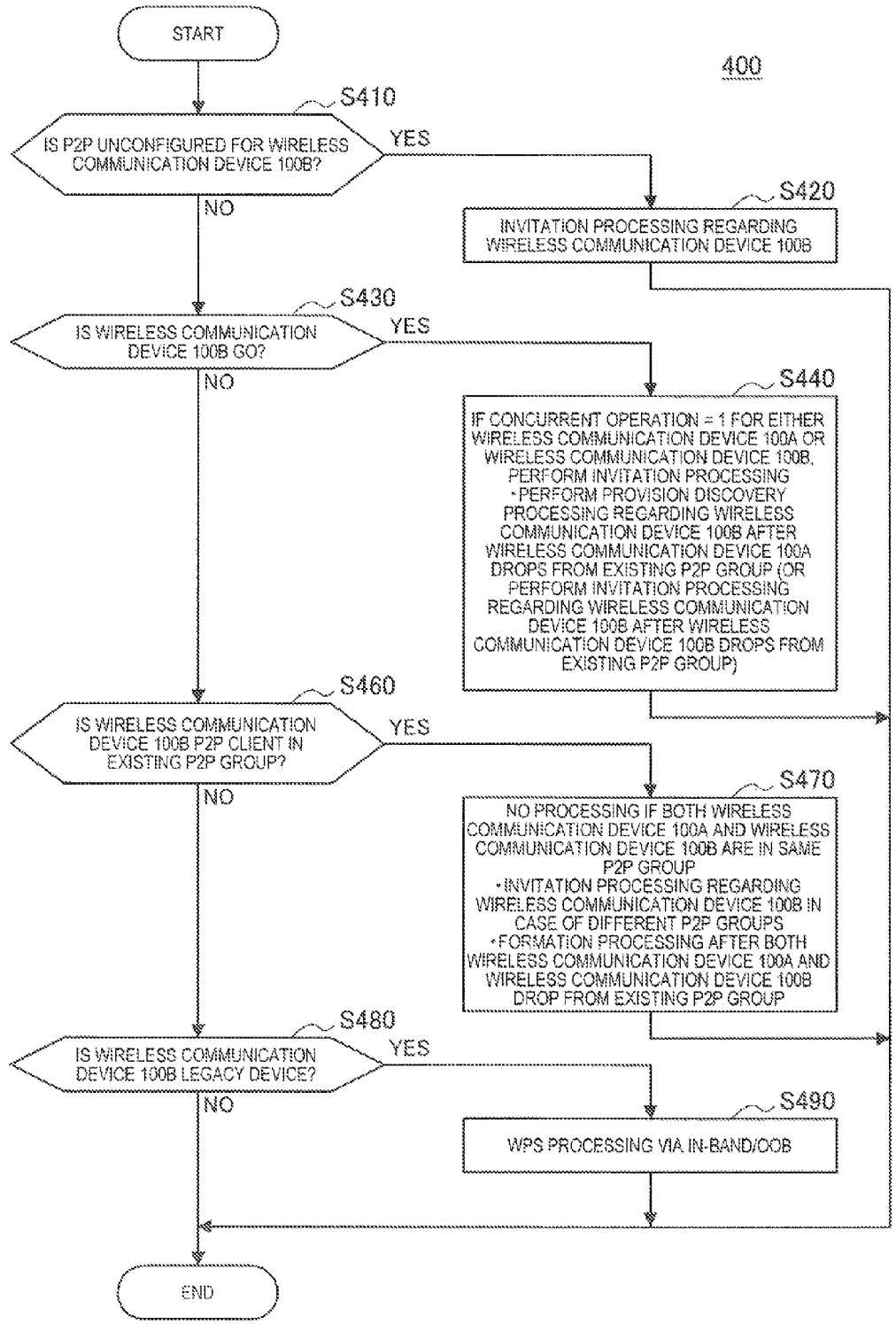
FIG. 5 is a flowchart illustrating an example of an overall flow of a processing when the device is a group owner.
Figure 6:
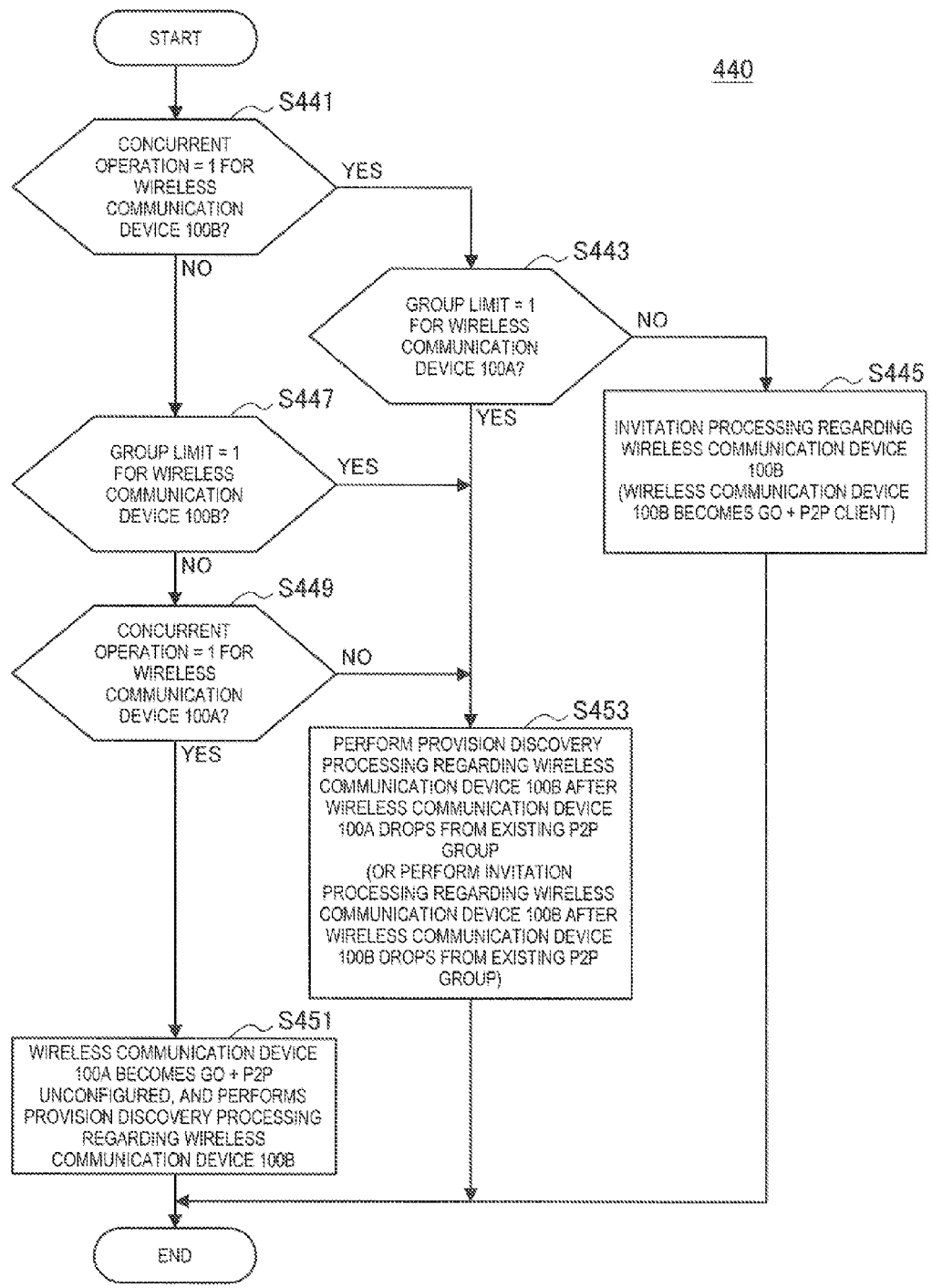
FIG. 6 is a flowchart illustrating an example of an overall flow of a processing when the other wireless communication device is also a group owner.

The processing when a device is the group owner, which is represented by step S400 in FIG. 4, will be described with reference to FIG. 5 through 7. FIG. 5 is a flowchart illustrating an example of an overall flow of a processing when the device is a group owner.

At step S410, the control unit 160 determines whether or not P2P is unconfigured for the wireless communication device 100B from the state information for the wireless communication device 100B. If the P2P is unconfigured for the wireless communication device 100B, then the processing proceeds to step S420. If it is configured, then the processing proceeds to step S430.

At step S420, the control unit 160 executes the invitation processing by sending an Invitation Request to the wireless communication device 100B through the wireless LAN interface 130 of the NFC interface 140 (hereafter, referred collectively as the communication interface). Then, the processing finishes.

At step S430, the control unit 160 determines whether or not the wireless communication device 100B is the group owner for the existing P2P group. If the wireless communication device 100B is the group owner, then the processing proceeds to step S440. If it is not, then the processing proceeds to step S460. Step S440 will be described in detail later. Processing ends after step S440.

At step S460, the control unit 160 determines whether or not the wireless communication device 100B is a P2P client for the existing P2P group from the state information B for the wireless communication device 100B. If the wireless communication device 100B is the P2P client, then the processing proceeds to step S470. If it is not, then the processing proceeds to step S480. Step S470 will be described in detail later. Processing ends after step S470.

At step S480, the control unit 160 determines whether or not the wireless communication device 100B is the legacy device from the state information B for the wireless communication device 100B. If the wireless communication device 100B is the legacy device, then the processing proceeds to step S490. If it is not, then the processing ends.

At step S490, the control unit 160 executes Wi-Fi Protected Setup (WPS) processing via In-Band or Out-of-Band (OOB) mode. Then, the processing finishes. Further, the WPS processing includes shared authentication and connection settings information (credentials). WPS is also referred to as Wi-Fi Simple Config (WSC) or WSC exchange. In addition, OOB mode refers to a communication path different to that of Wi-Fi by using NFC, Universal Serial Bus (USB), or other method in contrast to Wi-Fi.

(Step S440)

The processing when the wireless communication device 100B is the group owner (that is to say, step S440) will be described with reference to FIG. 6. FIG. 6 is a flowchart illustrating an example of an overall flow of a processing when the wireless communication device 100B is also a group owner.

At step S441, the control unit 160 determines whether or not Concurrent Operation=1 from the constraint information B for the wireless communication device 100B. That is to say, a determination is made on whether or not the wireless communication device 100B may be the group owner state for some P2P group and also be the P2P client state for some other P2P group. If Concurrent Operation=1, then the processing proceeds to step S443. If it does not, then the processing proceeds to step S447.

At step S443, the control unit 160 determines whether or not Group Limit=1 from the constraint information A for the wireless communication device 100A. That is to say, a determination is made on whether or not it is possible to add more wireless communication devices to the P2P of the wireless communication device 100A. If Group Limit=1, then the processing proceeds to step S453. If it does not, then the processing proceeds to step S445.

At step S445, the control unit 160 executes the invitation processing by sending an Invitation Request to the wireless communication device 100B through the communication interface. As a result, the wireless communication device 100B becomes the group owner for the existing P2P group and also becomes a P2P client for the P2P group for which the wireless communication device 100A is the group owner. Then, the processing finishes.

At step S447, the control unit 160 determines whether or not Group Limit=1 from the constraint information B for the wireless communication device 100B. That is to say, a determination is made on whether or not it is possible to add more wireless communication devices to the P2P of the wireless communication device 100A. If Group Limit=1, then the processing proceeds to step S453. If it does not, then the processing proceeds to step S449.

At step S449, the control unit 160 determines whether or not Concurrent Operation=1 from the constraint information A for the wireless communication device 100A. That is to say, a determination is made on whether or not the wireless communication device 100A may be the group owner state for some P2P group and also be the P2P client state for some other P2P group. If Concurrent Operation=1, then the processing proceeds to step S451. If it does not, then the processing proceeds to step S453.

At step S451, the control unit 160 changes the state of the wireless communication device 100A from the group owner of the existing P2P group to the owner of the existing P2P group and the P2P unconfigured state. In addition, the control unit 160 executes the provision discovery processing by sending a Provision Discovery Request to the wireless communication device 100B through the communication interface. As a result, the wireless communication device 100A becomes the group owner of the existing P2P group and a P2P client of the P2P group for which the wireless communication device 100B is the group owner. Then, the processing finishes.

At step S453, the control unit 160 drops the wireless communication device 100A from the existing P2P group. In addition, the control unit 160 then executes the provision discovery processing by sending a Provision Discovery Request to the wireless communication device 100B through the communication interface. As a result, the wireless communication device 100A becomes a P2P client of the P2P group for which the wireless communication device 100B is the group owner. The control unit 160 may also drop the wireless communication device 100B from the existing P2P group though the communication interface. In addition, the control unit 160 may also execute the invitation processing by sending an Invitation Request to the wireless communication device 100B. As a result, the wireless communication device 100B becomes a P2P client of the P2P group for which the wireless communication device 100A is the group owner. Then, the processing finishes.

(Step S470)

The processing when the wireless communication device 100B is the P2P client (that is to say, step S470) will be described with reference to FIG. 7. FIG. 7 is a flowchart illustrating an example of an overall flow of a processing when the wireless communication device 100B is a P2P client.

At step S471, the control unit 160 determines if the wireless communication device 100A and the wireless communication device 100B have the same P2P group ID from the state information B for the wireless communication device 100B and the wireless communication device 100A. That is to say, a determination is made on whether the wireless communication device 100A and the wireless communication device 100B belong to the same P2P group. If both devices have the same P2P group ID, then the processing ends. If they do not, then the processing proceeds to step S473.

At step S473, the control unit 160 determines whether or not Group Limit=1 from the constraint information A for the wireless communication device 100A. That is to say, a determination is made on whether or not it is possible to add more wireless communication devices to the P2P of the wireless communication device 100A. If Group Limit=1, then the processing proceeds to step S477. If it does not, then the processing proceeds to step S475.

At step S475, the control unit 160 executes the invitation processing by sending an Invitation Request to the wireless communication device 100B through the communication interface. As a result, the wireless communication device 100B becomes a P2P client for the P2P group for which the wireless communication device 100A is the group owner. Then, the processing finishes.

At step S477, the control unit 160 drops the wireless communication device 100A and the wireless communication device 100B from the existing P2P group followed by executing the formation processing. As a result, a new P2P group is formed. Either the wireless communication device 100A or the wireless communication device 100B becomes the group owner of this formed group, and the other becomes a P2P client in this formed group. Then, the processing finishes.

<4.3 Flow of Processing when Device is P2P Client>

The processing when a device is the P2P client, which is represented by step S500 in FIG. 4, will be described with reference to FIG. 8 through 11. FIG. 5 is a flowchart illustrating an example of an overall flow of a processing when the device is a P2P client.

At steps S510, S530, S550, and S570, the control unit 160 makes determinations regarding the wireless communication device 100B from the state information B for the wireless communication device 100B in the same way as for steps S410, S430, S460, and S480 in FIG. 5.

If the result of the determination is that P2P is unconfigured for the wireless communication device 100B, then the processing proceeds to step S520. If the wireless communication device 100B is the group owner, then the processing proceeds to step S540. If the wireless communication device 100B is a P2P client for the existing P2P group, then the processing proceeds to step S560. If the wireless communication device 100B is a legacy device, then the processing proceeds to step S580. Steps S520, S540, and S560 will be described in further detail later.

At step S580, the control unit 160 drops the wireless communication device 100A from the existing P2P group. Then, the control unit 160 changes the state of the wireless communication device 100A to that of the group owner. Afterwards, the control unit 160 executes the WPS processing with the wireless communication device 100B. Then, the processing finishes.

(Step S520)

The processing when P2P is unconfigured for the wireless communication device 100B (that is to say, step S520) will be described with reference to FIG. 9. FIG. 9 is a flowchart illustrating an example of an overall flow of a processing when P2P is unconfigured for the wireless communication device 100B.

At step S521, the control unit 160 determines whether or not Concurrent Operation=1 from the constraint information A for the wireless communication device 100A. That is to say, a determination is made on whether or not the wireless communication device 100A may be the group owner state for some P2P group and also be the P2P client state for some other P2P group. If Concurrent Operation=1, then the processing proceeds to step S523. If it does not, then the processing proceeds to step S525.

At step S523, the control unit 160 changes the state of the wireless communication device 100A from the group owner of the existing P2P group to a client of the existing P2P group and the group owner of a new group. The control unit 160 then executes the invitation processing by sending an Invitation Request to the wireless communication device 100B through the communication interface. As a result, the wireless communication device 100B becomes a P2P client of the P2P group for which the wireless communication device 100A is the group owner. Then, the processing finishes.

At step S525, the control unit 160 drops the wireless communication device 100A from the existing P2P group. The control unit 160 then executes the formation processing by sending a GO Negotiation Request to the wireless communication device 100B through the communication interface. As a result, a new P2P group is formed. Either the wireless communication device 100A or the wireless communication device 100B becomes the group owner of this formed group, and the other becomes a P2P client in this formed group. Then, the processing finishes.

(Step S540)

The processing when the wireless communication device 100B is the group owner (that is to say, step S540) will be described with reference to FIG. 10. FIG. 10 is a flowchart illustrating an example of an overall flow of a processing when the wireless communication device 100B is a group owner.

At step S541, the control unit 160 determines if the wireless communication device 100A and the wireless communication device 100B have the same P2P group ID from the state information B for the wireless communication device 100B and the wireless communication device 100A. That is to say, a determination is made on whether the wireless communication device 100A and the wireless communication device 100B belong to the same P2P group. If both devices have the same P2P group ID, then the processing finishes. If they do not, then the processing proceeds to step S543.

At step S543, the control unit 160 determines whether or not Group Limit=1 from the constraint information B for the wireless communication device 100B. That is to say, a determination is made on whether or not it is possible to add more wireless communication devices to the P2P of the wireless communication device 100A. If Group Limit=1, then the processing proceeds to step S547. If it does not, then the processing proceeds to step S545.

At step S545, the control unit 160 drops the wireless communication device 100A from the existing group. In addition, the control unit 160 executes the provision discovery processing by sending a Provision Discovery Request to the wireless communication device 100B through the communication interface. As a result, the wireless communication device 100A becomes a P2P client of the P2P group for which the wireless communication device 100B is the group owner. Then, the processing finishes.

At step S547, the control unit 160 drops the wireless communication device 100A and the wireless communication device 100B from the existing P2P group followed by executing the formation processing. As a result, a new P2P group is formed. Either the wireless communication device 100A or the wireless communication device 100B becomes the group owner of this formed group, and the other becomes a P2P client in this formed group. Then, the processing finishes.

(Step S560)

Figure 11:
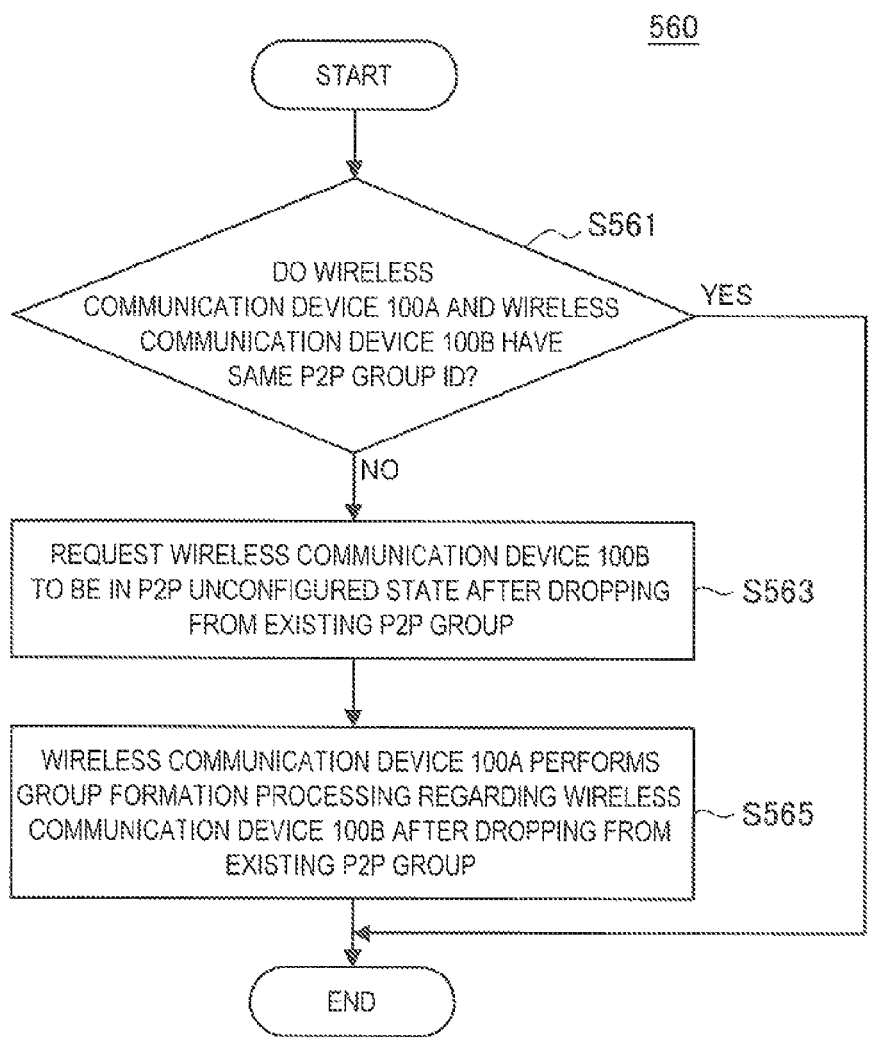
FIG. 11 is a flowchart illustrating an example of an overall flow of a processing when the other wireless communication device is a P2P client.

The processing when the wireless communication device 100B is the P2P client (that is to say, step S560) will be described with reference to FIG. 11. FIG. 11 is a flowchart illustrating an example of an overall flow of a processing when the wireless communication device 100B is a P2P client.

At step S561, the control unit 160 determines if the wireless communication device 100A and the wireless communication device 100B have the same P2P group ID from the state information B for the wireless communication device 100B and the wireless communication device 100A. That is to say, a determination is made on whether the wireless communication device 100A and the wireless communication device 100B belong to the same P2P group. If both devices have the same P2P group ID, then the processing ends. If they do not, then the processing proceeds to step S563.

At step S563, the control unit 160 requests the wireless communication device 100B to drop from the existing P2P group and set the state to the P2P unconfigured state through the communication interface.

At step S565, the control unit 160 drops the wireless communication device 100A from the existing P2P group. The control unit 160 then executes the formation processing by sending a GO Negotiation Request to the wireless communication device 100B through the communication interface. As a result, a new P2P group is formed. Either the wireless communication device 100A or the wireless communication device 100B becomes the P2P group owner of this formed group, and the other becomes a P2P client in this formed group. Then, the processing finishes.

<4.4 Flow of Processing when Device is Legacy Device>

Figure 12:
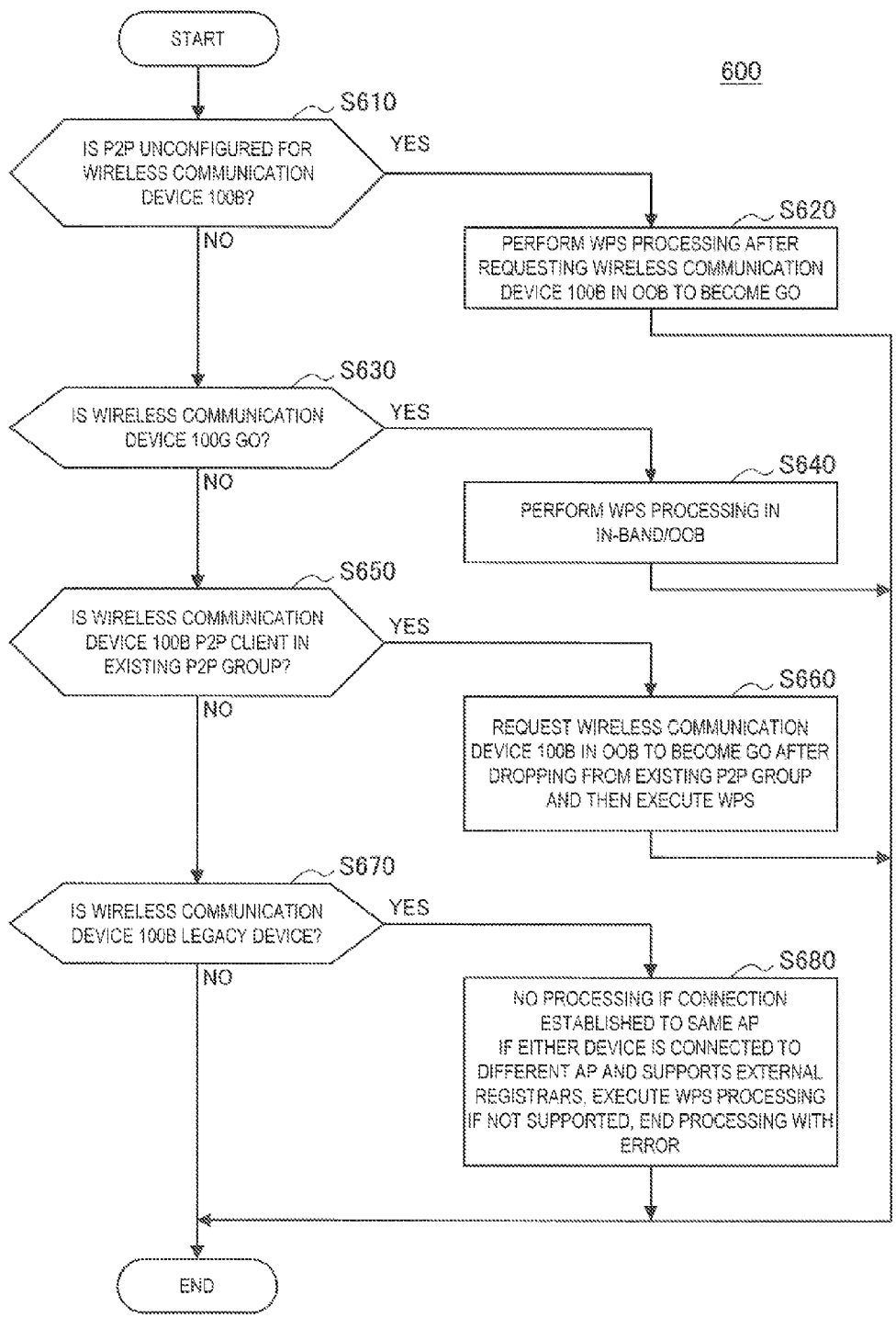
FIG. 12 is a flowchart illustrating an example of an overall flow of a processing when the device is a legacy device.
Figure 13:
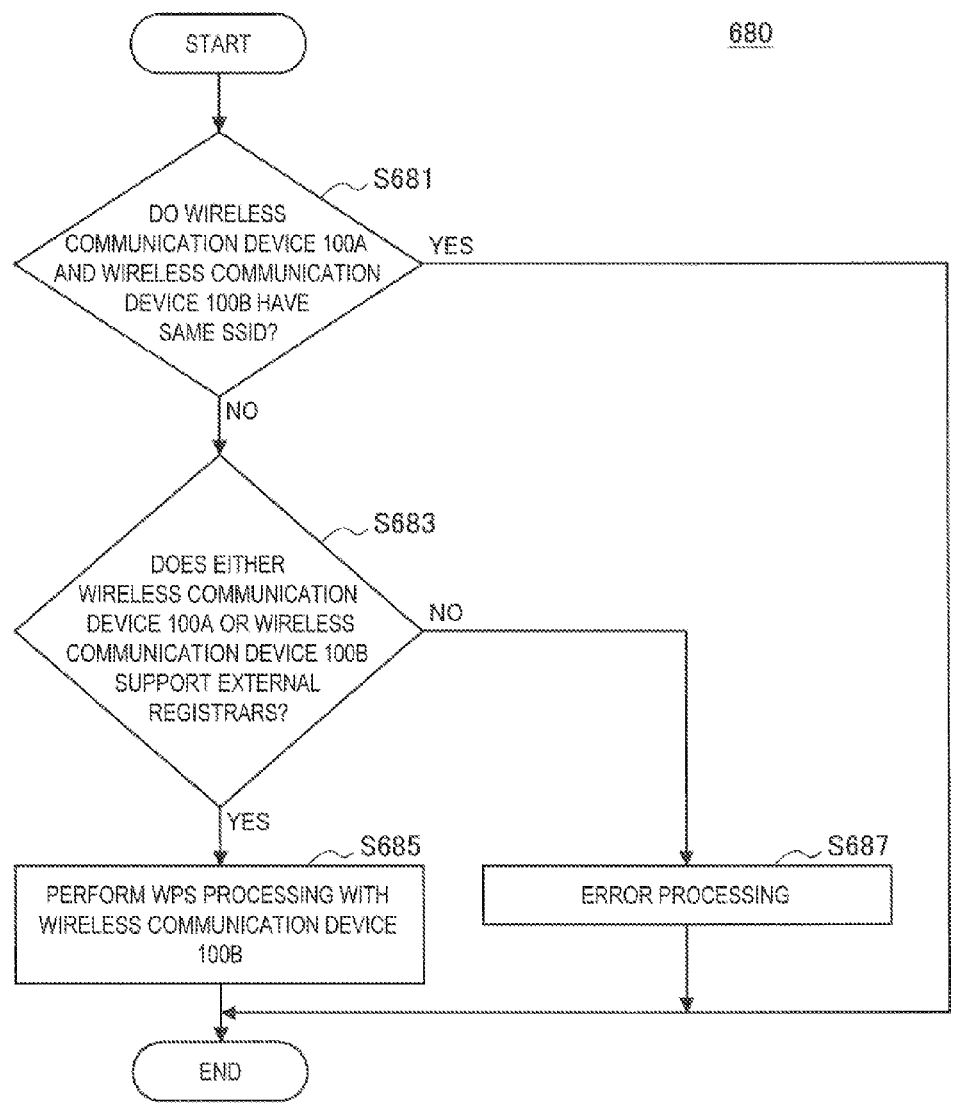
FIG. 13 is a flowchart illustrating an example of an overall flow of a processing when the other wireless communication device is also a legacy device.

The processing when a device is the legacy device, which is represented by step S600 in FIG. 4, will be described with reference to FIG. 12 through 13. FIG. 12 is a flowchart illustrating an example of an overall flow of a processing when the device is a legacy device.

At steps S610, S630, S650, and S670, the control unit 160 makes determinations regarding the wireless communication device 100B from the state information B for the wireless communication device 100B in the same way as for steps S410, S430, S460, and S480 in FIG. 5.

If the result of the determination is that P2P is unconfigured for the wireless communication device 100B, then the processing proceeds to step S620. If the wireless communication device 100B is the group owner, then the processing proceeds to step S640. If the wireless communication device 100B is a P2P client for the existing P2P group, then the processing proceeds to step S660. If the wireless communication device 100B is a legacy device, then the processing proceeds to step S680. Step S680 will be described in further detail later.

At step S620, the control unit 160 requests the wireless communication device 100B in the OOB mode to become the group owner, and then executes the WPS processing with the wireless communication device 100B. Then, the processing finishes.

At step S640, the control unit 160 executes the WPS processing with the wireless communication device 100B in the In-Band or OOB mode. Then, the processing finishes.

At step S660, the control unit 160 requests the wireless communication device 100B in the OOB mode to become the group owner after being dropped from the existing P2P group and execute the WPS processing. Then, the processing finishes.

(Step S680)

The processing when the wireless communication device 100B is a legacy device (that is to say, step S680) will be described with reference to FIG. 13. FIG. 13 is a flowchart illustrating an example of an overall flow of a processing when the wireless communication device 100B is also a legacy device.

At step S681, the control unit 160 determines if the wireless communication device 100A and the wireless communication device 100B have the same Service Set Identifier (SSID) from the state information B for the wireless communication device 100B and the wireless communication device 100A. If both devices have the same SSID, then the processing ends. If they do not, then the processing proceeds to step S683.

At step S683, the control unit 160 determines if either the wireless communication device 100A or the wireless communication device 100B supports external registrars from the constraint information B for the wireless communication device 100B and the wireless communication device 100A. The external registrar is a function capable of executing the WPS processing with devices that are not access points, and, for example, is given connection settings information for an access point, registering other wireless communication devices, and is capable of connecting with these other wireless communication devices. If either device supports external registrars, then the processing proceeds to step S685. If they do not, then the processing proceeds to step S687.

At step S685, the control unit 160 executes the WPS processing with the wireless communication device 100B. Then, the processing finishes.

At step S687, the control unit 160 executes an error processing. Then, the processing finishes.

<4.5 Processing when P2P is Unconfigured>

Figure 14:
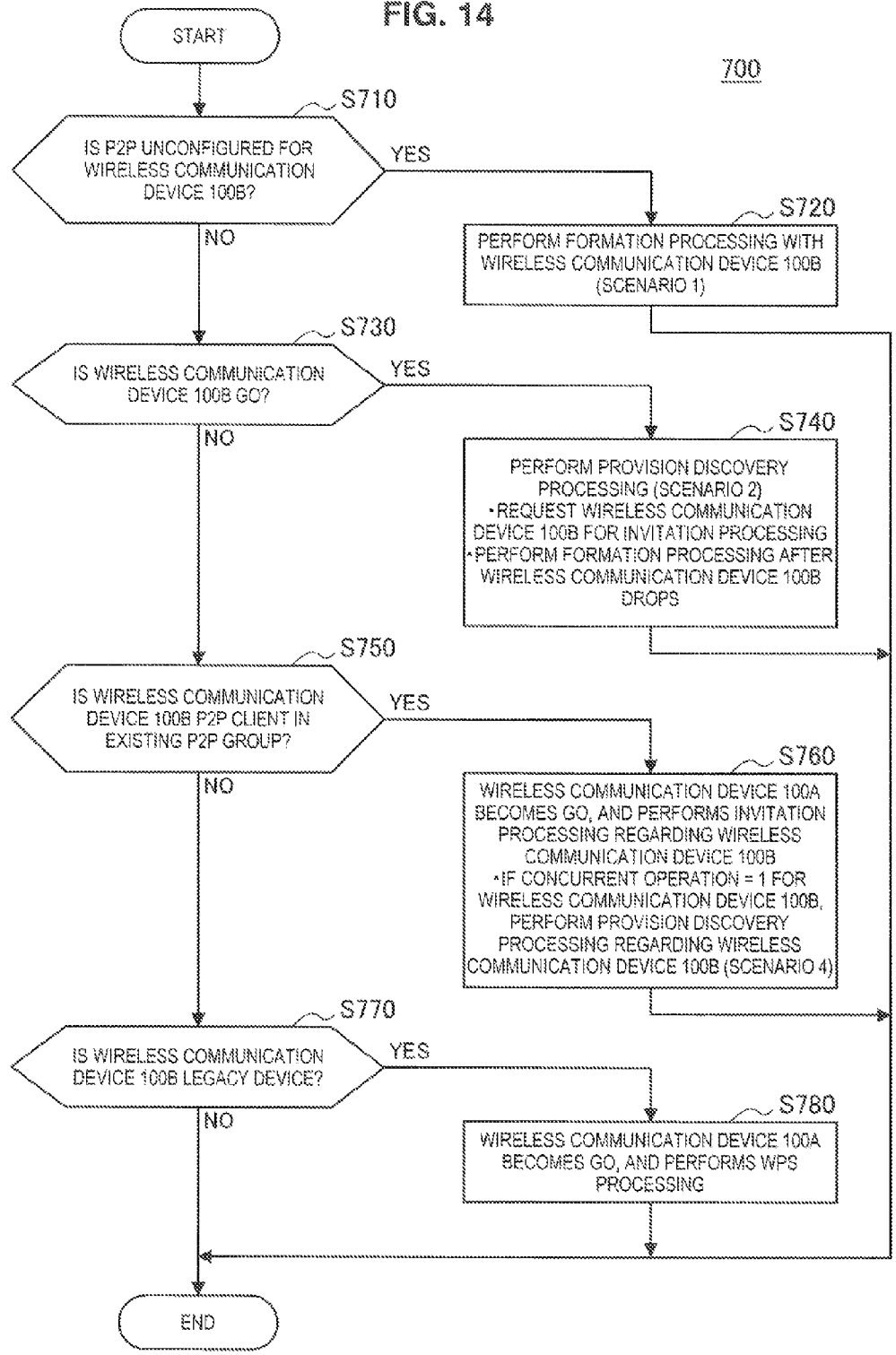
FIG. 14 is a flowchart illustrating an example of an overall flow of a processing when P2P is unconfigured.
Figure 15:
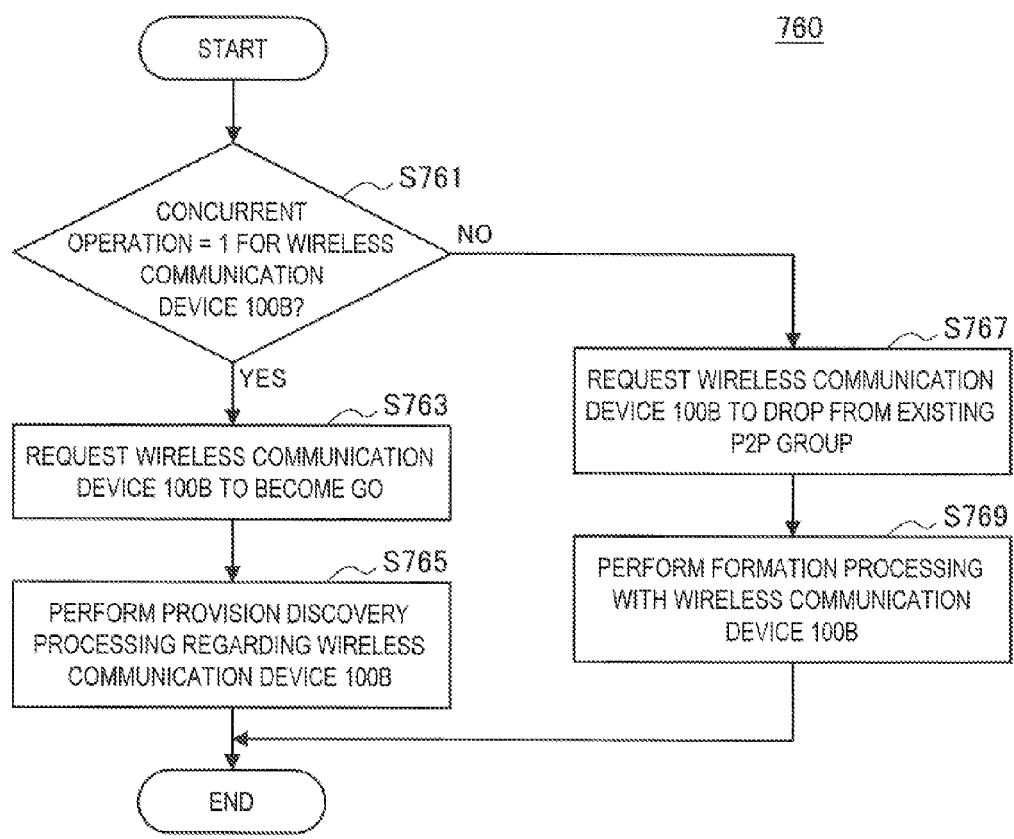
FIG. 15 is a flowchart illustrating an example of an overall flow of a processing when the other wireless communication device is a P2P client.

The processing when P2P is unconfigured, which is step S700 in FIG. 4, will be described with reference to FIG. 14 and FIG. 15. FIG. 14 is a flowchart illustrating an example of an overall flow of a processing when P2P is unconfigured.

At steps S710, S730, S750, and S770, the control unit 160 makes determinations regarding the wireless communication device 100B from the state information B for the wireless communication device 100B in the same way as for steps S410, S430, S460, and S480 in FIG. 5.

If the result of the determination is that P2P is unconfigured for the wireless communication device 100B, then the processing proceeds to step S720. If the wireless communication device 100B is the group owner, then the processing proceeds to step S740. If the wireless communication device 100B is a P2P client for the existing P2P group, then the processing proceeds to step S760. If the wireless communication device 100B is a legacy device, then the processing proceeds to step S780. Step S760 will be described in further detail later.

At step S720, the control unit 160 executes the formation processing with the wireless communication device 100B by sending a GO Negotiation Request to the wireless communication device 100B. As a result, either the wireless communication device 100A or the wireless communication device 100B becomes the group owner, and the other device becomes a P2P client. Then, the processing finishes.

At step S740, the control unit 160 executes the provision discovery processing by sending a Provision Discovery Request to the wireless communication device 100B through the communication interface. Alternatively, the control unit 160 requests the wireless communication device 100B for invitation processing through the communication interface.

Alternatively, the control unit 160 drops the wireless communication device 100B, and then executes the formation processing with the wireless communication device 100B through the communication interface. As a result, the wireless communication device 100A becomes a P2P client for the P2P group for which the wireless communication device 100B is the group owner, for example. Then, the processing finishes.

At step S780, the control unit 160 changes the state of the wireless communication device 100A to the group owner state, and then executes the WPS processing with the wireless communication device 100B which is a legacy device. Then, the processing finishes.

(Step S760)

The processing when the wireless communication device 100B is a P2P client in the existing P2P group (that is to say, step S760) will be described with reference to FIG. 15. FIG. 15 is a flowchart illustrating an example of an overall flow of a processing when the wireless communication device 100B is a P2P client in the existing P2P group.

At step S761, the control unit 160 determines whether or not Concurrent Operation=1 from the constraint information B for the wireless communication device 100B. That is to say, a determination is made on whether or not the wireless communication device 100B may be the group owner state for some P2P group and also be the P2P client state for some other P2P group. If Concurrent Operation=1, then the processing proceeds to step S763. If it does not, then the processing proceeds to step S767.

At step S763, the control unit 160 requests the wireless communication device 100B to become the group owner. As a result, the wireless communication device 100B becomes the group owner, and a client for the existing P2P group. Then, at step S765, the control unit 160 executes the provision discovery processing by sending a Provision Discovery Request to the wireless communication device 100B through the communication interface. As a result, the wireless communication device 100A becomes a P2P client of the P2P group for which the wireless communication device 100B is the group owner. Then, the processing finishes.

At step S767, the control unit 160 requests the wireless communication device 100B to drop from the existing P2P group through the communication interface. Then, at step S769, the control unit 160 executes the formation processing by sending a GO Negotiation Request to the wireless communication device 100B through the communication interface. As a result, a new P2P group is formed. Either the wireless communication device 100A or the wireless communication device 100B becomes the P2P group owner, and the other device becomes a P2P client in this formed group. Then, the processing finishes.

The operation of the wireless communication device 100 has been described with reference to FIG. 4 through FIG. 15. According to such an operation, state information and constraint information is shared via NFC between wireless communication devices attempting to connect, and when it is determined that wireless LAN communication is problematic, the states of the wireless communication devices are changed to enable a connection to be established between the wireless communication devices. As a result, the user is able to obtain the predetermined connection status with only a near-field operation and is unaware of the state of the wireless communication device 100. In addition, wireless communication devices not having a function of a direct connection such as with legacy devices are also capable of establishing connections. Note that the operation of the wireless communication device 100 can be summarized as below.

TABLE 1

|  |  | Terminal B (responder) | | | |
|---|---|---|---|---|---|
|  |  | P2P Unconfigured | Group Owner | P2P Client | Legacy Device |
| Terminal A (initiator) | P2P Unconfigured | (1)(S0) - Formation processing (scenario 1) | (2)(S4) - Provision Discovery Request (scenario2) If reconnection possible, Invitation Request (scenario 3) Invitation Request from the wireless communication device 100B Requests the wireless communication device 100B to drop and performs formation processing | (3)(S1) - Wireless communication device 100A becomes a GO, and sends Invitation Request to the wireless communication device 100B If Concurrent Operation = 1 for the wireless communication device 100B, sends Invitation Request to the wireless communication device 100B (scenario 4) | (4) - Wireless communication device 100A becomes a GO and performs WPS processing |
|  | Group Owner | (5)(S5) - Sends Invitation Request to the wireless communication device 100B (scenario 5) Drops from the existing group and performs the formation processing Provision Discovery Request from the wireless communication device 100B | (6)(S6) - If Concurrent Operation = 1 for either terminal A or B, Invitation Request After dropping the wireless communication device 100A, sends Provision Discovery Request to the wireless communication device 100B, or after dropping the wireless communication device 100B, sends Invitation Request to the wireless communication device 100B | (7)(S7) - No processing if the wireless communication device 100A and 100B are in same group If in different groups, Invitation Request to the wireless communication device 100B After dropping both the wireless communication device 100A and 100B, performs formation processing | (8) - WPS processing (scenario 6) |
|  | P2P client | (9)(S2) - Performs formation processing after dropping from existing group If Concurrent Operation = 1, becomes a GO and sends Invitation Request to the wireless communication device 100B | (10)(S8) - No processing if in same group If in different groups, sends Provision Discovery Request after dropping from existing group Performs Formation processing after dropping both terminals A and B | (11)(S3) - No processing if in same group and Intra-BSS = on If in different groups, performs formation processing after dropping both the wireless communication device 100A and 100B from existing groups If Concurrent Operation = 1, become a GO and send Invitation to the wireless communication device 100B | (12) - After dropping from existing group, becomes a GO and performs WPS processing |
|  | Legacy device | (13) - After requesting in OOB mode for the wireless communication device 100B to become a GO, performs WPS processing | (14) - WPS processing (scenario 6) | (15) - Requests the wireless communication device 100B to become a GO and start WPS | (16) - No processing if connection already established with same AP If connected to different APs and either device supports external |

TABLE 1-continued

| | Terminal B (responder) | | | |
|---|---|---|---|---|
| | P2P Unconfigured | Group Owner | P2P Client | Legacy Device |
| | | | | registrars, performs WPS processing If neither device supports external registrars, ends in error |

<<5. Other Individual Operations>>

Next, other individual operations regarding the wireless communication system will be described with reference to FIG. 16 through 19. More specifically, processing for communicating by selectively using two communication methods as well as formation processing and invitation processing using NFC will be described.

(Processing for Communication by Selectively Using Two Different Communication Methods)

Figure 16:
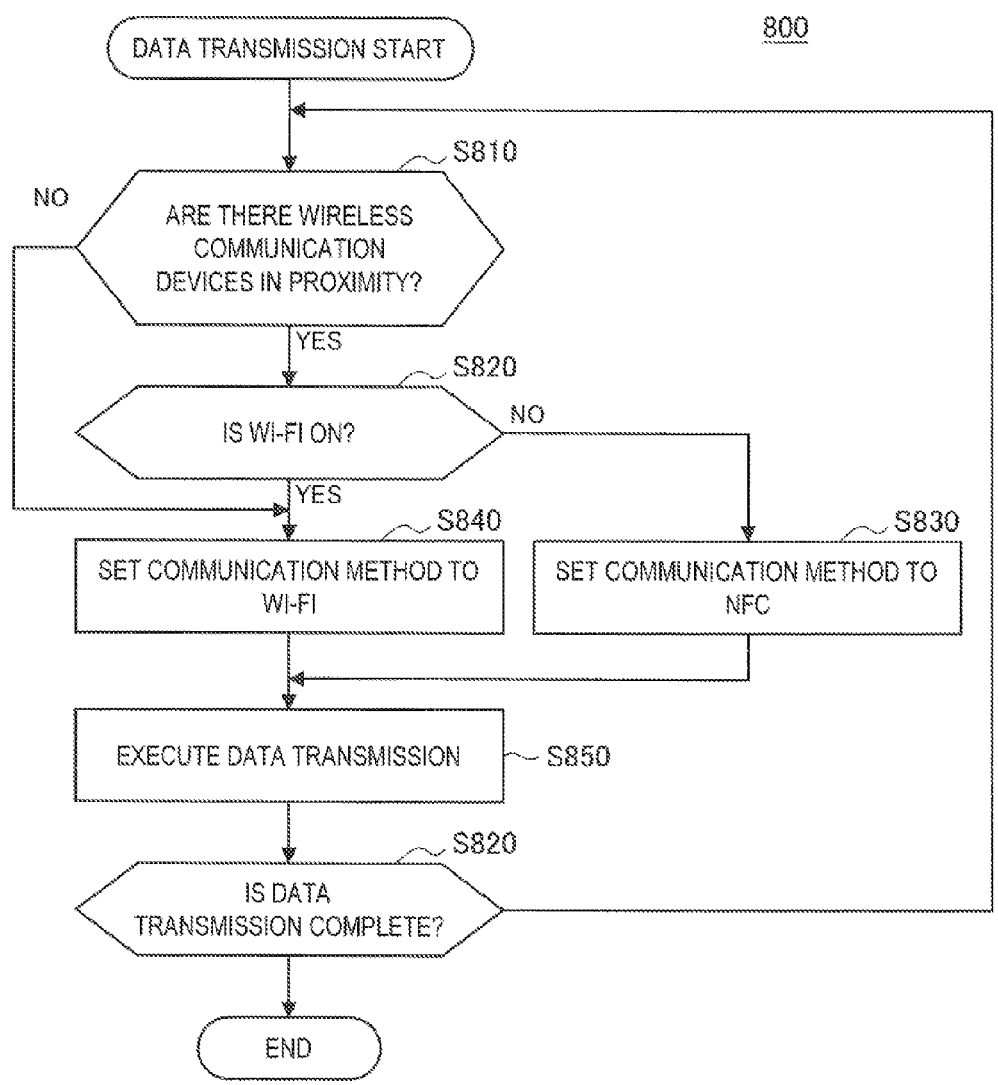
FIG. 16 is a flowchart illustrating an example of an overall flow of a processing for communication selectively using wireless LAN communication and NFC.

First, the processing for selectively using two different communication methods will be described. FIG. 16 is a flowchart illustrating an example of an overall flow of a processing for communication using wireless LAN communication and NFC. This processing is performed by the wireless communication device 100.

At step S810, the control unit 160 determines if there are other wireless communication devices 100 in proximity to the wireless communication device 100 via NFC. If there are other wireless communication devices 100 in proximity, then the processing proceeds to step S820. If there are not, then the processing proceeds to step S840.

At step S820, the control unit 160 determines if the wireless LAN interface 130 is on. If the wireless LAN (Wi-Fi) interface 130 is on, then the processing proceeds to step S840. If it is not, then the processing proceeds to step S830.

At step S830, the control unit 160 sets the method communication to be used to NFC.

At step S840, the communication method to be used is set to wireless LAN (for example, direct communication mode).

At step S850, the control unit 160 executes data transmission by the set communication method. Then, at step S860, a determination is made on whether the data transmission is complete. If the data transmission is complete, then the processing ends. If it is not, then the processing returns to step S810.

(Formation Processing Using NFC)

Figure 17:
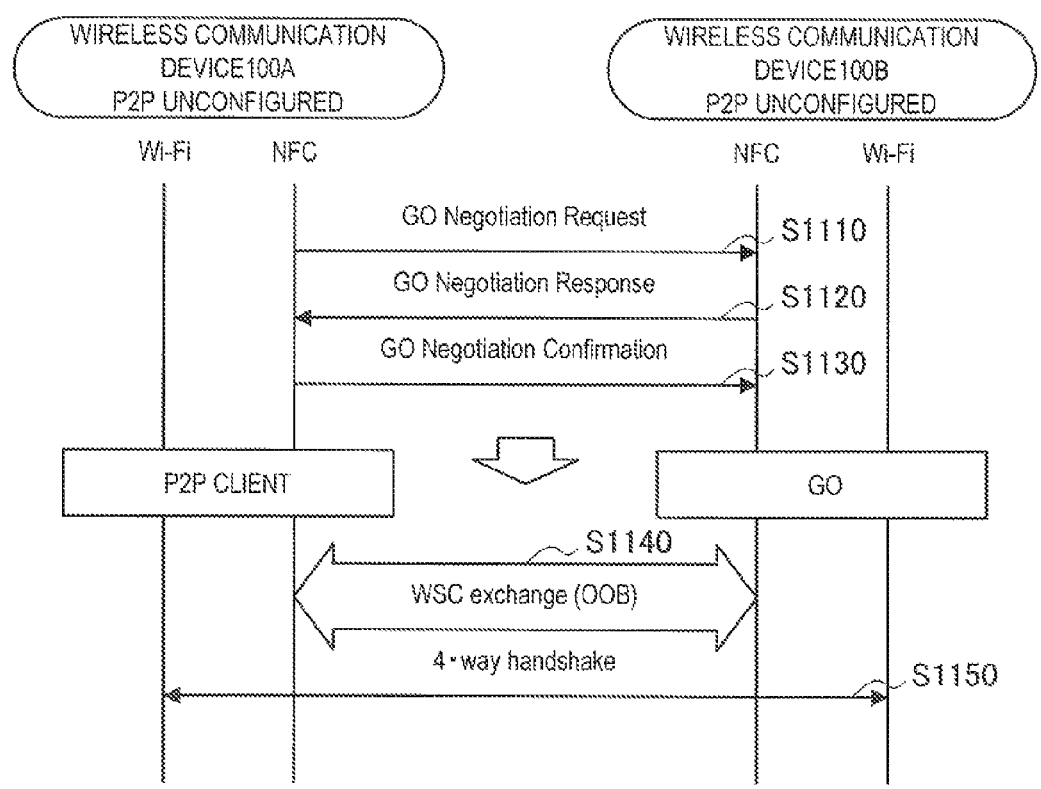
FIG. 17 is a sequence diagram illustrating an example of an overall flow of a formation processing using NFC.

Next, formation processing using NFC will be described. FIG. 17 is a flowchart illustrating an example of an overall flow of formation processing using NFC.

First, the GO Negotiation processing is executed at steps S1110 through S1130. As a result, either the wireless communication device 100A or the wireless communication device 100B is determined as the group owner, and the other device is determined as a P2P client.

Then, at step S1140, WSC exchange (that is to say, WPS processing) is performed in OOB mode. As a result, credentials (SSID, WPA2-PSK, etc.) are common between the wireless communication devices 100, and a wireless LAN connection is established. Details on WSC exchange in OOB mode are disclosed in the WPS specifications (refer to reference literature 2) and the Connection Handover specifications (reference literature 3), and so a detailed description is omitted from this specification. When WSC password information usable during WSC exchanges are transmitted and received in advance, this password information may be used during WSC exchanges. That is to say, WSC exchanges may be performed by the WSC password method. Alternatively, WSC exchanges may be performed by the WSC Push Button Configuration (PBC) method in which password information is not used. The password information is ASCII numeric information dependent on the device.

At step S1150, the wireless communication device 100A and the wireless communication device 100B then execute a 4-way handshake. As a result, encryption keys are common between the wireless communication device 100A and the wireless communication device 100B, and transmitted data is encrypted.

(Provision Discovery Processing Using the NFC Interface 140)

Next, the provision discovery processing using NFC will be described.

Figure 18:
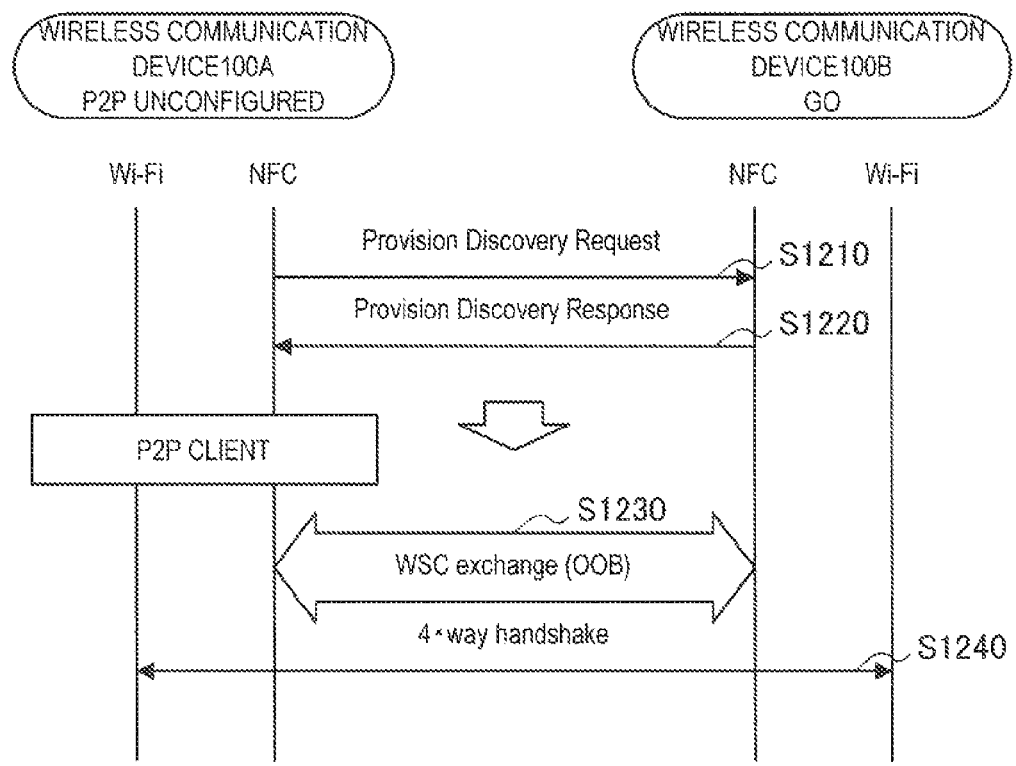
FIG. 18 is a sequence diagram illustrating a first example of an overall flow of a provision discovery processing using NFC.

FIG. 18 is a flowchart illustrating a first example of an overall flow of a provision discovery processing using NFC. The first example is an example of provision processing that starts from a Provision Discovery Request sent from the wireless communication device 100A, which is in the P2P unconfigured state, to the wireless communication device 100B, which is the group owner.

At steps S1210 and S1220, the Provision Discovery Request and Provision Discovery Response are sent. As a result, the wireless communication device 100A becomes a P2P client for the P2P group for which the wireless communication device 100B is the group owner.

Then, at step S1230, WSC exchange (that is to say, WPS processing) is performed in OOB mode. As a result, credentials (SSID, WPA2-PSK, etc.) are common between the wireless communication devices 100, and a wireless LAN connection is established. When WSC password information usable during WSC exchanges are transmitted and received in advance, this password information may be used during WSC exchanges. That is to say, WSC exchanges may be performed by the WSC password method. Alternatively, WSC exchanges may be performed by the WSC Push Button Configuration (PBC) method in which password information is not used. The password information is ASCII numeric information dependent on the device.

At step S1240, the wireless communication device 100A and the wireless communication device 100B then execute a 4-way handshake. As a result, encryption keys are common between the wireless communication device 100A and the wireless communication device 100B, and transmitted data is encrypted.

(Invitation Processing Using the NFC Interface 140)

Next, the invitation processing using NFC will be described.

Figure 19:
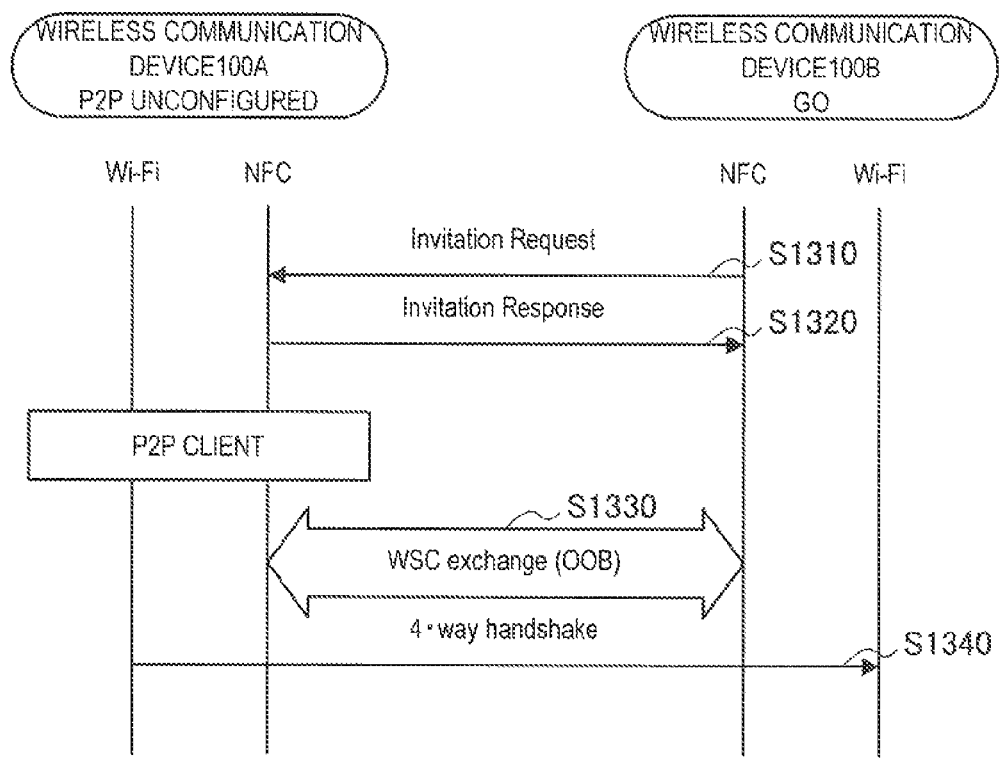
FIG. 19 is a sequence diagram illustrating a second example of an overall flow of an invitation processing using NFC.

FIG. 19 is a flowchart illustrating a second example of an overall flow of an invitation processing using NFC. The second example is an example of invitation processing that starts from an Invitation Request sent from the wireless communication device 100B, which is the group owner, to the wireless communication device 100A, which is in the P2P unconfigured state.

At step S1310, the wireless communication device 100B, which is the group owner, sends an Invitation Request to the wireless communication device 100A, which is in the P2P unconfigured state. In addition, at step S1320, the wireless communication device 100A, which is in the P2P unconfigured state, sends an Invitation Response to the wireless communication device 100B, which is the group owner. As a result, the wireless communication device 100A, which was in the P2P unconfigured state, becomes a P2P client.

Then, at step S1330, WSC exchange (that is to say, WPS processing) is performed in OOB mode. As a result, credentials (SSID, WPA2-PSK, etc.) are common between the wireless communication devices 100, and a wireless LAN connection is established. When WSC password information usable during WSC exchanges are transmitted and received in advance, this password information may be used during WSC exchanges. That is to say, WSC exchanges may be performed by the WSC password method. Alternatively, WSC exchanges may be performed by the WSC Push Button Configuration (PBC) method in which password information is not used. The password information is ASCII numeric information dependent on the device.

At step S1340, the wireless communication device 100A and the wireless communication device 100B then execute a 4-way handshake. As a result, encryption keys are common between the wireless communication device 100A and the wireless communication device 100B, and transmitted data is encrypted.

<<6. Modifications>>

Next, modifications of the present embodiment will be described. More specifically, a modification in which a connection is established between two wireless communication devices by an intermediary third wireless communication device, a modification in which NFC Forum Tags are used, and a modification in which password information is used in WPS processing is used will be described.

<6.1 Establishing Direct Connection Through Intermediary>

First, a modification in which a connection is established between two wireless communication devices by an intermediary third wireless communication device will be described. According to the example of the previously described embodiment, either the wireless communication device 100A or the wireless communication device 100B was carried to be in proximity to the other device. However, there are cases in which both the wireless communication device 100A and the wireless communication device 100B may be difficult for the user to carry due to weight or the installation location. Thus, a modification will be described in which the users uses a portable wireless communication device 100B to connect the wireless communication device 100A and a wireless communication device 100C, which are difficult for the user to carry. More specifically, according to the present modification, the user brings the wireless communication device 100B within proximity to the wireless communication device 100A, and then to the wireless communication device 100C (that is to say, brings the wireless communication device 100B in proximity to two different wireless communication devices 100).

(When Devices have a Direct Connection Function)

First, two examples in which the wireless communication device 100A and the wireless communication device 100B have functions of a direct connection with devices via wireless communication will be described with reference to FIGS. 20A and 20B, and FIGS. 21A and 21B.

Figure 20A:
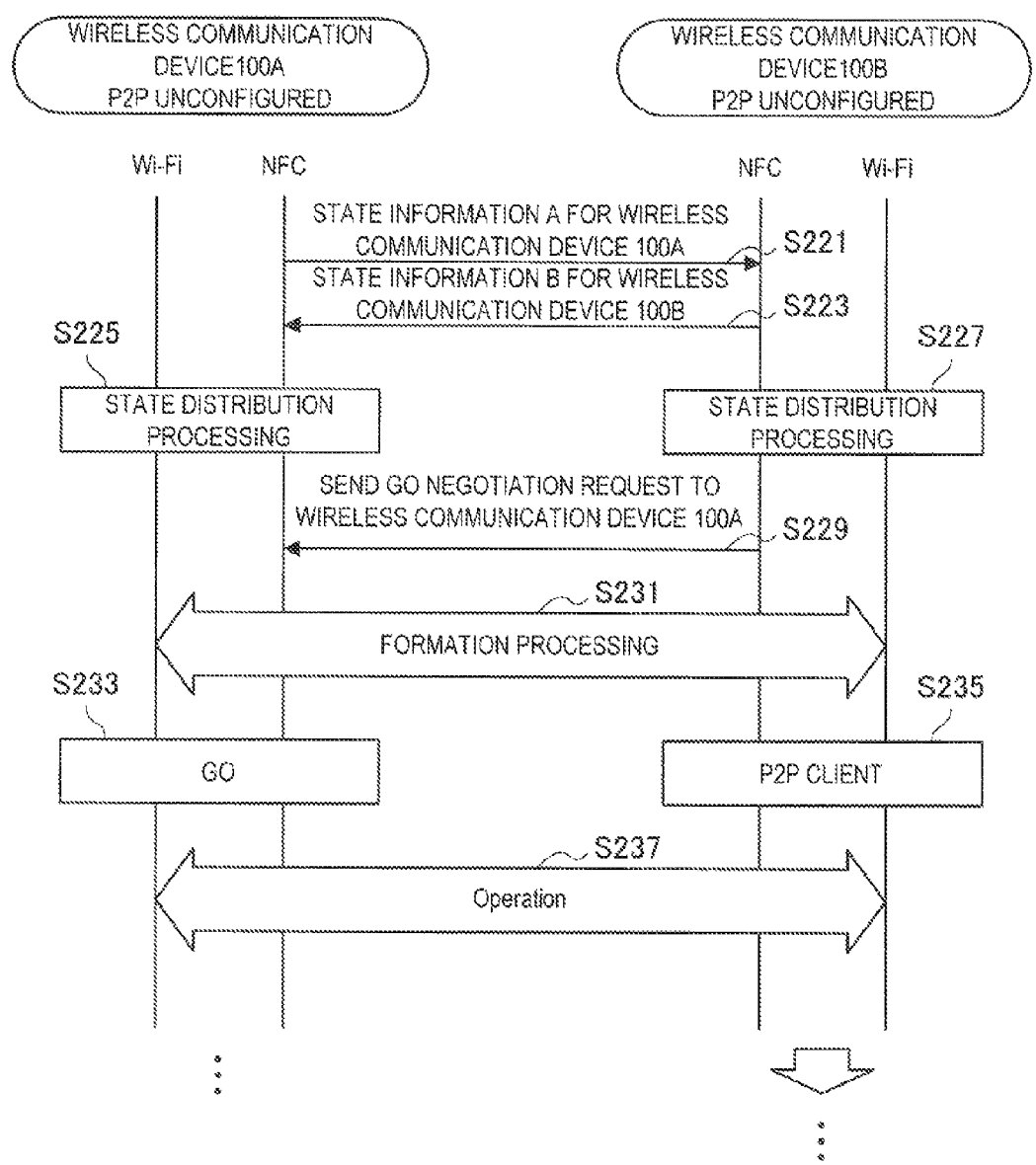
FIG. 20A is a first sequence diagram schematically illustrating a first example of an operation of a wireless communication system according to a modification in which a connection is established between two wireless communication devices by an intermediary third wireless communication device.
Figure 20B:
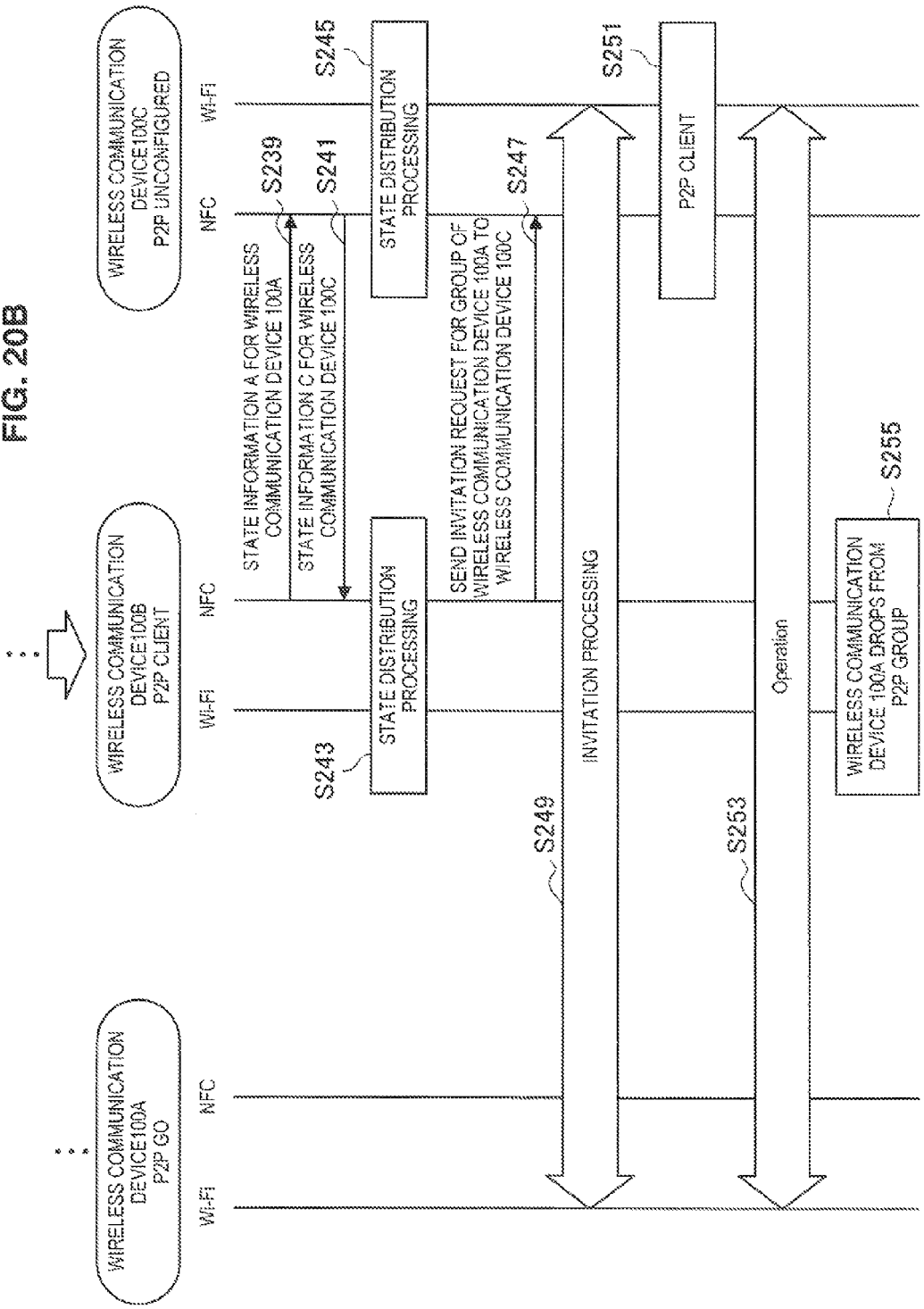
FIG. 20B is a second sequence diagram schematically illustrating a first example of an operation of a wireless communication system according to a modification in which a connection is established between two wireless communication devices by an intermediary third wireless communication device.

FIGS. 20A and 20B are sequence diagrams schematically illustrating a first example of an operation of a wireless communication system according to a modification in which a connection is established between two wireless communication devices by an intermediary third wireless communication device. According to the present modification, the wireless communication device 100B, functioning as an intermediary, establishes direct connections with the wireless communication device 100A and the wireless communication device 100C having functions of a direct connection with devices via wireless communication.

First, the wireless communication device 100A and the wireless communication device 100B share state information via NFC (S221, S223). State information is also shared together with constraint information. Afterwards, the state distribution processing is performed (S225, S227), the wireless communication device 100B sends a GO Negotiation Request to the wireless communication device 100A via NFC (S229), and then the formation processing is performed between the wireless communication device 100A and the wireless communication device 100B (S231). In this case, the wireless communication device 100A is requested to become the group owner during the formation processing by minimizing the GO Intent value (for example, to 0) for the wireless communication device 100B. According to FIG. 20, the formation processing is performed via wireless LAN communication (Wi-Fi), but the formation processing may also be performed via NFC. In addition, the state information B for the wireless communication device 100B is sent to the wireless communication device 100A, but the state information B does not have to be sent.

Afterwards, the wireless communication device 100B shares state information with the wireless communication device 100C via NFC (S239, S241). State information is also shared together with constraint information. In this case, the wireless communication device 100B sends the state information A for the wireless communication device 100A to the wireless communication device 100C. Afterwards, the state distribution processing is performed (S243, S245), the wireless communication device 100B sends an Invitation Request for the P2P group of the wireless communication device 100A to the wireless communication device 100C (S247), and then the invitation processing is performed (S249). As a result, the wireless communication device 100C becomes a P2P client, and a direct connection is established between the wireless communication device 100A and the wireless communication device 100C. According to the example in FIG. 20, after a connection is established between the wireless communication device 100A and the wireless communication device 100C, the wireless communication device 100B drops from the P2P group of the wireless communication device 100A (S255), but the wireless communication device 100B may continue to be connected as a P2P client.

Figure 21A:
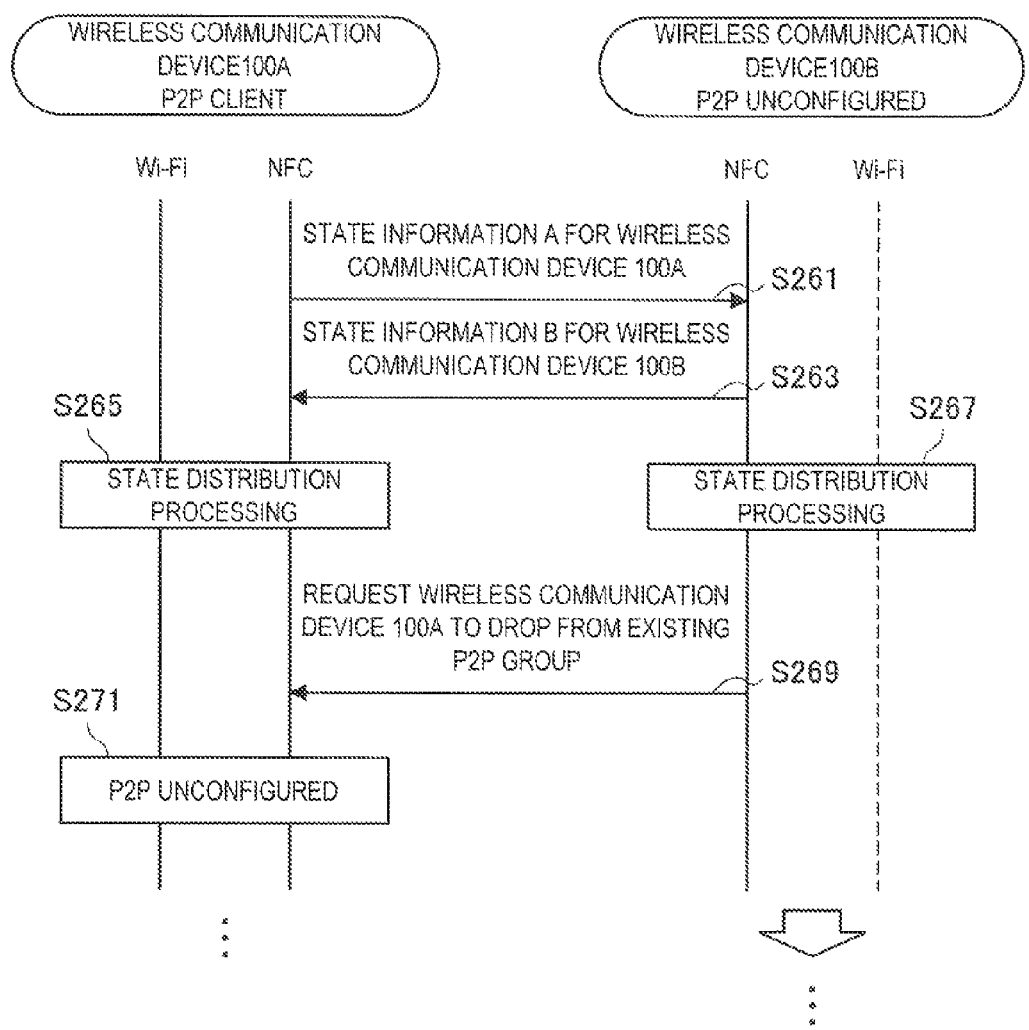
FIG. 21A is a first sequence diagram schematically illustrating a second example of an operation of a wireless communication system according to a modification in which a connection is established between two wireless communication devices by an intermediary third wireless communication device.
Figure 21B:
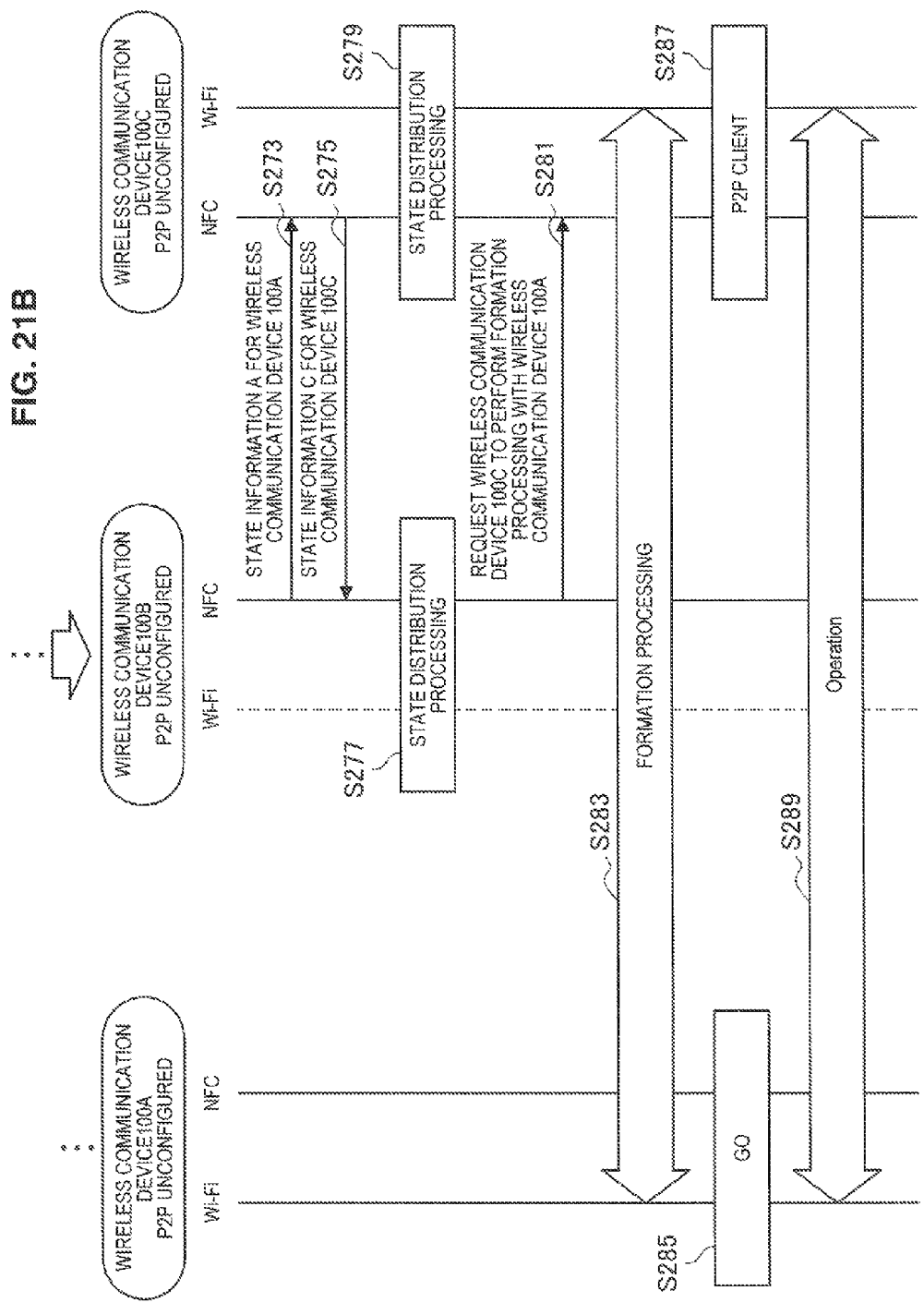
FIG. 21B is a second sequence diagram schematically illustrating a second example of an operation of a wireless communication system according to a modification in which a connection is established between two wireless communication devices by an intermediary third wireless communication device.

Next, FIGS. 21A and 21B are sequence diagrams schematically illustrating a second example of an operation of a wireless communication system according to a modification in which a connection is established between two wireless communication devices by an intermediary third wireless communication device. According to the present modification, the connection between the wireless communication device 100A and the wireless communication device 100C is mediated by using only NFC from the wireless communication device 100B.

First, the wireless communication device 100A and the wireless communication device 100B share state information via NFC (S261, S263). State information is also shared together with constraint information. Afterwards, the state distribution processing is performed (S265, S267), and the wireless communication device 100B request the wireless communication device 100A to drop from the existing P2P group (S269). As a result, the wireless communication device 100A changes to the P2P unconfigured state (S271).

Afterwards, the wireless communication device 100B shares state information with the wireless communication device 100C via NFC (S273, S275). State information together with constraint information is also shared. Then, the state distribution processing is performed (S277, S279), and the wireless communication device 100B requests the wireless communication device 100C to perform the formation processing with the wireless communication device 100A (S281). According to the example in FIG. 21, as a result of the formation processing, the wireless communication device 100A becomes the group owner, the wireless communication device 100C becomes a P2P client, and the connection is established. In addition, as a result of the formation processing, the wireless communication device 100C may become the group owner, and the wireless communication device 100A may become a P2P client.

(When Devices are Legacy Devices)

Next, two examples case in which the wireless communication device 100A and the wireless communication device 100B do not have functions to establish connections directly with devices via wireless communication, which is to say, the wireless communication device 100A and the wireless communication device 100B are legacy devices, will be described with reference to FIGS. 22A and 22B, and FIGS. 23A and 23B.

Figure 22A:
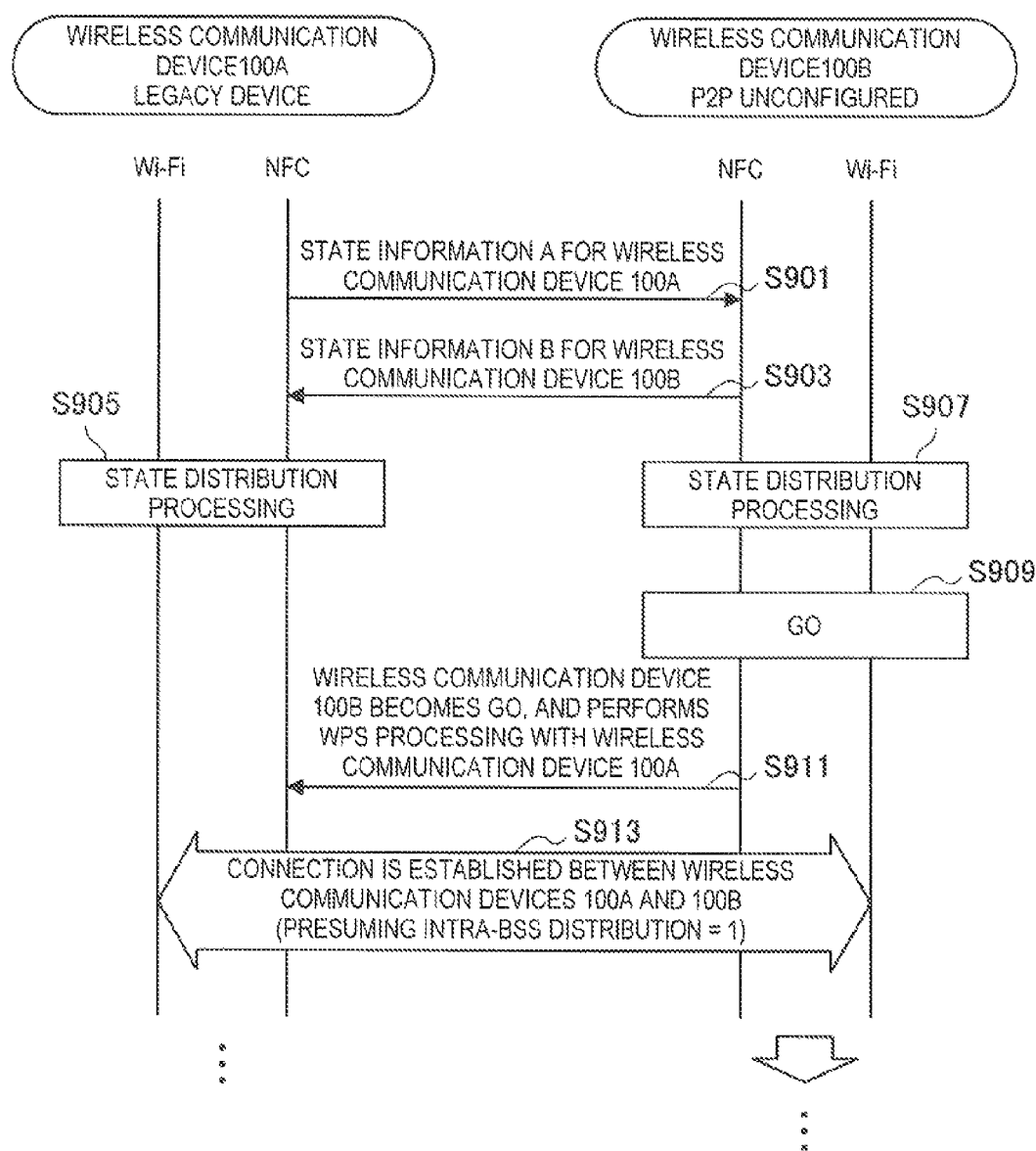
FIG. 22A is a first sequence diagram schematically illustrating a third example of an operation of a wireless communication system according to a modification in which a connection is established between two wireless communication devices by an intermediary third wireless communication device.

FIGS. 22A and 22B are sequence diagrams schematically illustrating a third example of an operation of a wireless communication system according to a modification in which a connection is established between two wireless communication devices by an intermediary third wireless communication device. According to the present modification, the wireless communication device 100B functions as an intermediary to establish separate connections to the wireless communication device 100A and the wireless communication device 100C, which are legacy devices, and transfers data from one device to the other between the wireless communication device 100A and the wireless communication device 100C.

First, the wireless communication device 100A and the wireless communication device 100B share state information via NFC (S901, S903). State information is also shared together with constraint information. Afterwards, the state distribution processing is performed (S905, S907), and the wireless communication device 100B changes the state of the wireless communication device 100B from the P2P unconfigured state to the group owner (S909). Then, the wireless communication device 100B executes the WPS processing with the wireless communication device 100A (S911) to establish a connection between the wireless communication device 100A and the wireless communication device 100B (S913). This presumes that Intra-BSS=1 regarding the wireless communication device 100B. That is to say, the wireless communication device 100B is capable of operating as a terminal equivalent to an access point.

Afterwards, the wireless communication device 100B and the wireless communication device 100C share state information via NFC (S915, S917). State information is also shared together with constraint information. Afterwards, the state distribution processing is performed (S919, S921), the wireless communication device 100B, which is the group owner, executes the WPS processing with the wireless communication device 100C (S923), and a connection is established between the wireless communication device 100B and the wireless communication device 100C. As a result, a connection is established between the wireless communication device 100A and the wireless communication device 100C through the wireless communication device 100B (S925).

Figure 23A:
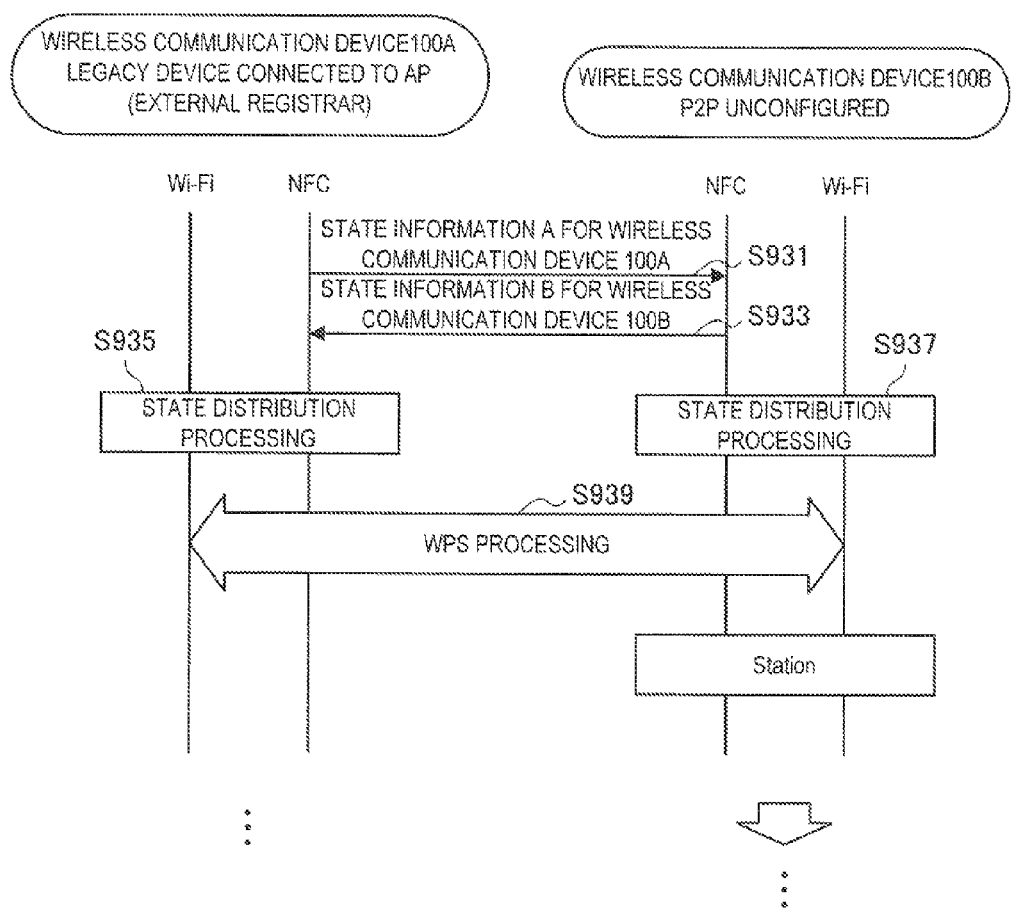
FIG. 23A is a first sequence diagram schematically illustrating a fourth example of an operation of a wireless communication system according to a modification in which a connection is established between two wireless communication devices by an intermediary third wireless communication device.
Figure 23B:
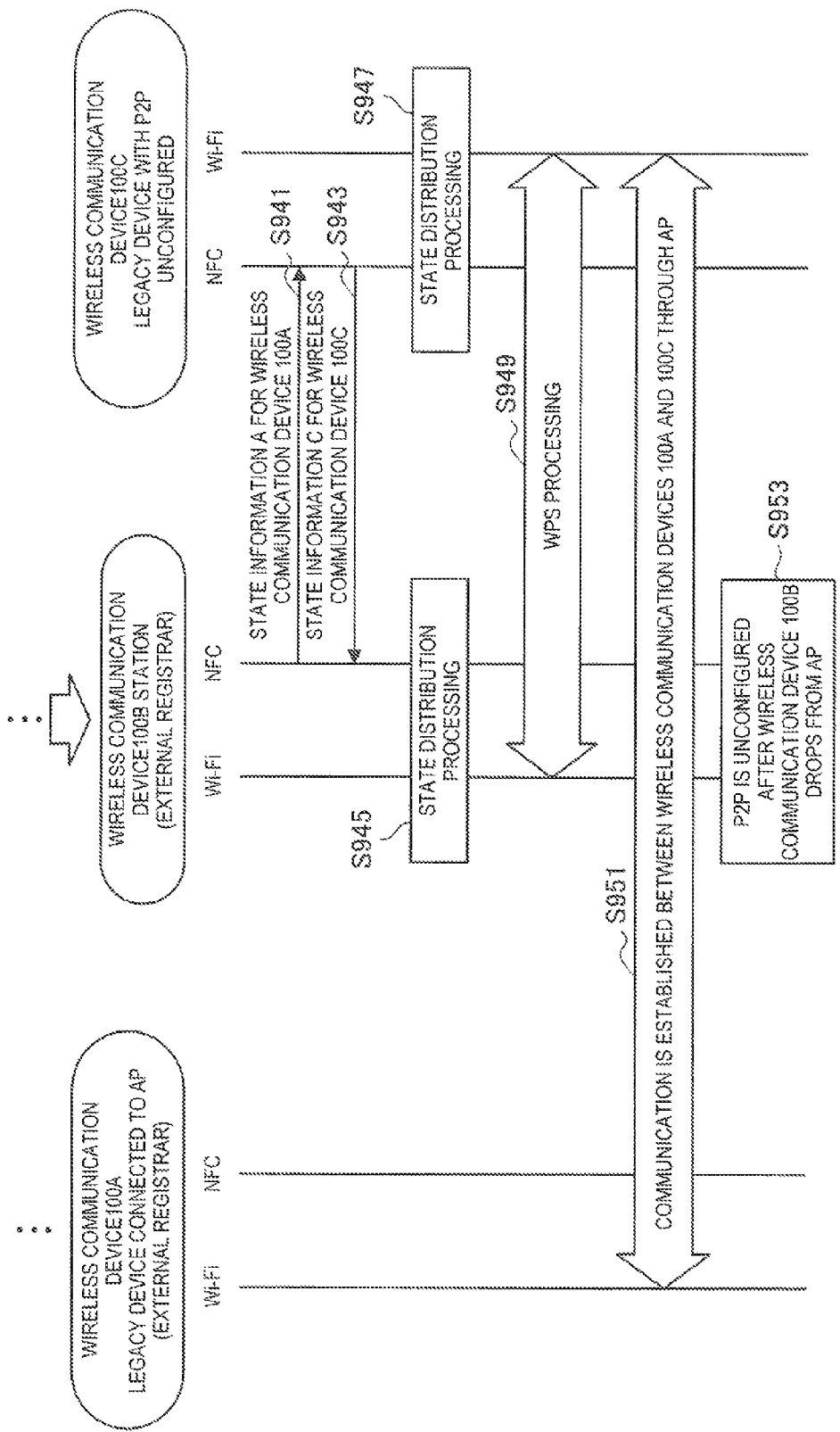
FIG. 23B is a second sequence diagram schematically illustrating a fourth example of an operation of a wireless communication system according to a modification in which a connection is established between two wireless communication devices by an intermediary third wireless communication device.

Next, FIGS. 23A and 23B are sequence diagrams schematically illustrating a fourth example of an operation of a wireless communication system according to a modification in which a connection is established between two wireless communication devices by an intermediary third wireless communication device. According to the present modification, the wireless communication device 100B has an external registrar function and functions as an intermediary to cause the wireless communication device 100A and the wireless communication device 100C, which are legacy devices, to establish a connection with the same access point.

First, the wireless communication device 100A and the wireless communication device 100B share state information via NFC (S931, S933). State information is also shared together with constraint information. Then, the state distribution processing is performed (S935, S937), and the wireless communication device 100B executes the WPS processing with the wireless communication device 100A (S939). That is to say, the wireless communication device 100B performs authentication of the wireless communication device 100A, obtains connection settings information (credentials) for the access point, and shares the connection setting information with the wireless communication device 100A. As a result, the wireless communication device 100A establishes a connection with the access point.

Afterwards, the wireless communication device 100B and the wireless communication device 100C share state information via NFC (S941, S941). Then, the state distribution processing is performed (S945, S947), and the wireless communication device 100B executes the WPS processing with the wireless communication device 100C (S949). As a result, the wireless communication device 100C establishes a connection with the access point. That is to say, a connection is established between the wireless communication device 100A and the wireless communication device 100C through the access point (S951).

According to the example in FIG. 23, after a connection is established between the wireless communication device 100A and the wireless communication device 100C, the wireless communication device 100B drops from the AP (S953), but the wireless communication device 100B may continue to be connected.

<6.2 Establishing Direct Connection Through One-Way Reading Via NFC>

Next, a modification in which a direct connection is established through one-way reading via NFC will be described. More specifically, according to the present modification, one of the wireless communication devices 100 is capable of performing two-way communication via NFC, and the other wireless communication device 100 is capable of performing one-way communication via NFC (that is to say, transmission). As an example, the other wireless communication device 100 is equipped with tags, which are only capable of performing transmission.

First Example

Figure 24:
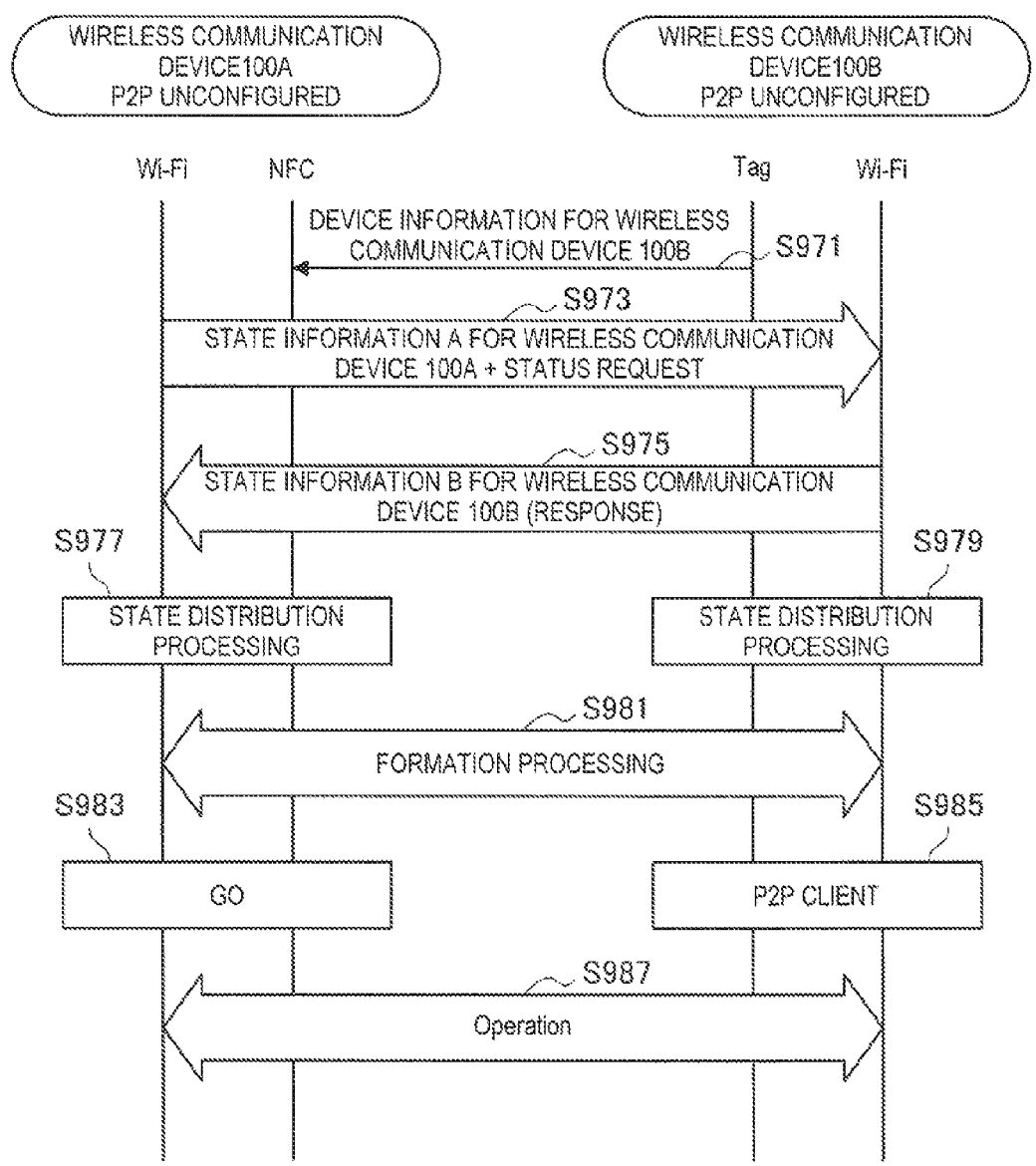
FIG. 24 is a sequence diagram schematically illustrating a first example of an operation of a wireless communication system according to a modification in which a direct connection is established by one-way reading via NFC.

FIG. 24 is a sequence diagram schematically illustrating a first example of an operation of a wireless communication system according to a modification in which a direct connection is established by one-way reading via NFC. According to the present modification, one of the wireless communication devices 100 (for example, the wireless communication device 100B) does not have the NFC interface 140, and instead is provisioned with an NFC Forum Tag that is read-only (hereafter, referred to as "tag"). As an example, a case in which the wireless communication device 100 is in the P2P unconfigured state will be described.

First, the wireless communication device 100A receives device information (P2P device address, etc.) for the wireless communication device 100B from the wireless communication device 100B tag via the NFC interface 140 (S971). Then, the wireless communication device 100A sends the state information A and constraint information A for the wireless communication device 100A to the wireless communication device 100B via the wireless communication interface 130 (S973). This transmission is sent through a probe request, for example.

Then, after receiving the state information A and constraint information A for the wireless communication device 100A via the wireless communication interface 130, the wireless communication device 100B sends the state information B and constraint information B for the wireless communication device 100B to the wireless communication device 100A (S975). This transmission is sent through a probe response, for example. Afterwards, the state distribution processing is performed (S977, S979), the formation processing is performed (S981), and as a result, the wireless communication device 100A becomes the group owner (S983), and the wireless communication device 100B becomes a P2P client (S985).

Then, the wireless communication device 100A and the wireless communication device 100B start direct communication (operation) (S987).

Second Example

Figure 25:
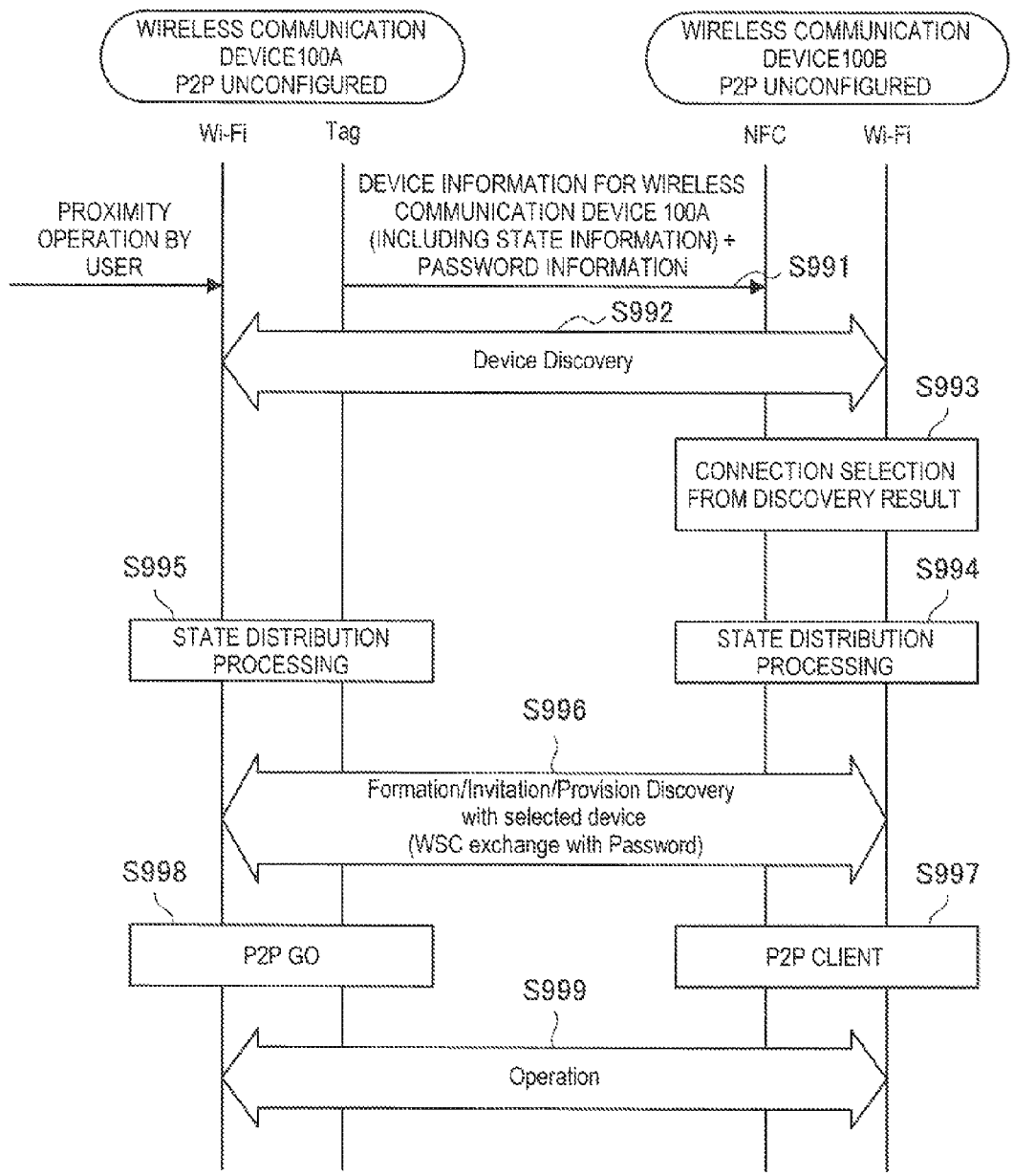
FIG. 25 is a sequence diagram schematically illustrating a second example of an operation of a wireless communication system according to a modification in which a direct connection is established by one-way reading via NFC.

FIG. 25 is a sequence diagram schematically illustrating a second example of an operation of a wireless communication system according to a modification in which a direct connection is established by one-way reading via NFC. According to the present modification, one of the wireless communication devices 100 (for example, the wireless communication device 100A) does not have the NFC interface 140, and instead is provisioned with a tag. As an example, a case in which the wireless communication device 100 is in the P2P unconfigured state will be described.

First, the wireless communication device 100B receives device information for the wireless communication device 100A from the wireless communication device 100A tag and the password information usable with WSC exchange via the NFC interface 140 (S991). The received device information includes at least the MAC address. In addition, the device information includes the state information for the wireless communication device 100A, for example. The received device information may also include other information from information exchanged by device discovery.

Next, the device discovery is performed (S992). As a result, device information is exchanged between the wireless communication device 100A and the wireless communication device 100B. The device information includes the state information, for example. Then, the wireless communication device 100B selects the wireless communication device 100A corresponding to the MAC address previously received via NFC as the connection from among at least one wireless communication device 100 corresponding to received information from at least one device (S993).

Then, the wireless communication device 100A selected as the connection and the wireless communication device 100B execute the state distribution processing (S994, S995), and then execute the formation processing, the invitation processing, or the provision discovery processing (S996). The password previously received via NFC is used during the WSC exchange portion of processing. As a result, the wireless communication device 100B becomes a P2P client (S997), and the wireless communication device 100A becomes the group owner (S998).

Then, the wireless communication device 100A and the wireless communication device 100B start direct communication (operation) (S999).

Session overlap errors typically occur if three or more wireless communication devices 100 execute WSC exchanges by the WSC PBC method at the same timing. However, by previously sharing the password information via NFC and using the WSC password method, this problem may be prevented. This also has a promising advantage for security improvements in preventing man-in-the-middle attacks regarding WSC PBC. If a session overlap error occurs, the WSC exchange typically terminates in error. For this reason, the wireless communication device 100 is not able to continue the connection processing until other surrounding wireless communication devices 100 finish the WSC exchange.

<<7. State Transitions of Wireless Communication Device>>

This concludes the description of the communication control method for establishing connections between the wireless communication devices 100. According to the present communication control method, in particular, when at least one wireless communication device 100 has a function to connect directly with devices via wireless communication, the state of this wireless communication device 100 is changed. That is to say, the state of the wireless communication device 100 transitions. Hereafter, these state transitions will be further described with reference to FIG. 26 through FIG. 35. Further, for ease of understanding, cases in which both the wireless communication device 100A and the wireless communication device 100B have functions to connect directly via wireless communication will be described.

<7.1 Overview of State Transitions>

First, an overview of state transitions of the wireless communication device 100A and the wireless communication device 100B will be described with reference to FIG. 26 and FIG. 27.

Figure 26:
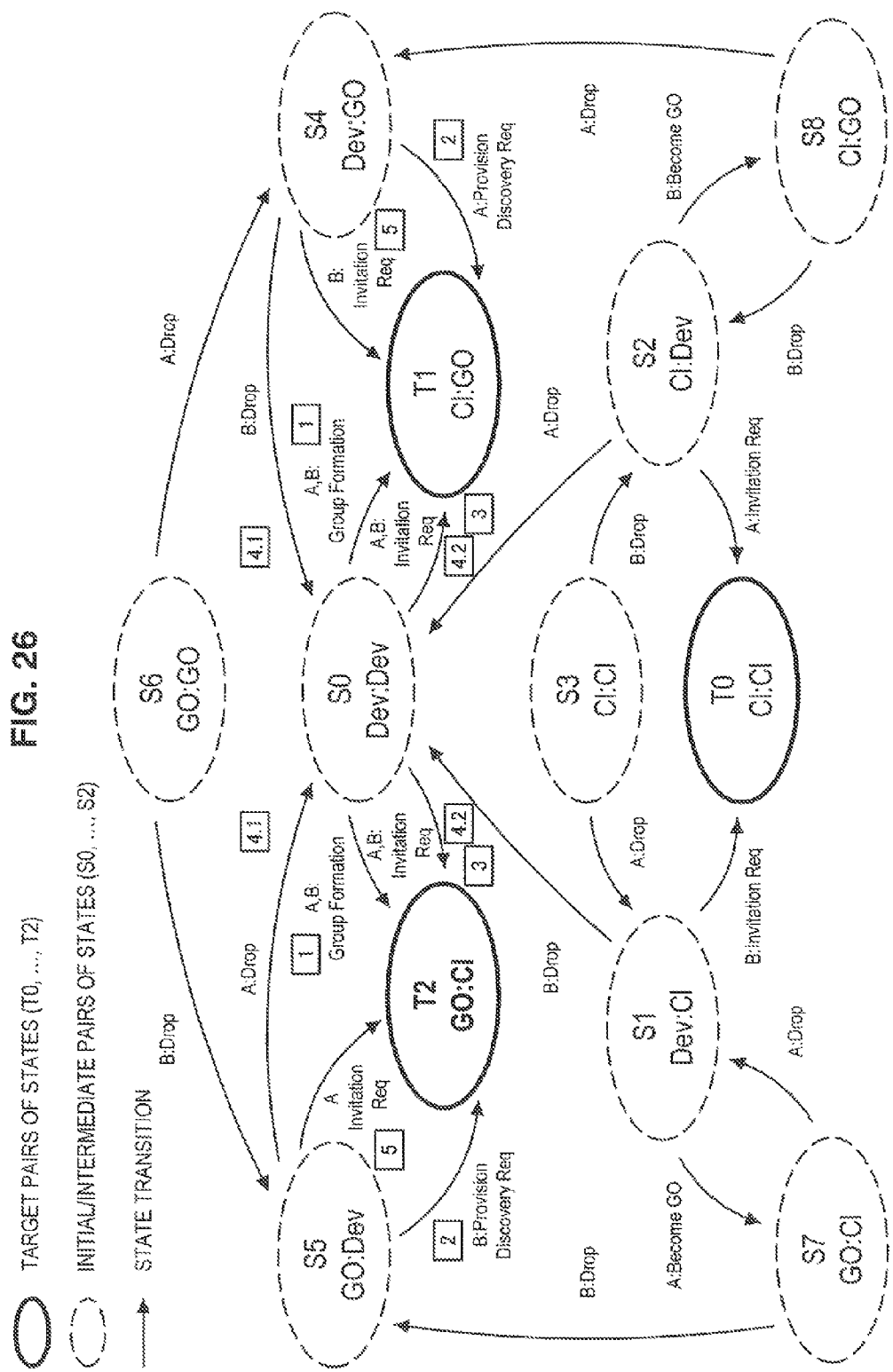
FIG. 26 is a state transition diagram illustrating a first example of state transitions of a wireless communication device and a wireless communication device.

FIG. 26 is a state transition diagram illustrating a first example of state transitions of a wireless communication device 100A and a wireless communication device 100B. Referencing FIG. 26, pairs of the state of the wireless communication device 100A and the state of the wireless communication device 100B are illustrated. These pairs include a target pair (T0-T2), which are the pairs of states when a connection is established between the wireless communication device 100A and the wireless communication device 100B, and initial/intermediate pairs (S0-S8) for states other than those of the target pairs. The states of the wireless communication device 100A and the wireless communication device 100B include any one of the group owner (GO), P2P client (Cl), or P2P unconfigured (Dev).

More specifically, for the target pair T0, the wireless communication device 100A and the wireless communication device 100B are both P2P clients in the same P2P group.

For the target pair T1, the wireless communication device 100A is a P2P client in some P2P group, and the wireless communication device 100B is the group owner for the same P2P group. For the target pair T2, the wireless communication device 100A is the group owner for some P2P group, and the wireless communication device 100B is a P2P client in the same P2P group. That is to say, if the state of the wireless communication device 100A and the state of the wireless communication device 100B correspond to a target pair, this represents that a connection is established between the wireless communication device 100A and the wireless communication device 100B.

For the initial/intermediate pair S0, the wireless communication device 100A and the wireless communication device 100B are in the P2P unconfigured state. For the initial/intermediate pair S1, the wireless communication device 100A is in the P2P unconfigured state, and the wireless communication device 100B is a P2P client in some P2P group. For the initial/intermediate pair S2, the wireless communication device 100A is a P2P client in some P2P group, and the wireless communication device 100B is in the P2P unconfigured state. For the initial/intermediate pair S3, the wireless communication device 100A is P2P client in some P2P group, and the wireless communication device 100B is a P2P client in some other P2P group. Alternatively for the initial/intermediate pair S3, the wireless communication device 100A and the wireless communication device 100B are P2P clients in the same P2P group, but are unable to communicate with each other through the group owner (that is to say, Intra-BSS=0). For the initial/intermediate pair S4, the wireless communication device 100A is in the P2P unconfigured state, and the wireless communication device 100B is the group owner for some P2P group. For the initial/intermediate pair S5, the wireless communication device 100A is the group owner for some P2P group, and the wireless communication device 100B is in the P2P unconfigured state. For the initial/intermediate pair S6, the wireless communication device 100A is the group owner for some P2P group, and the wireless communication device 100B is the group owner for some other P2P group. For the initial/intermediate pair S7, the wireless communication device 100A is the group owner for some P2P group, and the wireless communication device 100B is a P2P client in some other P2P group. For the initial/intermediate pair S8, the wireless communication device 100A is a P2P client in some P2P group, and the wireless communication device 100B is the group owner for some other P2P group.

As illustrated in FIG. 26, the arrows positioned between pairs are candidate state transitions. In addition, specific processing for the state transition is illustrated in conjunction with the arrows. For example, a drop by the wireless communication device 100B is displayed as the processing to transition states from the initial/intermediate pair S6 to the initial/intermediate pair S5. An Invitation Request by the wireless communication device 100A (that is to say, the invitation processing) is displayed as the processing to transition states from the initial/intermediate pair S5 to the target pair T2.

A connection is established between the wireless communication device 100A and the wireless communication device 100B by such state transitions of the wireless communication device 100A and the wireless communication device 100B. In addition, FIG. 26 corresponds to Table 1 previously described.

Figure 27:
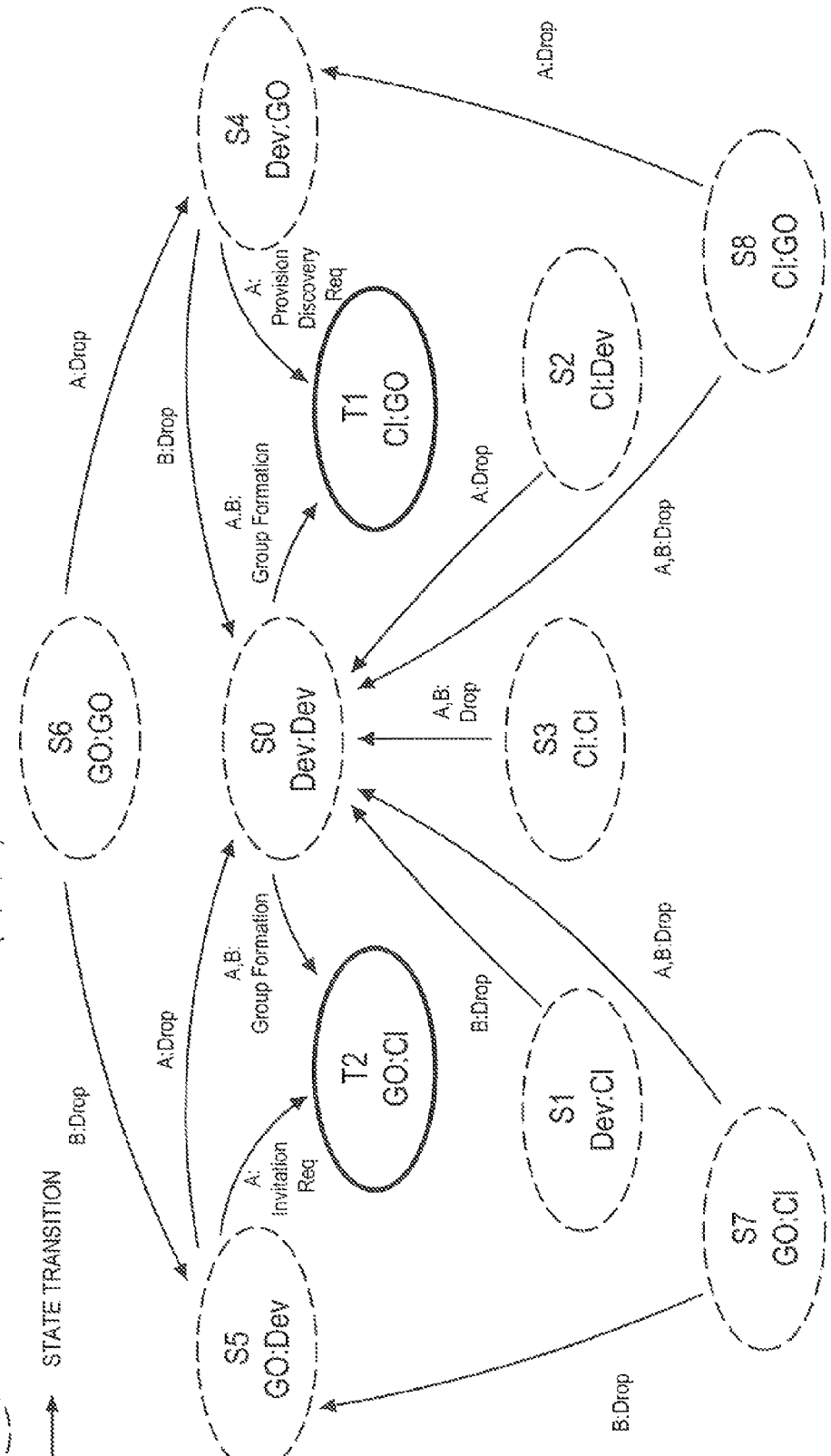
FIG. 27 is a state transition diagram illustrating a second example of state transitions of a wireless communication device and a wireless communication device.

FIG. 27 is a state transition diagram illustrating a second example of state transitions of the wireless communication device 100A and the wireless communication device 100B. The examples of state transitions illustrated in FIG. 27 do not include the target pair T0 from the target pairs in FIG. 26. That is to say, according to these examples, either the wireless communication device 100A or the wireless communication device 100B becomes the group owner for some existing P2P group and the other becomes a P2P client in the same P2P group. As a result, a direct connection is established between the wireless communication device 100A and the wireless communication device 100B.

The processing for each state transition in FIG. 27 is summarized as follows. The following table is a representation of when the wireless communication device 100A is controlled.

TABLE 2

| Wireless communication device 100A | Wireless communication device 100B | Target pair | |
|---|---|---|---|
| | | GO:Cl | Cl:GO |
| Dev | Dev | 1. Formation processing | 1. Formation processing |
| | GO | 1. Device A drops device B<br>2. Formation processing | 1. Device A sends Provision Discovery Request to device B |
| | Cl | 1. Device A drops device B<br>2. Formation processing | 1. Device A drops device B<br>2. Formation processing |
| GO | Dev | 1. Device A sends Invitation Request to device B | 1. Device A drops device A<br>2. Formation processing |
| | GO | 1. Device A drops device B<br>2. Device A sends Invitation Request to device B<br>However, only the Invitation Request if Concurrent Operation is possible | 1. Device A drops device A<br>2. Device A sends Provision Discovery Request to device B<br>However, only Provision Discovery Request if Concurrent Operation is possible |
| | Cl | 1. Device A drops device B<br>2. Device A sends Invitation Request to device B<br>However, no processing if in the same group | 1. Device A drops device A and device B<br>2. Formation processing |
| Cl | Dev | 1. Device A drops device A<br>2. Formation processing | 1. Device A drops device A<br>2. Formation processing |
| | GO | 1. Device A drops device A and device B | 1. Device A drops device A<br>2. Device A sends Provision |

TABLE 2-continued

| Wireless communication device | Wireless communication device | Target pair | |
|---|---|---|---|
| 100A | 100B | GO:Cl | Cl:GO |
| | | 2. Formation processing | Discovery Request to device B However, no processing if in the same group |
| | Cl | 1. Device A drops device A and device B<br>2. Formation processing | 1. Device A drops device A and device B<br>2. Formation processing |

<7.2 Flow of Processing with Focus on State Transitions>

Next, the flow of processing to change the states of the wireless communication device 100A and the wireless communication device 100B to the target pair as illustrated in the previously described state transition diagrams will be described with reference to FIG. 28 through FIG. 32.

(General Processing Flow)

Figure 28:
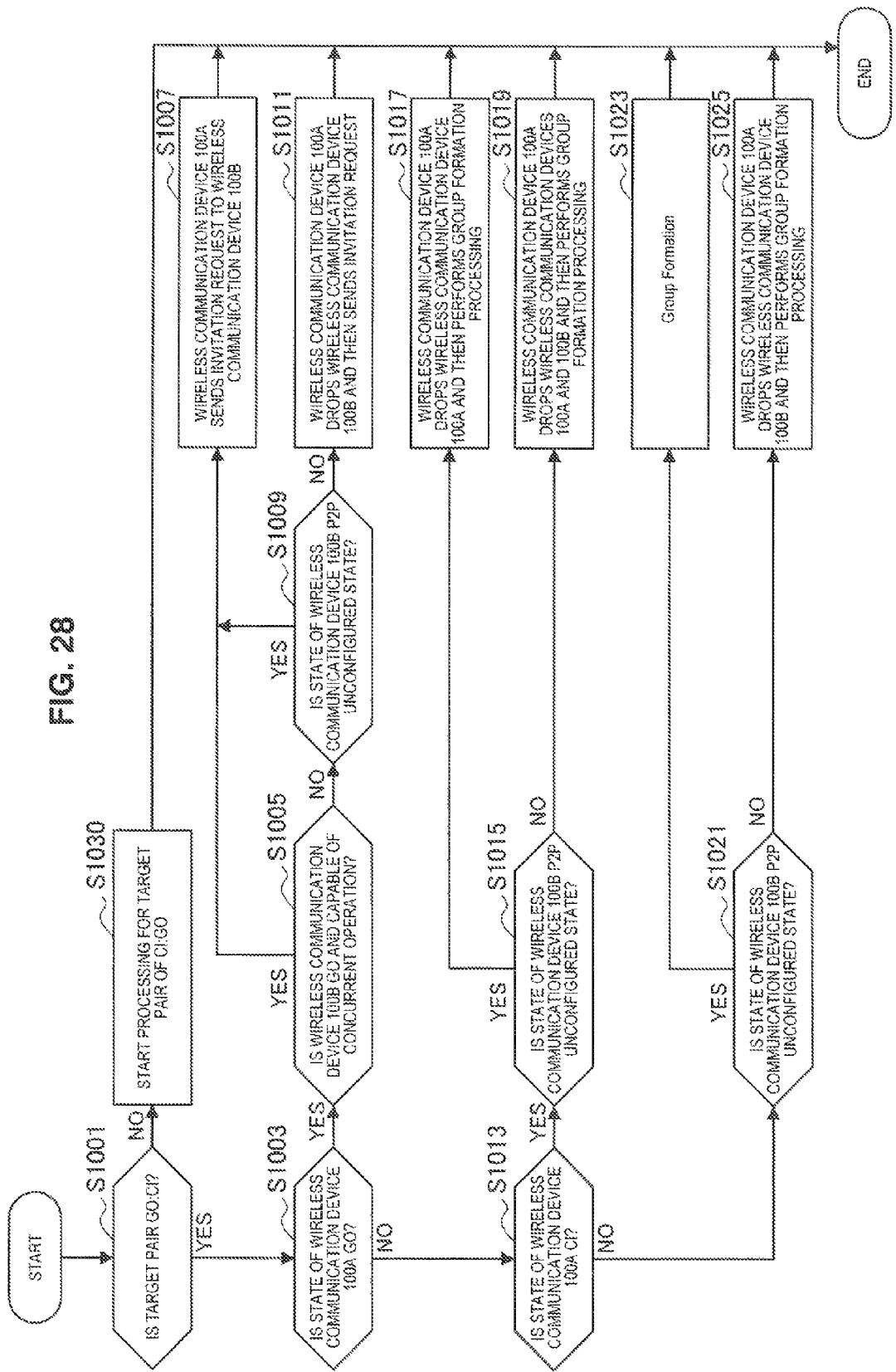
FIG. 28 is a first flowchart illustrating an example flow of a processing for changing the states of two wireless communication devices to a target pair.
Figure 29:
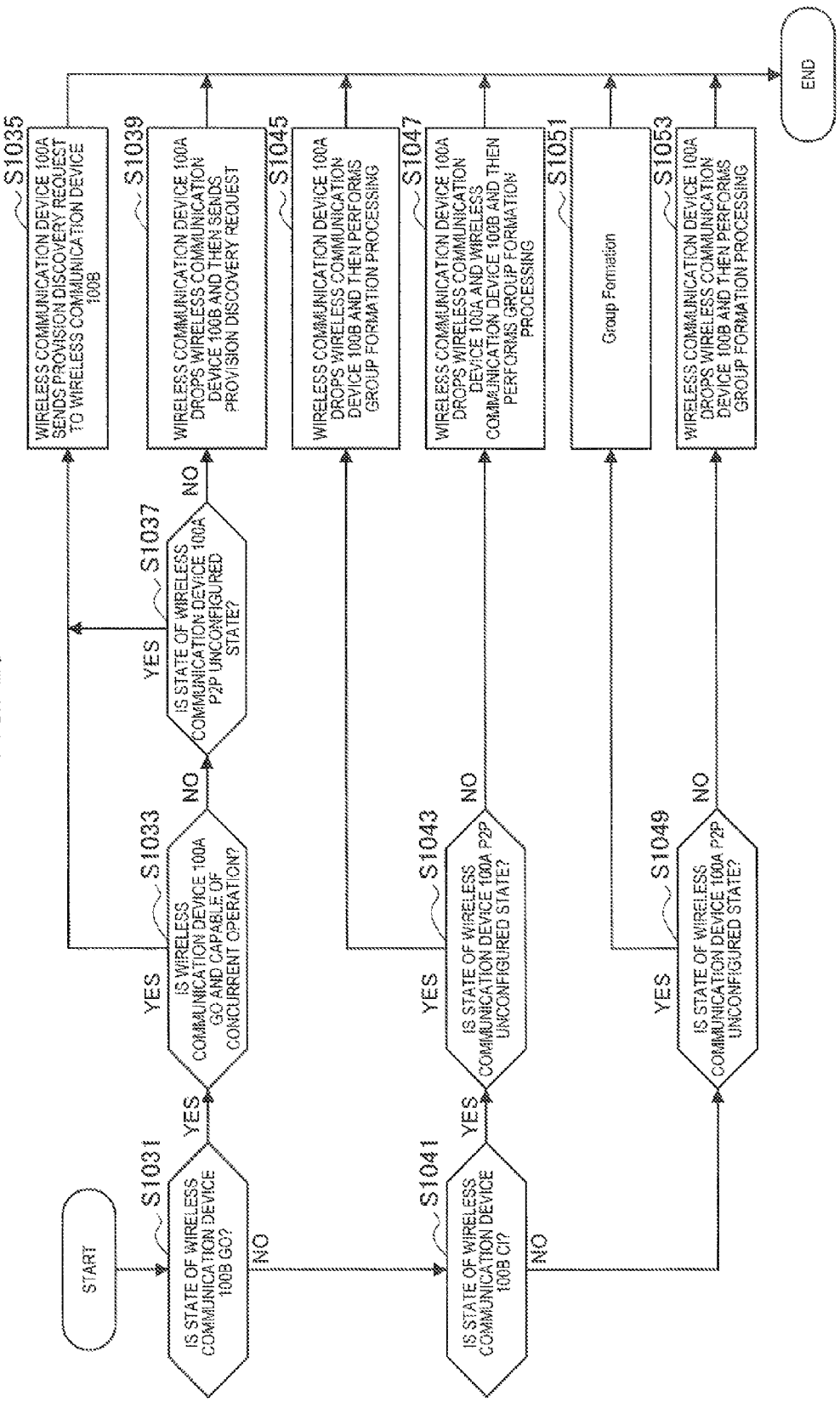
FIG. 29 is a second flowchart illustrating an example flow of a processing for changing the states of two wireless communication devices to a target pair.

First, an example of processing to change the states of the wireless communication device 100A and the wireless communication device 100B to the target pair will be described with reference to FIGS. 28 and 29. FIG. 28 is a first flowchart illustrating an example of a processing flow to change the states of the wireless communication device 100A and the wireless communication device 100B to the target pair.

First, at step S1001, a determination is made on whether the target pair of the state of the wireless communication device 100A and the state of the wireless communication device 100B is such that the wireless communication device 100A is in the group owner state, and the wireless communication device 100B is in the P2P client state. If the determination result is true (Yes), then the processing proceeds to step S1003. If it is not, then the processing proceeds to step S1030. Step S1030 will be described later with reference to FIG. 29.

At step S1003, a determination is made on whether the state of the wireless communication device 100A is the group owner state. If the state of the wireless communication device 100A is the group owner state, then the processing proceeds to step S1005. If it is not, then the processing proceeds to step S1013.

At step S1005, a determination is made on whether the state of the wireless communication device 100B is the group owner state, and that the wireless communication device 100B is capable of concurrent operation. If the determination result is true (Yes), then the processing proceeds to step S1007. If it is not, then the processing proceeds to step S1009.

At step S1007, the wireless communication device 100A sends an Invitation Request to the wireless communication device 100B. The invitation processing is executed by this Invitation Request. As a result, the wireless communication device 100B becomes a P2P client of the P2P group for which the wireless communication device 100A is the group owner. Then, the processing finishes.

At step S1009, a determination is made on whether the state of the wireless communication device 100B is the P2P unconfigured state. If the state of the wireless communication device 100A is the P2P unconfigured state, then the processing proceeds to step S1007. If it is not, then the processing proceeds to step S1011.

At step S1011, the wireless communication device 100A drops the wireless communication device 100B, and then sends an Invitation Request to the wireless communication device 100B. The invitation processing is executed by this Invitation Request. As a result, as a result, the wireless communication device 100B becomes a P2P client of the P2P group for which the wireless communication device 100A is the group owner. Then, the processing finishes.

At step S1013, a determination is made on whether the state of the line communication device 100A is the P2P client state. If the state of the wireless communication device 100A is the P2P client state, then the processing proceeds to step S1015. If it is not, then the processing proceeds to step S1021.

At step S1015, a determination is made on whether the state of the wireless communication device 100B is the P2P unconfigured state. If the state of the wireless communication device 100A is the P2P unconfigured state, then the processing proceeds to step S1017. If it is not, then the processing proceeds to step S1019.

At step S1017, the wireless communication device 100A drops, and then executes the formation processing with the wireless communication device 100B. As a result, the wireless communication device 100A becomes the group owner for the newly formed P2P group, and the wireless communication device 100B becomes a P2P client in this P2P group. Then, the processing finishes.

At step S1019, the wireless communication device 100A drops, then drops the wireless communication device 100B, and then executes the formation processing with the wireless communication device 100B. As a result, the wireless communication device 100A becomes the group owner for the newly formed P2P group, and the wireless communication device 100B becomes a P2P client in this P2P group. Then, the processing finishes.

At step S1021, a determination is made on whether the state of the wireless communication device 100B is the P2P unconfigured state. If the state of the wireless communication device 100B is the P2P unconfigured state, then the processing proceeds to step S1023. If it is not, then the processing proceeds to step S1025.

At step S1023, the wireless communication device 100A executes the formation processing with the wireless communication device 100B. As a result, the wireless communication device 100A becomes the group owner for the newly formed P2P group, and the wireless communication device 100B becomes a P2P client in this P2P group. Then, the processing finishes.

At step S1025, the wireless communication device drops the wireless communication device 100B, and then executes the formation processing with the wireless communication device 100B. As a result, the wireless communication device 100A becomes the group owner for the newly formed P2P group, and the wireless communication device 100B becomes a P2P client in this P2P group. Then, the processing finishes.

Next, the processing of step S1030 in FIG. 28 will be described with reference to FIG. 29. FIG. 29 is a second flowchart illustrating an example of a processing flow to change the states of the wireless communication device 100A and the wireless communication device 100B to the target pair will be described.

First, at step S1031, a determination is made on whether the state of the wireless communication device 100B is the group owner state. If the state of the wireless communication device 100B is the group owner state, then the processing proceeds to step S1033. If it is not, then the processing proceeds to step S1014.

At step S1033, a determination is made on whether the state of the wireless communication device 100A is the group owner state, and that the wireless communication device 100A is capable of concurrent operation. If the determination result is true (Yes), then the processing proceeds to step S1035. If it is not, then the processing proceeds to step S1037.

At step S1035, the wireless communication device 100A sends the Provision Discovery Request to the wireless communication device 100B. The provision discovery processing is executed by this Provision Discovery Request. As a result, the wireless communication device 100A becomes a P2P client of the P2P group for which the wireless communication device 100B is the group owner. Then, the processing finishes.

At step S1037, a determination is made on whether the state of the wireless communication device 100A is the P2P unconfigured state. If the state of the wireless communication device 100A is the P2P unconfigured state, then the processing proceeds to step S1035. If it is not, then the processing proceeds to step S1039.

At step S1039, the wireless communication device 100A drops, and further sends the Provision Discovery Request to the wireless communication device 100B. The provision discovery processing is executed by this Provision Discovery Request. As a result, the wireless communication device 100A becomes a P2P client of the P2P group for which the wireless communication device 100B is the group owner. Then, the processing finishes.

At step S1041, a determination is made on whether the state of the wireless communication device 100B is the P2P client state. If the state of the wireless communication device 100B is the P2P client state, then the processing proceeds to step S1043. If it is not, then the processing proceeds to step S1049.

At step S1043, a determination is made on whether the state of the wireless communication device 100A is the P2P unconfigured state. If the state of the wireless communication device 100A is the P2P unconfigured state, then the processing proceeds to step S1045. If it is not, then the processing proceeds to step S1047.

At step S1045, the wireless communication device drops the wireless communication device 100B, and then executes the formation processing with the wireless communication device 100B. As a result, the wireless communication device 100B becomes the group owner for the newly formed P2P group, and the wireless communication device 100A becomes a P2P client in this P2P group. Then, the processing finishes.

At step S1047, the wireless communication device 100A drops, then drops the wireless communication device 100B, and then executes the formation processing with the wireless communication device 100B. As a result, the wireless communication device 100B becomes the group owner for the newly formed P2P group, and the wireless communication device 100A becomes a P2P client in this P2P group. Then, the processing finishes.

At step S1049, a determination is made on whether the state of the wireless communication device 100A is the P2P unconfigured state. If the state of the wireless communication device 100A is the P2P unconfigured state, then the processing proceeds to step S1051. If it is not, then the processing proceeds to step S1053.

At step S1051, the wireless communication device 100A executes the formation processing with the wireless communication device 100B. As a result, the wireless communication device 100B becomes the group owner for the newly formed P2P group, and the wireless communication device 100A becomes a P2P client in this P2P group. Then, the processing finishes.

At step S1053, the wireless communication device drops the wireless communication device 100B, and then executes the formation processing with the wireless communication device 100B. As a result, the wireless communication device 100B becomes the group owner for the newly formed P2P group, and the wireless communication device 100A becomes a P2P client in this P2P group. Then, the processing finishes.

Specific Example of Processing

Next, a specific example of processing to change the states of the wireless communication device 100A and the wireless communication device 100B to the target pair will be described with reference to FIG. 30 and FIG. 31.

FIG. 30 is a sequence diagram illustrating a first specific example of a processing to change the states of the wireless communication device 100A and the wireless communication device 100B to the target pair. According to the first specific example, the wireless communication device 100A is the group owner for some P2P group, and the wireless communication device 100B is a P2P client in some other group. After the state transition, the wireless communication device 100A becomes the group owner for some P2P group, and the wireless communication device 100B becomes a P2P client in the same group.

First, the wireless communication device 100A and the wireless communication device 100B share state information via NFC (S1201, S1203). State information is also shared together with constraint information. Then, the wireless communication device 100A performs the state distribution processing (S1205). For the state distribution processing, a determination is made on whether the wireless communication device 100A may be designated as the group owner of some P2P group, and whether the wireless communication device 100B may be designated as a P2P client in the same group. Afterwards, the wireless communication device 100A requests itself to be dropped (S1207), and then changes to the P2P unconfigured state (S1209).

In addition, the wireless communication device 100A drops the wireless communication device 100B by requesting the wireless communication device 100B to be dropped (S1211). Afterwards, the wireless communication device 100B notifies the wireless communication device 100A if the drop was successful or not (S1213). If the drop was successful, the wireless communication device 100B changes to the P2P unconfigured state (S1215). Further, the wireless communication device 100A may separately confirm that the state of the wireless communication device 100B changed properly.

The wireless communication device 100A then sends a GO Negotiation Request to the wireless terminal device 100B (S1217) to execute the formation processing with the wireless terminal device 100B (S1219). A high GO Intent Value is set for the wireless communication device 100A in the GO Negotiation Request. As a result, the wireless communication device 100A becomes the group owner (S1221), and the wireless communication device 100B becomes a P2P client (S1223).

The GO Intent Value may also be set high for the wireless communication device 100B, and so a request may be made to lower the GO Intent Value in a Disconnect Request sent to the wireless communication device 100B. As a result, this enables group owner conflicts to be prevented.

FIG. 31 is a sequence diagram illustrating a second specific example of a processing to change the states of the wireless communication device 100A and the wireless communication device 100B to the target pair. For the second specific example, the states of the wireless communication device 100A and the wireless communication device 100B are changed to the target pair by multiple repetitions of the state distribution processing.

First, the wireless communication device 100A and the wireless communication device 100B share state information via NFC (S1231, S1233). State information is also shared together with constraint information. Then, the wireless communication device 100A performs the first state distribution processing (S1235). For this state distribution processing, a determination is made on whether the wireless communication device 100A and the wireless communication device 100B may be designated to the P2P unconfigured state.

Afterwards, the wireless communication device 100A requests itself to be dropped and so drops (S1237), and then changes to the P2P unconfigured state (S1239). In addition, the wireless communication device 100A drops the wireless communication device 100B by requesting the wireless communication device 100B to drop (S1241). Afterwards, the wireless communication device 100B notifies the wireless communication device 100A if the drop was successful or not (S1243). If the drop was successful, the wireless communication device 100B changes to the P2P unconfigured state (S1245).

Then, the wireless communication device 100A performs the second state distribution processing (S1247). After one state transition is complete, the state distribution processing is performed again in this way, for example. For the state distribution processing, a determination is made on whether the wireless communication device 100A may be designated as the group owner of some group, and whether the wireless communication device 100B may be designated as a P2P client in the same group.

Then, the wireless communication device 100A then sends a GO Negotiation Request to the wireless terminal device 100B (S1249) to execute the formation processing with the wireless terminal device 100B (S1251). A high GO Intent Value is set for the wireless communication device 100A in the GO Negotiation Request. As a result, the wireless communication device 100A becomes the group owner (S1253), and the wireless communication device 100B becomes a P2P client (S1255).

<7.3 Flow of More Generic Processing>

Figure 33A:
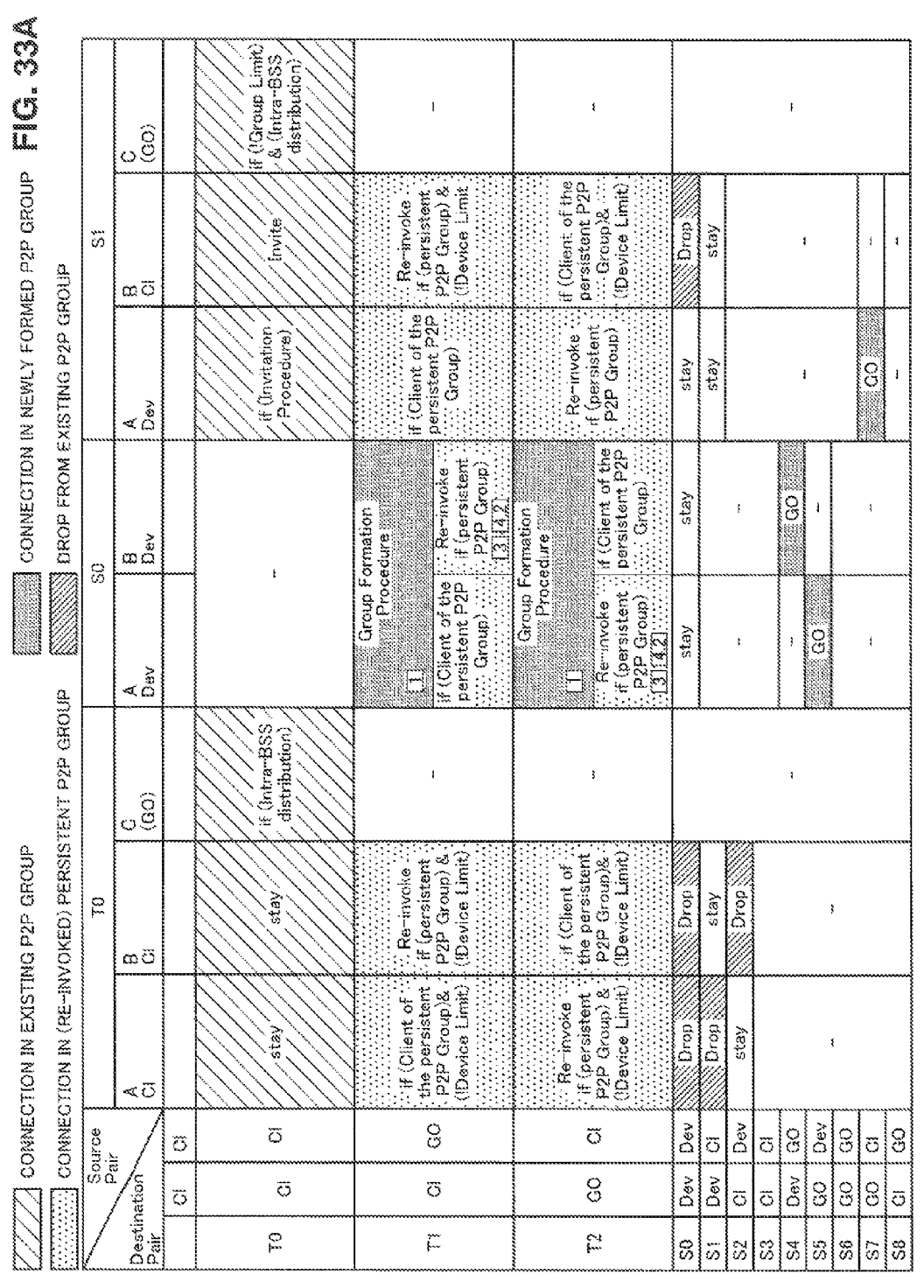
Figure 33B:
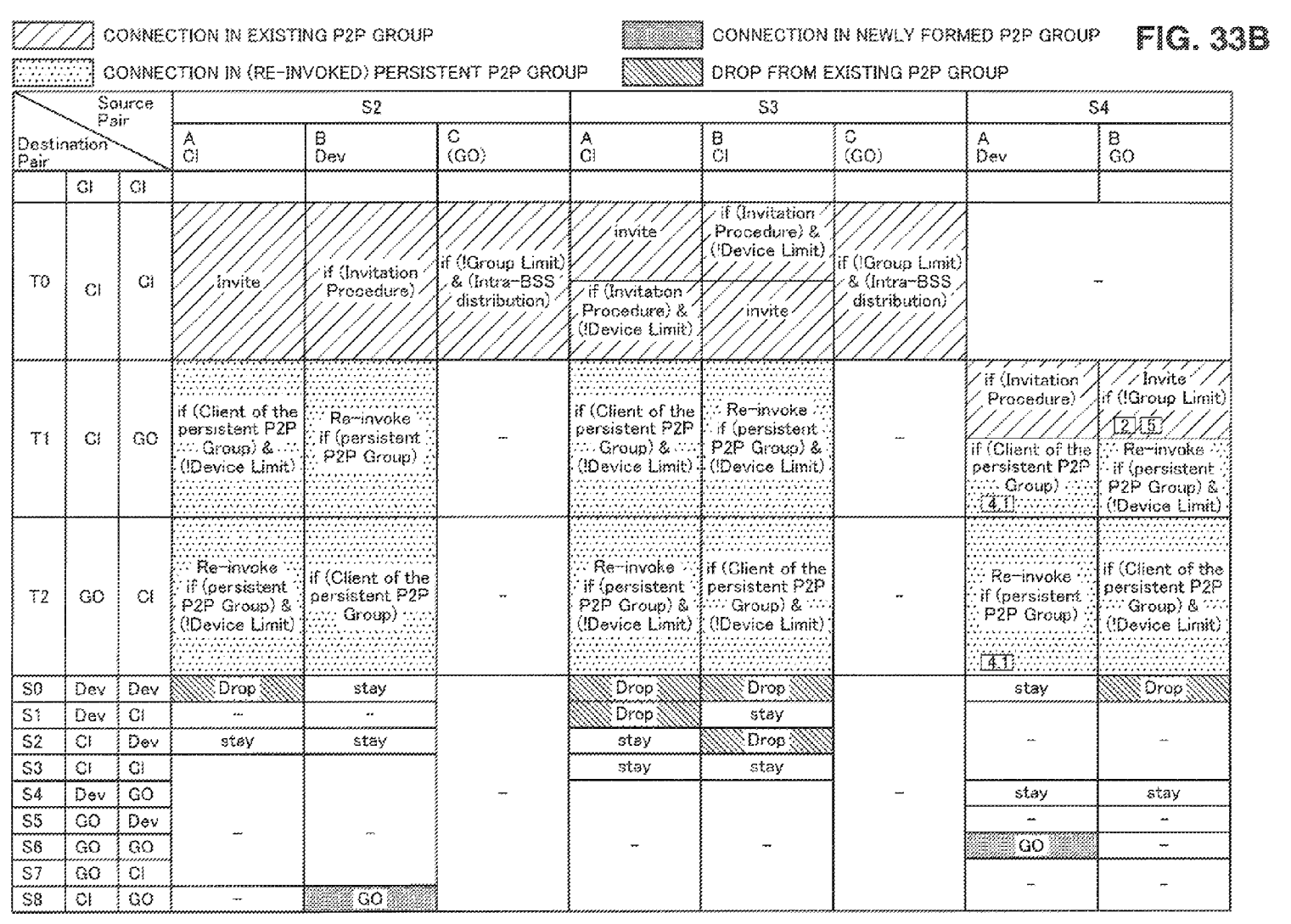
Figure 33C:
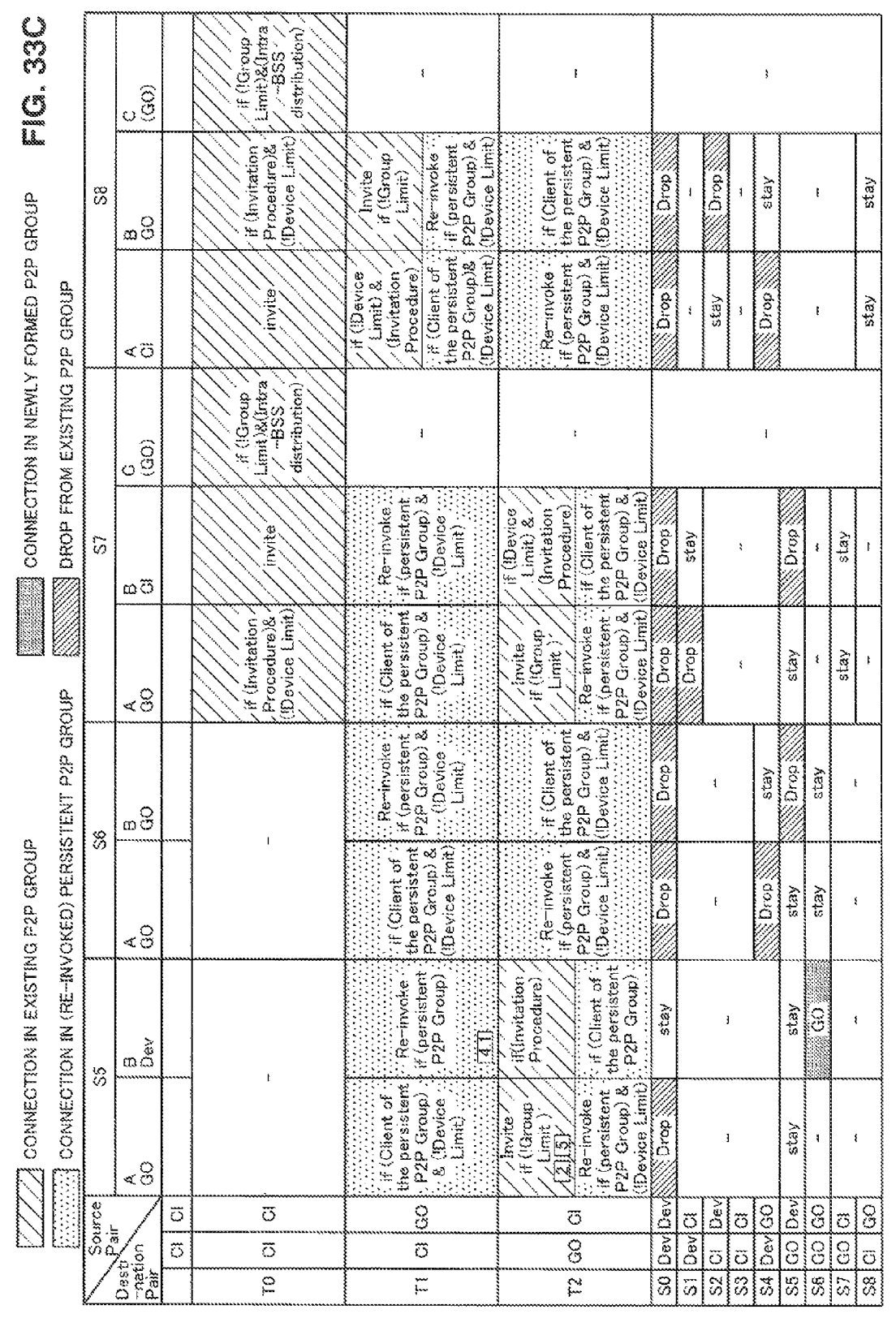
Figure 34:
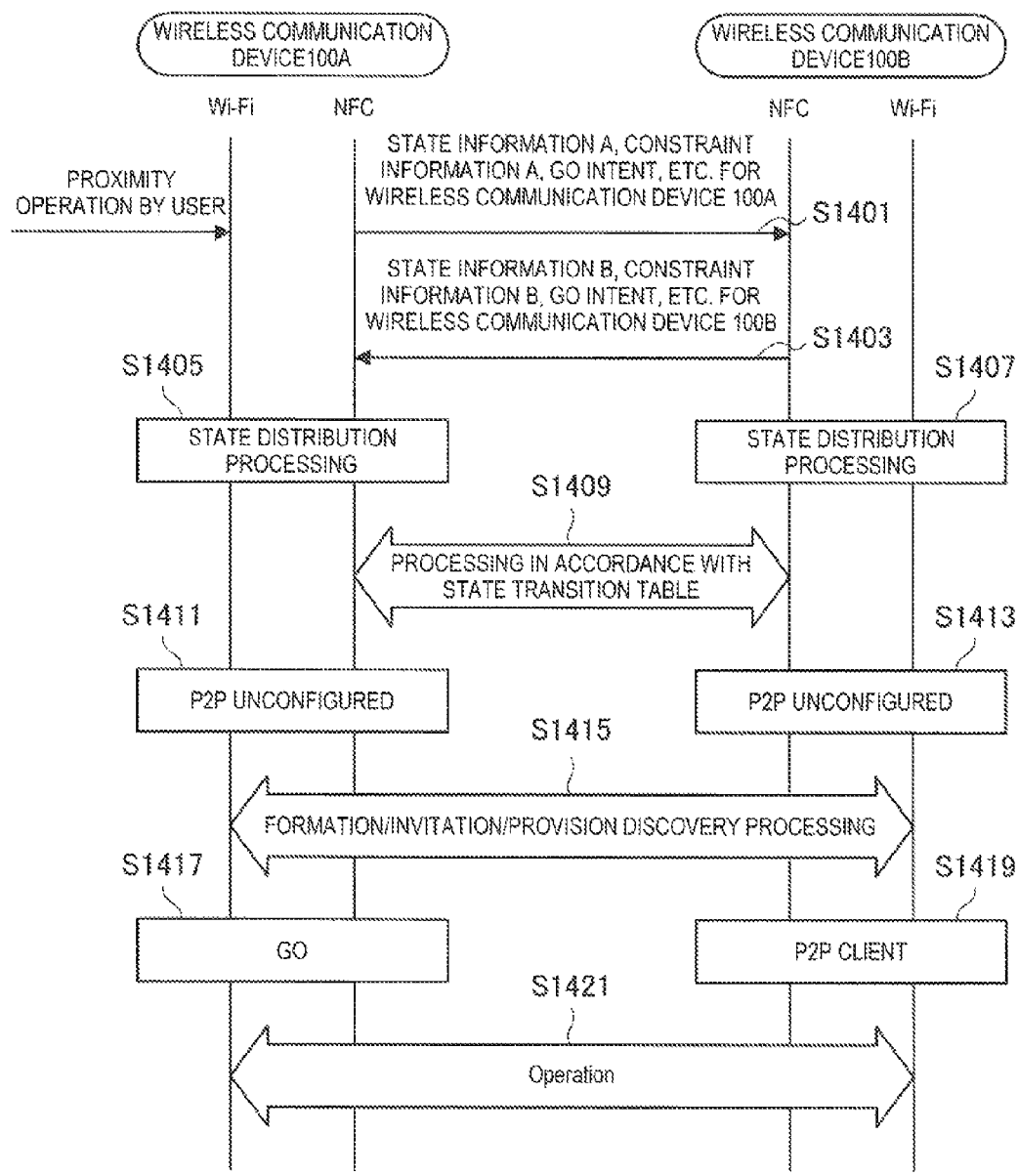
FIG. 34 is a sequence diagram illustrating a third specific example of a processing for changing the states of two wireless communication devices to a target pair.

The flow processing illustrated in FIG. 28 and FIG. 29 and the processing illustrated in FIG. 4 (excluding the portion regarding legacy devices) will be described more generally with reference to FIG. 32 through FIG. 34.

(Processing Flow)

FIG. 32 is a flowchart illustrating an example of a more general processing flow to change the states of the wireless communication device 100A and the wireless communication device 100B to the target pair.

First, at step S1301, the wireless communication device 100A enters the proximity to the wireless communication device 100B.

At step S1303, state information is shared between the wireless communication device 100A and the wireless communication device 100B. State information together with constraint information is also shared. Then, at step S1305, the state distribution processing is performed by either or both of the wireless communication device 100A and the wireless communication device 100B. As a result, for example, several candidate paths of state transitions to reach the target pair are identified. Then, at step S1307, a determination is made on whether the state of the wireless communication device 100A and the state of the wireless communication device 100B is capable of changing to the target pair with one occurrence of a state transition. If the state of the wireless communication device 100A and the state of the wireless communication device 100B is capable of changing to the target pair with one occurrence of a state transition, then the processing proceeds to step S1309. If it is not, then the processing proceeds to step S1319.

At step S1309, an index i is set to a value of one. This index i is a number corresponding to the procedure that enables the state of the wireless communication device 100A and the state of the wireless communication device 100B to change to any of the target pairs. That is to say, this procedure is the processing of one occurrence of a state transition to any of the target pairs.

At step S1311, a determination is made on whether i>N. N is a number of procedures present to enable the state of the wireless communication device 100A and the state of the wireless communication device 100B to change to any of the target pairs. That is to say, at step S1311, a determination is made on whether all procedures have already been attempted. If i>N, then the processing proceeds to step S1319. If it is not, then the processing proceeds to step S1313.

At step S1313, the i-numbered procedure is attempted. Then, at step S1315, a determination is made on whether the state of the wireless communication device 100A and the state of the wireless communication device 100B are the target pair. If the state of the wireless communication device 100A and the state of the wireless communication device 100B are the target pair, then the processing ends normally. If they are not, then the processing proceeds to step S1317.

At step S1317, i is incremented.

At step S1319, a determination is made on whether either the state of the wireless communication device 100A of the state of the wireless communication device 100B may be transitioned to the intermediate pair. If either the state of the wireless communication device 100A or the state of the wireless communication device 100B may be transitioned to the intermediate pair, then the processing proceeds to step S1321. If it may not, processing terminates abnormally, or an exception occurs.

At step S1321, the state of the wireless communication device 100A and the state of the wireless communication device 100B change to the intermediate pair.

(State Transition Table)

Next, the state transitions for one occurrence as described in FIG. 32 will be described in detail with reference to FIG. 33A, FIG. 33B, and FIG. 33C. FIG. 33A through 33C are state transitions tables including the conditions and processing of each state transition to change the state of the wireless communication device 100A and the state of the wireless communication device 100B to the target pair.

Referencing FIG. 33A through FIG. 33C, the horizontal axis represents the pair of states of the state of the wireless communication device 100A and the state of the wireless communication device 100B before a state transition (source pair), and the vertical axis represents the pair of state of the state of the wireless communication device 100A and the state of the wireless communication device 100B before a state transition (destination pair). That is to say, the target pairs T0 through T2 and the initial/intermediate pairs S0 through S8 are illustrated.

Referencing FIG. 33A, for example, when the pair of states before a transition is the initial/intermediate pair S0, the possible pair of states before a transition in one occurrence are the target pairs T1 and T2. In addition, there are two procedures (group formation procedure and re-invoke) present for the state transition from the initial/intermediate pair S0 to the target pair T1, and there are two procedures (group formation procedure and re-invoke) for the state transition from the initial/intermediate pair S0 to the target pair T2. Thus, in this case, N as illustrated in FIG. 32 is 4. In addition, the state transition charts illustrated in FIG. 33 include transition conditions that could not be represented in the state transitions diagrams illustrated in FIGS. 26 and 27.

The wireless communication device 100C as represented by "C" on the horizontal axis is the group owner of the P2P group when the wireless communication device 100A and the wireless communication device 100B are both P2P clients in the P2P group.

Note the following regarding FIG. 33A through FIG. 33C.
Wireless Communication Device States (P2P Device States)
This is the pair of states of the wireless communication device 100A and the wireless communication device 100B. The state of the wireless communication devices is identified as either the group owner or P2P client of some active P2P group, or as neither of these. This means that there are a total of 9 (3×3) pairs, but considering that the wireless communication device 100A and the wireless communication device 100B could also belong to different P2P groups, the actual total is 12 pairs.
Target Pairs
The state in which the wireless communication device 100A and the wireless communication device 100B belong to the same P2P group and direct communication may be performed. The state in which both devices are P2P clients (T0) is a target pair only when Intra-BSS=1. If it is not, then this is not a target pair.
Conditions
The wireless communication device that determines capability to transition state, or the P2P group attributes.
P2P Group Capability Bitmap
Capability of communication between P2P clients: Intra-BSS
Distribution
Capability to add P2P clients: P2P Group Limit
Whether or not device is a group owner of (current) P2P group: P2P Group Owner
P2P Device Capability Bitmap
Capability to join P2P group: P2P Device Limit
Whether or not device is group owner of a persistent P2P group: Persistent P2P Group
Capability to execute invitation processing: P2P Invitation Procedure
Other Conditions
Information identifying whether or not the wireless communication device is a P2P client in a persistent P2P group
Flag identifying whether or not a drop is possible
Other
Re-invoke for a persistent P2P group may be executed by either the group owner or the P2P client. Re-invoke details are also summarized and described in the state transition table for all cases.

In addition, regarding the existing P2P group, the wireless communication device which is in the P2P unconfigured state may trigger a join to the group by sending a Provision Discovery Request to the wireless communication device which is the group owner. These cases are described in the state transition table as Invitation Requests from the group owner.

Regarding the initial state, it is presumed that concurrent operation (simultaneous operation of WLAN and P2P groups) and simultaneous operation between P2P groups are not enabled. Possible simultaneous operation of P2P groups by only one wireless communication device may also include cases in which connections between wireless communication devices are possible in the state transition diagrams.

Specific Example of Processing

A specific example of processing to change the state of the wireless communication device 100A and the state of the wireless communication device 100B to the target pair will be described with reference to FIG. 34. FIG. 34 is a sequence diagram illustrating a third specific example of a processing to change the states of the wireless communication device 100A and the wireless communication device 100B to the target pair. This specific example illustrates a specific example of the processing in FIG. 32.

The wireless communication device 100A and the wireless communication device 100B share information representing state information, constraint information, and GO intent via NFC (S1401, S1403). Then, state distribution processing is performed (S1405, S1407). Thus, the wireless communication device 100A and the wireless communication device 100B execute processing in accordance with the state transition tables illustrated in FIG. 33A through FIG. 33C. As a result, the wireless communication device 100A and the wireless communication device 100B, for example, change to the P2P unconfigured state (S1411, 1413).

Afterwards, the formation processing, invitation processing, and provision discovery processing, etc. are performed (S1415). As a result, the wireless communication device 100A becomes the group owner for some P2P group (S1417), and the wireless communication device 100B becomes a P2P client in the same group (S1419). Then, the wireless communication device 100A and the wireless communication device 100B start direct communication (operation) (S1421).

As in steps S1401 and S1403, the time for proximity communication may be reduced due to the removal of processing related to constraints and GO intent by previously sharing information representing the constraint information and GO intent. In addition, the actual device may refuse undesirable requests from other devices.

<7.4 Transitions to Given Target Pair>

Next, the state transition for cases when the target pair is given beforehand will be described with reference to FIG. 35.

Figure 35:
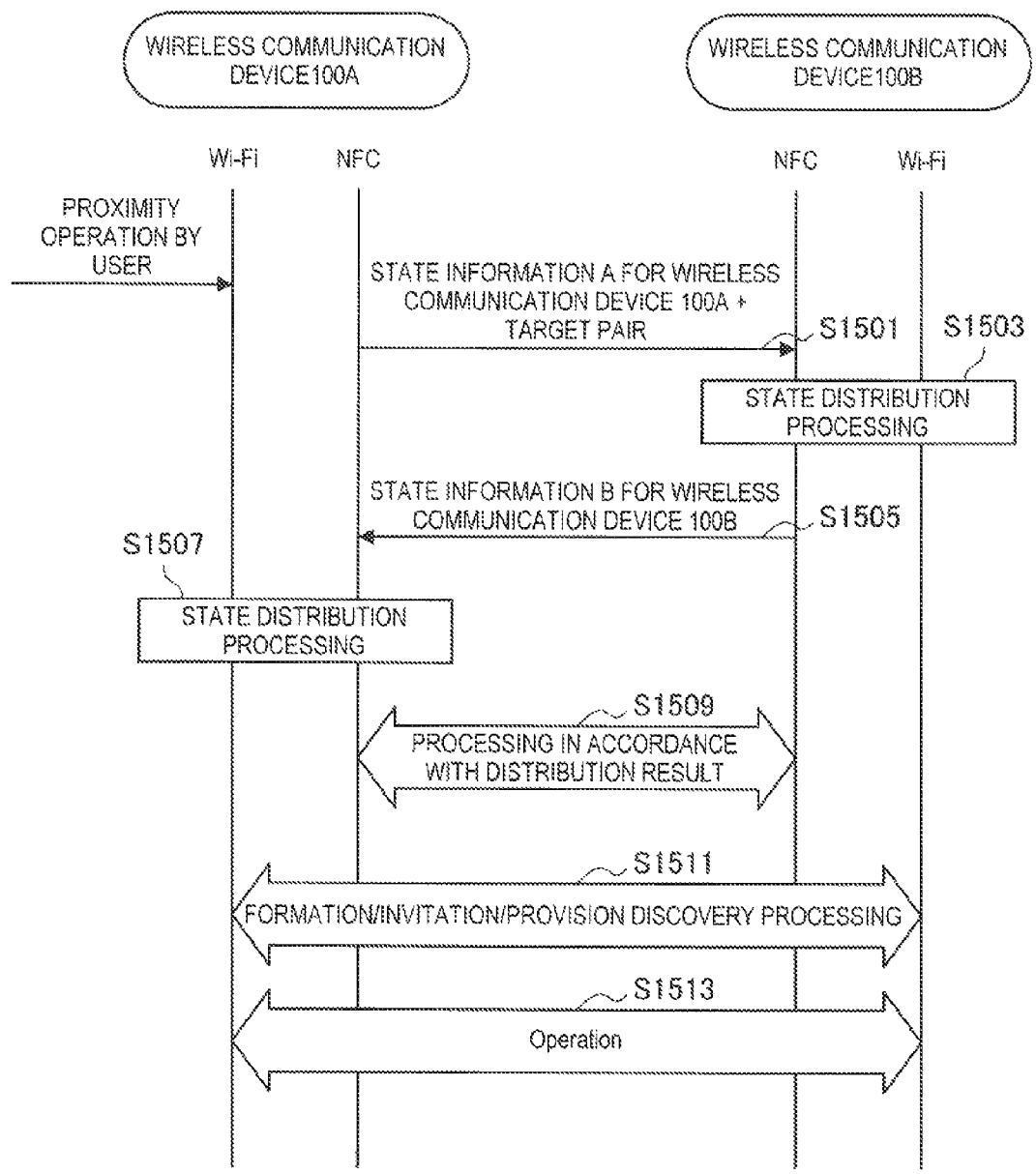
FIG. 35 is a sequence diagram illustrating an example flow of an efficient processing for changing the states of two wireless communication devices to a given target pair.

FIG. 35 is a sequence diagram illustrating an example of the overall flow of a processing to efficiently change the states of the wireless communication device 100A and the wireless communication device 100B to a given target pair. According to this processing example, a given target pair is shared along with the state information, and the state of either or both the wireless communication device 100A and the wireless communication device 100B change so that the states of the wireless communication device 100A and the wireless communication device 100B become the target pair.

Processing starts when the wireless communication device 100A is in proximity to the wireless communication device 100B. In this processing, the wireless communication device 100A has acquired the given target pair.

At step S1501, the wireless communication device 100A sends the state information A for the wireless communication device 100A and the acquired target pair to the wireless communication device 100B via the NFC interface 140. In addition, in addition, the wireless communication device 100A sends the constraint information A (not illustrated) for the wireless communication device 100A to the wireless communication device 100B through the NFC interface 140.

Then, at step S1503, the wireless communication device 100B executes the state distribution processing for the wireless communication device 100A and the wireless communication device 100B on the basis of the state information A for the wireless communication device 100A, the state information B for the wireless communication device 100B, and the target pair. That is to say, the wireless communication device 100B determines the manner in which the states of the wireless communication device 100A and the wireless communication device 100B will be changed so that the state of the wireless communication device 100A and the state of the wireless communication device 100B becomes the target pair.

If the wireless communication device 100B is capable of executing an independent state change at the stage of the process in which the state distribution processing result is generated and the state of the wireless communication device 100A and the state of the wireless communication device 100B are changing to the target pair, then the wireless communication device 100B changes its state before sending the state information B for itself. For example, if the wireless communication device 100B should first drop at the stage of processing when the state of the wireless communication device 100A and the state of the wireless communication device 100B is changing to the target pair, the wireless communication device 100B drops.

Next, at step S1505, the wireless communication device 100B sends the state information B for the wireless communication device 100B to the wireless communication device 100A through the NFC interface 140. After the state distribution processing at the previously described step S1503 and the state of the wireless communication device 100B has changed, this information represents the state of the wireless communication device 100B after the change. As previously described, for example, if the wireless communication device 100B drops, then the state information B represents that the wireless communication device 100B is in the P2P unconfigured state. In addition, the wireless communication device 100B sends the constraint information B (not illustrated) for the wireless communication device 100B to the wireless communication device 100A.

Then, at step S1507, the wireless communication device 100A executes the state distribution processing for the wireless communication device 100A and the wireless communication device 100B on the basis of the state information A for the wireless communication device 100A, the state information B for the wireless communication device 100B, and the target pair. That is to say, the wireless communication device 100B determines the manner in which the states of the wireless communication device 100A and the wireless communication device 100A will be changed so that the state of the wireless communication device 100A and the state of the wireless communication device 100B becomes the target pair.

Afterwards, at step S1509, the wireless communication device 100A and the wireless communication device 100B perform processing in accordance with the distribution result, and at step S1511, perform the formation processing, the invitation processing, the provision discovery processing, and other processing.

Then, at step S1513, the wireless communication device 100A and the wireless communication device 100B start direct communication (operation).

According to such a processing, if a predetermined state is given beforehand, the state of the wireless communication device 100A and the state of the wireless communication device 100B may be changed to predetermined states. In addition, the state for one of the wireless communication devices may be changed in advance before sharing state information, which reduces a number of processing steps after the state information is shared.

The processing corresponding to step S1509 and step S1511 is summarized in the following table.

TABLE 3

| Wireless communication device 100A | Wireless communication device 100B | Target pair | | | |
|---|---|---|---|---|---|
| | | GO:Cl/Legacy | | Cl/Legacy:GO | |
| Dev | Dev | 1. Sends state information for device A + target pair 3. Formation processing with maximum GO intent | 2. Sends state information for device B | 1. Sends state information for device A + target pair 3. Formation processing with minimum GO intent | 2. Sends state information for device B |
| | GO | 1. Sends state information for device A + target pair | 2. Becomes Dev after dropping, and | 1. Sends state information for device A + target | 2. Sends state information for device B |

TABLE 3-continued

| Wireless communication device 100A | Wireless communication device 100B | Target pair | | | |
|---|---|---|---|---|---|
| | | GO:Cl/Legacy | | Cl/Legacy:GO | |
| | Cl | 3. Formation processing with maximum GO intent<br>1. Sends state information for device A + target pair<br>3. Formation processing with maximum GO intent | sends state information for device B<br>2. Becomes Dev after dropping, and sends state information for device B | pair<br>3. Provision Discovery Request<br>1. Sends state information for device A + target pair<br>3. Formation processing with minimum GO intent | 2. Becomes Dev after dropping, and sends state information for device B |
| | Legacy | 1. Sends state information for device A + target pair<br>3. Forms group and performs WPS processing with device B | 2. Sends state information for device B | | |
| GO | Dev | 1. Sends state information for device A + target pair<br>3. Invitation Request to device B | 2. Sends state information for device B | 1. Sends state information for device A + target pair<br>3. Becomes Dev after dropping, and performs formation processing with minimum GO intent | 2. Sends state information for device B |
| | GO | 1. Sends state information for device A + target pair<br>3. Invitation Request to device B | 2. Becomes Dev after dropping, and sends state information for device B | 1. Sends state information for device A + target pair<br>3. Becomes Dev after dropping, and sends Provision Discovery Request to device B | 2. Sends state information for device B |
| | Cl | 1. Sends state information for device A + target pair<br>3. Invitation Request to device B | 2. Becomes Dev after dropping, sends state information for device B, and stops if in same group as device A | 1. Sends state information for device A + target pair<br>3. Becomes Dev after dropping, and performs formation processing with minimum GO intent | 2. Becomes Dev after dropping, and sends state information for device B |
| | Legacy | 1. Sends state information for device A + target pair<br>3. WPS processing with device B | 2. Sends state information for device B (ends if already connected to device A) | | |

TABLE 4

| Wireless communication device 100A | Wireless communication device 100B | Target pair | | | |
|---|---|---|---|---|---|
| | | GO:Cl/Legacy | | Cl/Legacy:GO | |
| Cl | Dev | 1. Sends state information for device A + target pair<br>3. Becomes Dev after dropping, and performs formation processing with | 2. Sends state information for device B | 1. Sends state information for device A + target pair<br>3. Becomes Dev after dropping, and performs formation processing with | 2. Sends state information for device B |

TABLE 4-continued

| Wireless communication device 100A | Wireless communication device 100B | Target pair GO:Cl/Legacy | | Cl/Legacy:GO | |
|---|---|---|---|---|---|
| | | maximum GO intent | | minimum GO intent | |
| | GO | 1. Sends state information for device A + target pair  3. Becomes Dev after dropping, and performs formation processing with maximum GO intent | 2. Becomes Dev after dropping, and sends state information for device B | 1. Sends state information for device A + target pair  3. Becomes Dev after dropping, and sends Provision Discovery Request to device B | 2. Sends state information for device B, and ends if in same group |
| | Cl | 1. Sends state information for device A + target pair  3. Becomes Dev after dropping, and performs formation processing with device B with maximum GO intent | 2. Becomes Dev after dropping, and sends state information for device B | 1. Sends state information for device A + target pair  3. Becomes Dev after dropping, and performs formation processing with minimum GO intent | 2. Becomes Dev after dropping, and sends state information for device B |
| | Legacy | 1. Sends state information for device A + target pair  3. Forms group after dropping, and performs WPS processing with device B | 2. Sends state information for device B | | |
| Legacy | Dev | | | 1. Sends state information for device A + target pair  3. WPS processing with device B | 2. Forms group, and sends state information for device B |
| | GO | | | 1. Sends state information for device A + target pair  3. WPS processing with device B | 2. Sends state information for device B, and ends if in same group |
| | Cl | | | 1. Sends state information for device A + target pair  3. WPS processing with device B | 2. Forms group after dropping, and sends state information for device B |

As an example for the target pair, the state of the wireless communication device 100A is the group owner (GO), and the state of the wireless communication device 100B is a P2P client (Cl). Alternatively, the state of the wireless communication device 100A and the state of the wireless communication device 100B are both the group owner. In this case, first the wireless communication device 100A sends the state information A for itself and the target pair to the wireless communication device 100B. Next, the wireless communication device 100B drops itself on the basis of the state information A, the state information B, and the target pair, and then sends the state information B for itself (that is to say, information representing that the wireless communication device 100B is in the P2P unconfigured state (Dev)) to the wireless communication device 100A. Then, the wireless communication device 100A starts the invitation processing by sending an Invitation Request to the wireless communication device 100B.

According to FIG. 35, the target pair is sent from the wireless communication device 100A to the wireless communication device 100B, but a target channel may also be sent together with or in place of the target pair. This target channel is the channel that should be used for wireless communication between the wireless communication device 100A and the wireless communication device 100B.

Referencing FIG. 35 again, at step S1501, the target channel is sent from the wireless communication device 100A to the wireless communication device 100B, for example. In addition, at step S1511, the formation/invitation/provision discovery/other processing are executed using the target channel. When the target pair is not sent (that is to say, when the target channel is sent in place of the target pair regarding the flow in FIG. 35), the state distribution processing for the wireless communication device 100B (S1503) may be performed after sending the state information B (S1505).

By sending the target channel, processing to identify channel information for peripheral devices by device discovery, channel specification for formation/invitation/provision discovery processing, and other processing may be reduced. As a result, the time until a direct connection is established between the wireless communication device 100A and the wireless communication device 100B may be reduced. This is particularly effective in reducing time for environments in which many wireless communication devices 100 are present in the surrounding area.

<<8. Processing for Starting Services>>

Next, processing to start services between wireless communication devices will be described with reference to FIG. 36 through FIG. 43. After establishing a connection between wireless communication devices via wireless communication, processing to start services between the wireless communication devices is executed. As a specific example of services in this case, the Digital Living Network Alliance (DLNA) service and a mirroring service for video and/or audio will be described.

<8.1 DLNA Service>

Figure 36:
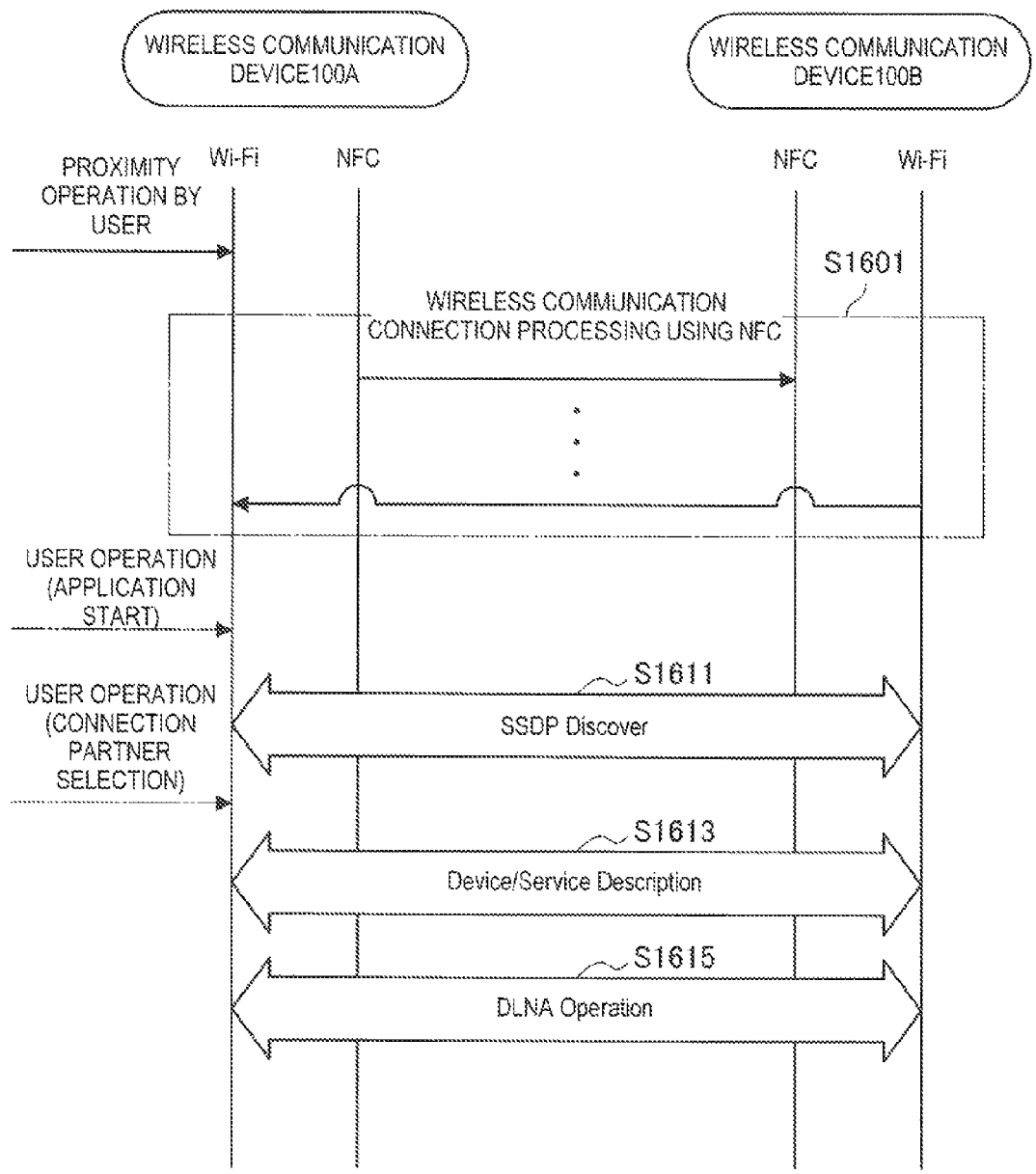
FIG. 36 is a sequence diagram illustrating an example of an overall flow of a processing for starting a DLNA service between two wireless communication devices.

Processing for starting the DLNA service between wireless communication devices 100 will be described with reference to FIG. 36. FIG. 36 is a sequence diagram illustrating an example of an overall flow of a processing for starting a DLNA service between the wireless communication devices 100. According to this example, the wireless communication device 100A includes a Digital Media Server (DMS) function, for example.

First, a connection is established between the wireless communication device 100A and the wireless communication device 100B by connection processing for wireless connections using NFC (S1601). Afterwards, when the DLNA service application is started on the wireless communication device 100A by user operation, the Simple Service Discovery Protocol (SSDP) Discover processing is executed (S1611). As a result, the wireless communication device 100B, which supports DLNA, is detected. Then, the wireless communication device 100A and the detected wireless communication device 100B send device/service descriptions (that is to say, service information regarding the DLAN service) (S1613). In other words, information used to start the DLNA service is obtained. More specifically, device information for the wireless communication devices 100 and service information regarding the DLNA service is obtained via an HTTP-GET or similar. Then, the DLNA service is started (S1615). As a result, a predetermined service such as the streaming of moving video becomes usable by the user. In addition, the previously described SSDP Discover processing and the exchange of device/service descriptions is included in the Service Discovery. The service information obtained by Service Discovery (that is to say, service information including device descriptions and/or service descriptions) also includes the device class, device capabilities, media class, and other information. The device class, device capabilities, and media class are each described in formats such as dlna-dev-class="DMS", dlna-dev-capability="+UP+", and media-class="Audio".

Regarding the connection processing at step S1601, device information (UUID, etc.) obtained by SSDP Discover may be previously obtained when state information is exchanged via NFC. As a result, the user operation to start a DLNA service application and the SSDP Discover processing may be eliminated.

<8.2 Mirroring Service>

Next, processing to start, stop, interrupt, and continue a mirroring service between the wireless communication devices 100 will be described with reference to FIG. 37 through FIG. 43. According to each of the following illustrated examples, the wireless communication device 100A is a source, and the wireless communication device 100B is a sink, for example.

First Example of Processing to Start a Mirroring Service

Figure 37:
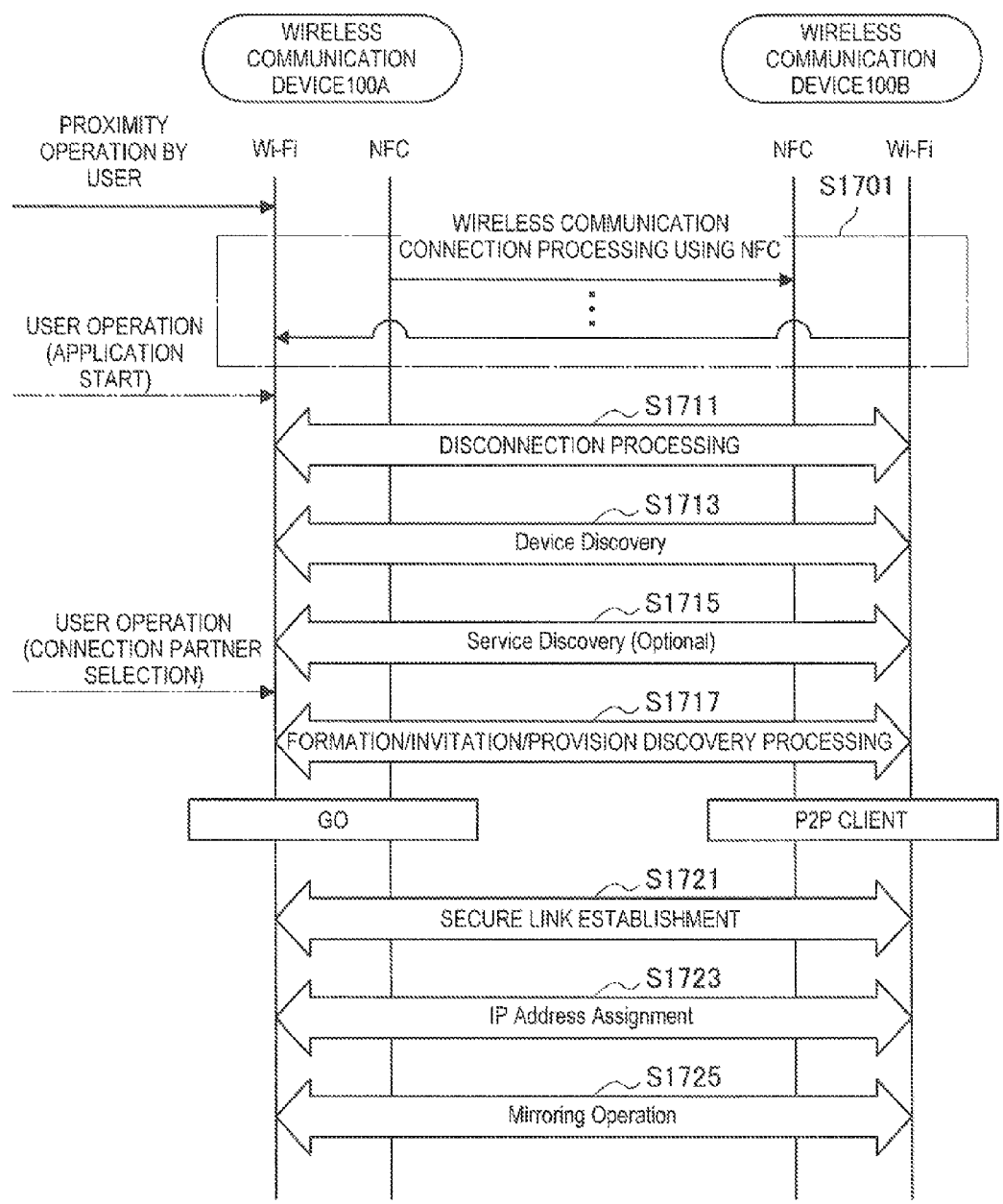
FIG. 37 is a sequence diagram illustrating a first example of an overall flow of a processing for starting a mirroring service between two wireless communication devices.

FIG. 37 is a sequence diagram illustrating a first example of an overall flow of a processing for starting a mirroring service between the wireless communication devices 100.

First, a connection is established between the wireless communication device 100A and the wireless communication device 100B by the connection processing for wireless connections using NFC (S1701). Afterwards, once the application for the mirroring service on the wireless communication device 100A is started by user operation, disconnection processing for the connection between the wireless communication device 100A and the wireless communication device 100B is performed (S1711). As a result of the disconnection processing, for example, the wireless communication device 100A and the wireless communication device 100B are the group owner and a P2P client in the same group, either or both of the wireless communication device 100A and the wireless communication device 100B change to the P2P unconfigured state. When either the wireless communication device 100A or the wireless communication device 100B continues to be the group owner as a Persistent GO, the other device changes to the P2P unconfigured state.

Next, the mirroring service Device Discovery is performed (S1713). That is to say, the wireless communication device 100A receives a beacon sent by the wireless communication device 100B, and obtains device information for the wireless communication device 100B. More specifically, the wireless communication device 100A obtains an information element (IE) for the mirroring service and a P2P IE. The mirroring service IE, for example, includes device type (source/sink), capability to support Service Discovery, capability to support content protection technologies (High-bandwidth Digital Content Protection (HDCP)), Basic Service Set Identifier (BSSID) for connected networks (Wi-Fi P2P or infrastructure), receiving terminal information (composite signals of video and audio or an independent signal), and other information.

In addition, when more detailed information is desired, Service Discovery is performed to obtain more detailed information (S1715). That is to say, the wireless communication device 100A receives a beacon sent by the wireless communication device 100B, and obtains service information for the wireless communication device 100B. The Service Discovery represents processing in accordance with P2P Service Discovery Procedures in the Wi-Fi P2P Technical Specification v1.1. Specifically, the Service Discovery represents the exchange (Generic Advertisement Service (GAS) initial requests/responses) of the GAS protocol/frames as defined by IEEE P802.11u. As previously described, the service information obtained by Service Discovery may include, for example, device descriptions and/or service descriptions.

When multiple wireless communication devices are detected by device discovery and service discovery, for example, the wireless communication device intended by the user operation (in this case, the wireless communication device 100B) is selected. Then, the wireless communication device 100A and the wireless communication device 100B perform the formation processing, invitation processing, or provision discovery processing (S1717) to establish a connection between the wireless communication device 100A and the wireless communication device 100B. As a result, the wireless communication device 100A becomes the group owner, and the wireless communication device 100B becomes a P2P client, for example.

Afterwards, a secure link is established (S1721). More specifically, a secure communication path such as a Wi-Fi Protected Access (WPA) or a WPA2 connection is established by a 4-way handshake, for example.

In addition, IP address assignment is performed (S1723). More specifically, for example, the group owner, which is also a Dynamic Host Configuration Protocol (DHCP) server, assigns an IP address to the P2P client, which is also a DHCP client.

Then, the mirroring service between the wireless communication device 100A and the wireless communication device 100B is started (S1725). When the mirroring service is started, Real-Time Streaming Protocol (RTSP) communication is started between the wireless communication devices for the mirroring service, and processing for operation is performed. For example, processing such as RTSP setup, play, pause, teardown, resolution settings, moving video encoding settings, and so on are performed. RTSP is a streaming control protocol standardized by IETF (RFC 2326). When mirroring is performed for a television (TV) and a personal computer (PC), for example, the display of the PC screen is displayed exactly the same on the TV screen. That is to say, when video content is played on the PC, this content is also played on the TV.

Second Example of Processing to Start a Mirroring Service

Figure 38:
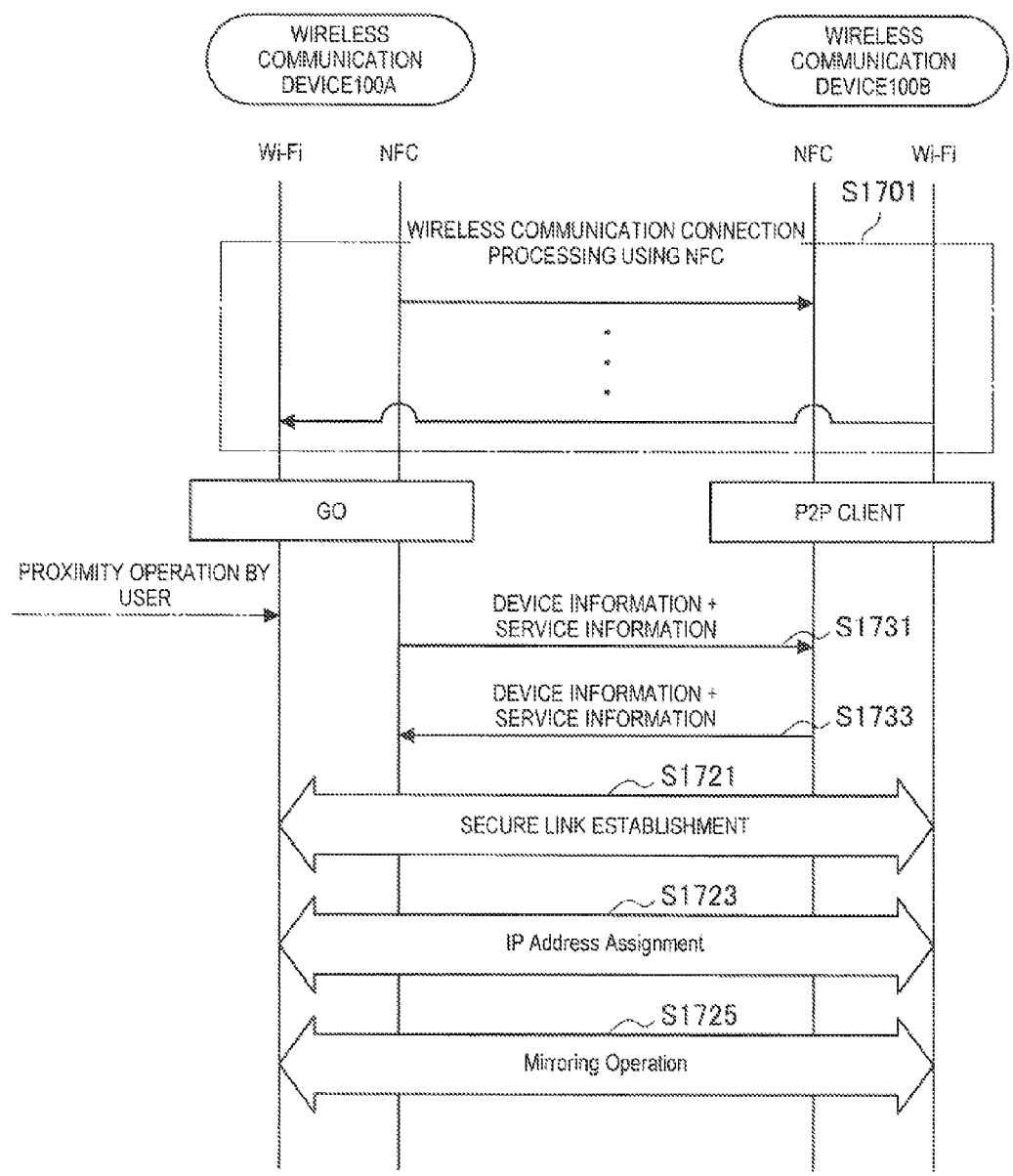
FIG. 38 is a sequence diagram illustrating a second example of an overall flow of a processing for starting a mirroring service between two wireless communication devices.

An example of efficient processing using NFC will be described with reference to FIG. 38 as the next example. FIG. 38 is a sequence diagram illustrating a second example of an overall flow of a processing for starting a mirroring service between the wireless communication devices 200.

Further, there are no differences in steps S1701, S1721, S1723, and S1725 between the first example in FIG. 37 and the second example in FIG. 38. Thus, steps S1731 and S1733 will be described here.

A connection is established between the wireless communication device 100A and the wireless communication device 100B (S1701), the wireless communication device 100A becomes the group owner, and the wireless communication device 100B becomes a P2P client. Afterwards, the user brings the wireless communication device 100A in proximity to the wireless communication device 100B. Then, the wireless communication device 100A and the wireless communication device 100B obtain information for starting the mirroring service (for example, device information and service information) via the NFC interface 140 (S1731, S1733). The device information sent by the wireless communication device 100A and the device information sent by the wireless communication device 100B may be the same type of information, or may be different types of information. In addition, the service information sent by the wireless communication device 100A and the service information sent by the wireless communication device 100B may be the same type of information, or may be different types of information. The same applies to the device information and service information regarding FIG. 39 through FIG. 43 described later.

By such a use of NFC, information obtained by device discovery and service discovery according to the related art is obtained by NFC. Thus, processing for obtaining information (disconnection processing, device discovery, service discovery, and connection re-establishment) becomes undesirable when starting the mirroring service. That is to say, this may reduce user operation, simplify processing, and shorten processing time. As a result, the time until the service is usable may be reduced.

Third Example of Processing to Start a Mirroring Service

Figure 39:
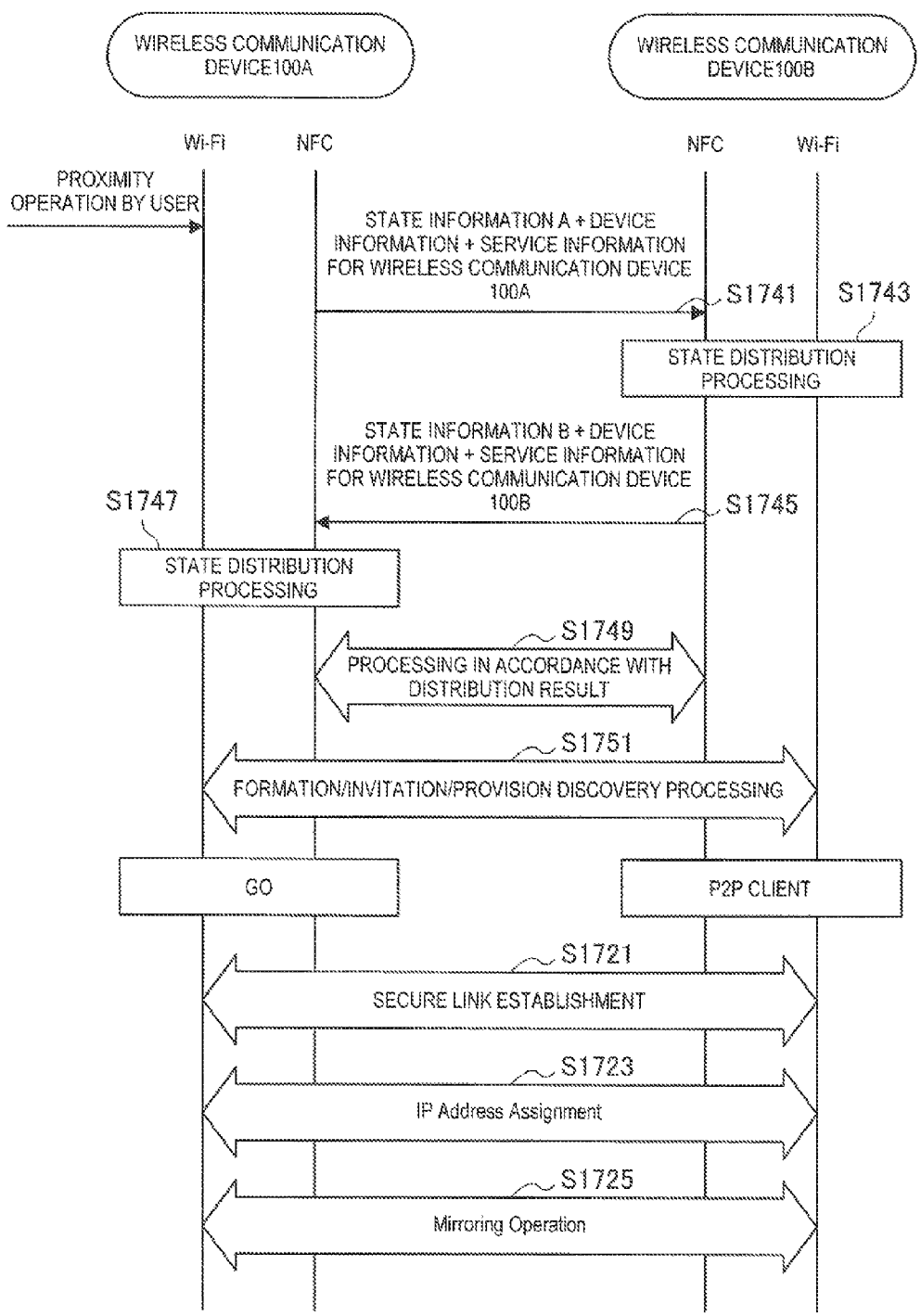
FIG. 39 is a sequence diagram illustrating a third example of an overall flow of a processing for starting a mirroring service between two wireless communication devices.

An efficient processing using NFC during connection processing will be described with reference to FIG. 39 and FIG. 40 as the next example. FIG. 39 is a sequence diagram illustrating a third example of an overall flow of a processing for starting a mirroring service between the wireless communication devices 100.

Further, there are no differences in steps S1721, S1723, and S1725 between the first example in FIG. 37 (or the second example in FIG. 38) and the third example in FIG. 39. Thus, steps S1741 through S1751 will be described.

At steps S1741 through S1751, a wireless communication connection processing using NFC such as that previously described is performed. When exchanging state information for the wireless communication devices 100 during this processing, information used to start services (device information and service information) is also shared via NFC (S1741, S1745).

By obtaining information through NFC regarding such a connection processing, the user may only have to perform one near-field operation of the wireless communication device, which reduces user operation load. In addition, this may reduce the time from the first near-field operation to the starting of services.

Figure 40:
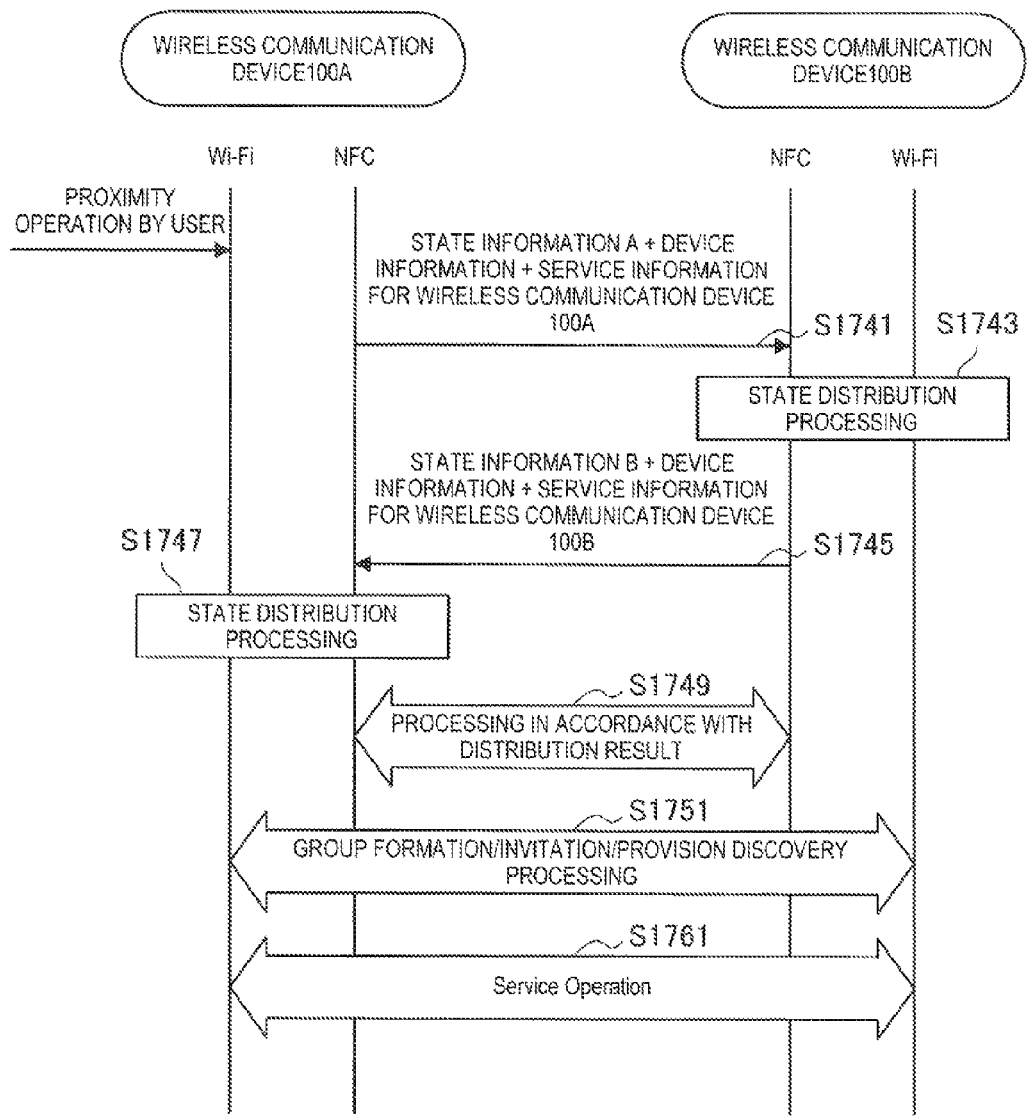
FIG. 40 is a sequence diagram illustrating an example of an overall flow of a processing for starting a service between two wireless communication devices.

Further, the processing example illustrated in FIG. 39 is processing regarding the mirroring service, and an example of processing regarding more general services is illustrated in FIG. 40.

FIG. 40 is a sequence diagram illustrating an example of an overall flow of a processing for starting a service between the wireless communication devices 100. Referencing FIG. 40, a wireless communication connection processing using NFC is performed at steps S1741 through S1751 similar to the processing example illustrated in FIG. 39. When exchanging state information for the wireless communication devices 100 during this processing, information used to start services (device information and service information) is also shared via NFC (S1741, S1745). Then, after the connection processing finishes, the service starts after all processing for starting services is performed (S1761).

(Processing to Disconnect Mirroring Service)

Figure 41:
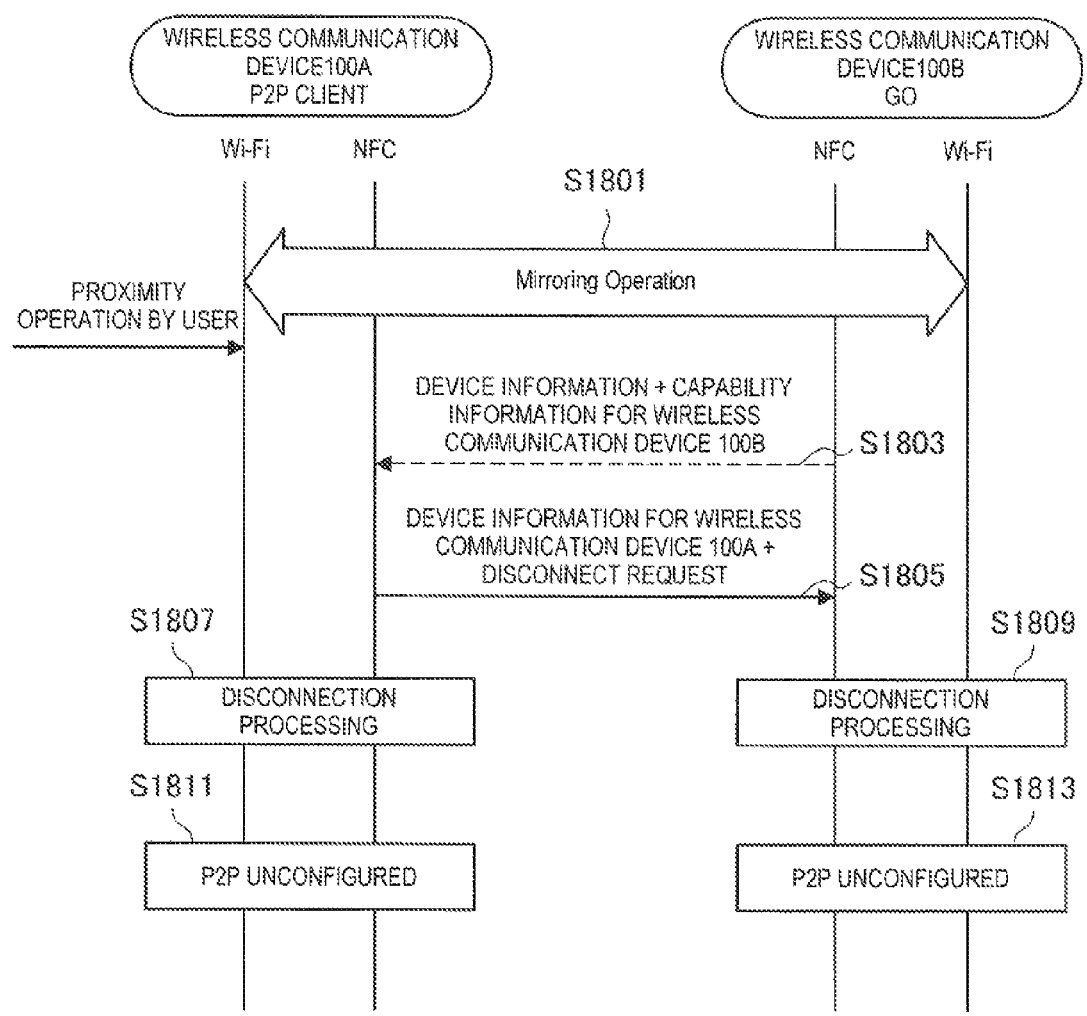
FIG. 41 is a sequence diagram illustrating an example of an overall flow of a processing for stopping a mirroring service.

FIG. 41 is a sequence diagram illustrating an example of an overall flow of a processing for stopping a mirroring service.

First, the mirroring service between the wireless communication device 100A and the wireless communication device 100B is provided (S1801). Then, the user brings the wireless communication device 100A in proximity to the wireless communication device 100B. In this case, the wireless communication device 100B sends the device information service capability information for the wireless communication device 100B to the wireless communication device 100A via NFC (S1803). As an example, the wireless communication device 100B sends the aforementioned device information and the aforementioned capability information, and the wireless communication device 100A, which is in proximity to the wireless communication device 100B, receives this information. The capability information, for example, includes information representing the services that the wireless communication is capable of providing (for example, mirroring, DLNA, etc.), and information representing capability to end (that is to say, disconnect the service) currently provided services (for example, stopping (capability to stop), continuing (capability to continue), etc.). Further, when the device information and/or capability information for the wireless communication device 100B is already shared with the wireless communication device 100A, this information does not have to be sent by the wireless communication device 100B, and does not have to be received by the wireless communication device 100A.

Then, the wireless communication device 100A requests disconnection of the service if it is understood from the capability information that the service is capable of being ended (S1805). In this case, for example, the device information for the wireless communication device 100A is also sent to the wireless communication device 100B. Then, the wireless communication device 100A and the wireless communication device 100B execute the service disconnection processing (S1807, S1809). Then, the wireless communication device 100A and the wireless communication device 100B, for example, change to the P2P unconfigured state (S1811, 1813). Further, processing is not limited thusly when the wireless communication device 100B is a Persistent GO.

According to such a processing to disconnect the mirroring service, services may be disconnected simply by the user brining one wireless communication device 100 in proximity to another wireless communication device 100. That is to say, services may be disconnected by a simple operation.

(Processing to Interrupt Mirroring Service)

Figure 42:
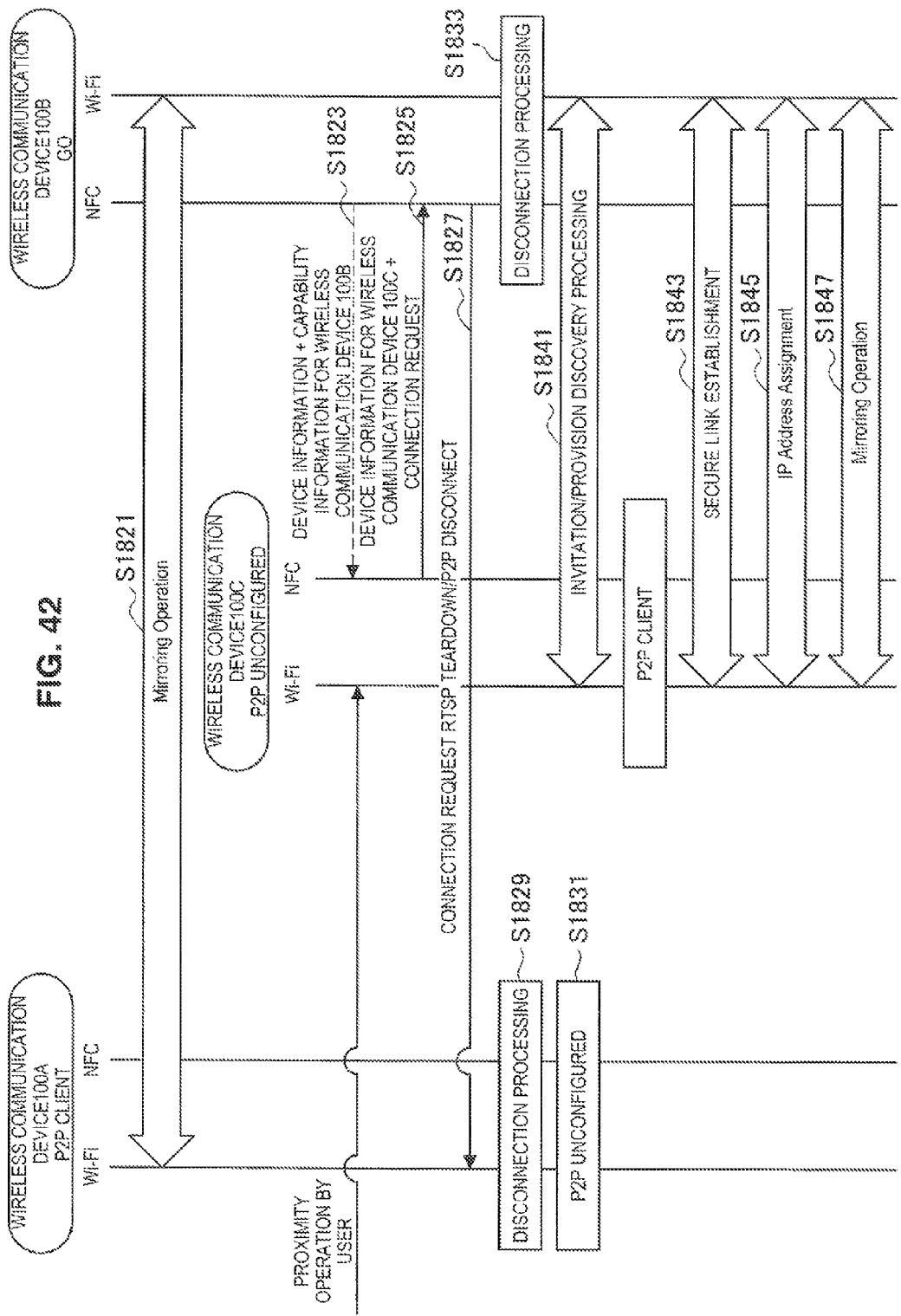
FIG. 42 is a sequence diagram illustrating an example of an overall flow of a processing for interrupting a mirroring service.

FIG. 42 is a sequence diagram illustrating an example of an overall flow of a processing for interrupting a mirroring service.

First, the mirroring service between the wireless communication device 100A and the wireless communication device 100B is provided (S1821). Then, the user brings the wireless communication device 100C in proximity to the wireless communication device 100B. Then, processing to start the mirroring service is performed between the wireless communication device 100A and the wireless communication device 100C similar to the service start processing in FIG. 39 (S1823, S1825, S1841, S1843, S1845, and S1847). In this example, the wireless communication device 100B is a Persistent GO. For this reason, invitation processing and provision discovery processing is performed (S1841). As a result, the wireless communication device 100C is in the P2P client state.

Conversely, when processing to start services is executed between the wireless communication device 100A and the wireless communication device 100C, the wireless communication device 100B requests the wireless communication device 100A to disconnect services (RTSP teardown/P2P disconnect) (S1827). Then, the wireless communication device 100A executes the disconnection processing (S1829), and changes to the P2P unconfigured state (S1831). In addition, the wireless communication device 100B also executes the disconnection processing (S1833).

According to such a processing to interrupt the mirroring service, provided services are automatically stopped when a third wireless communication device 100 is in proximity, and services are started anew with the third wireless communication device 100. That is to say, services may be automatically interrupted by a simple operation.

(Processing to Continue Mirroring Service)

Figure 43:
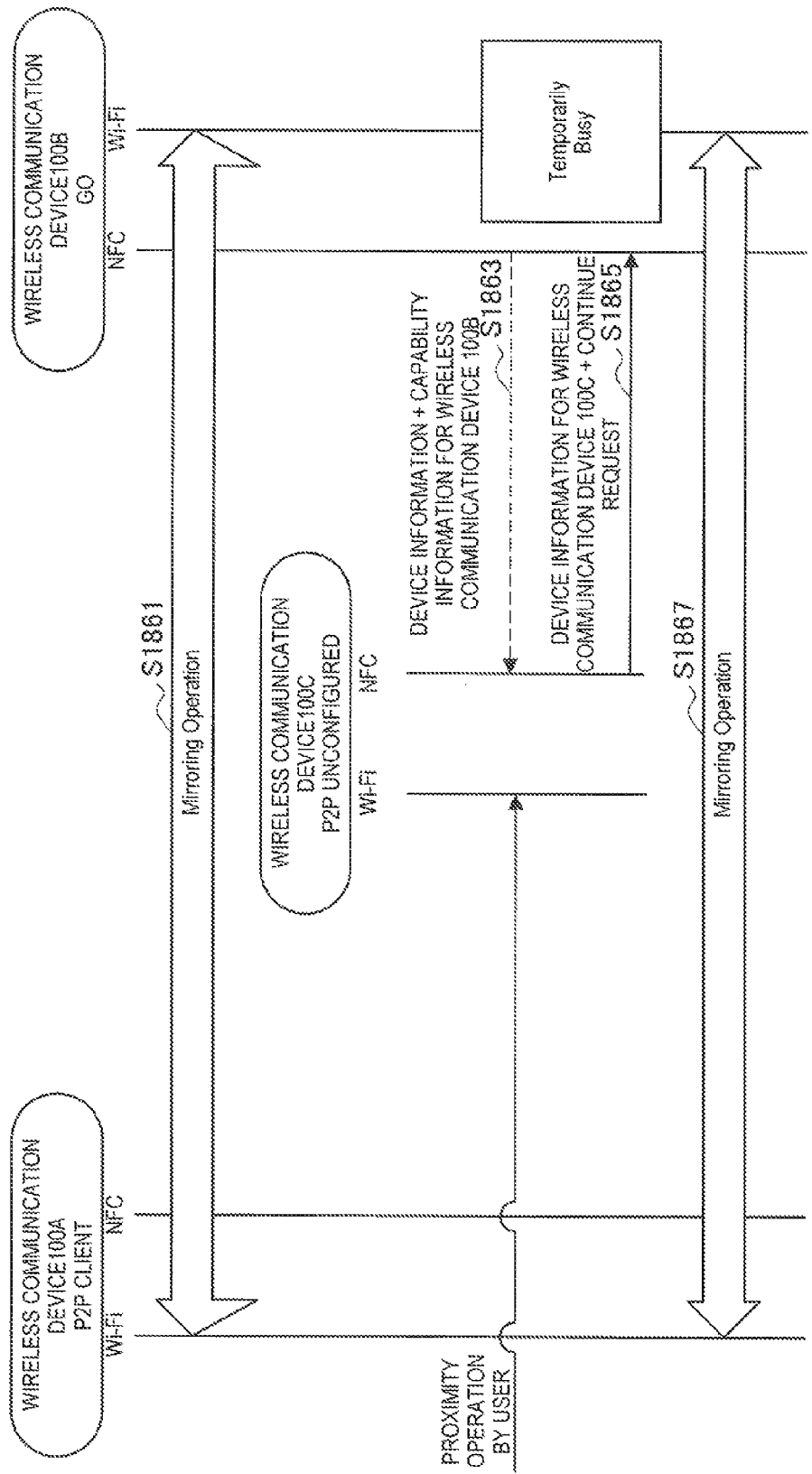
FIG. 43 is a sequence diagram illustrating an example of an overall flow of a processing for continuing a mirroring service.

FIG. 43 is a sequence diagram illustrating an example of an overall flow of a processing for continuing a mirroring service.

First, the mirroring service between the wireless communication device 100A and the wireless communication device 100B is provided (S1861). Then, the user brings the wireless communication device 100C in proximity to the wireless communication device 100B. In this case, the wireless communication device 100B sends the device information service capability information for the wireless communication device 100B to the wireless communication device 100C via NFC (S1863). At this point, the wireless communication device 100B is temporarily busy, and so "continue (not capable of ending)" is included in the capability information as the information representing the capability to end services. In addition, information representing providable services is not included in the capability information, for example.

As services are not capable of being ended, the wireless communication device 100C sends a service continue request to the wireless communication device 100B (S1865). The continue request functions as a so-called acknowledgment. In this case, for example, the device information for the wireless communication device 100C is also sent to the wireless communication device 100B. Then, the mirroring service between the wireless communication device 100A and the wireless communication device 100B is continued (S1867).

When the wireless communication device 100B is in a busy state in this way, the starting of new services may be avoided.

Further, when the wireless communication device 100C is in a busy state, the wireless communication device 100C may send a service disconnect request to the wireless communication device 100B regardless off the content of the capability information for the wireless communication device 100B. According to such a processing, the starting of services may be avoided even when the wireless communication device 100C is in a busy state.

<<9. Hardware Configuration>>

This concludes the description of the embodiments of the present disclosure. The processing by the previously described wireless communication device 100 is implemented by a combined operation of software and the wireless communication device 100 hardware, which will be described next.

Figure 44:
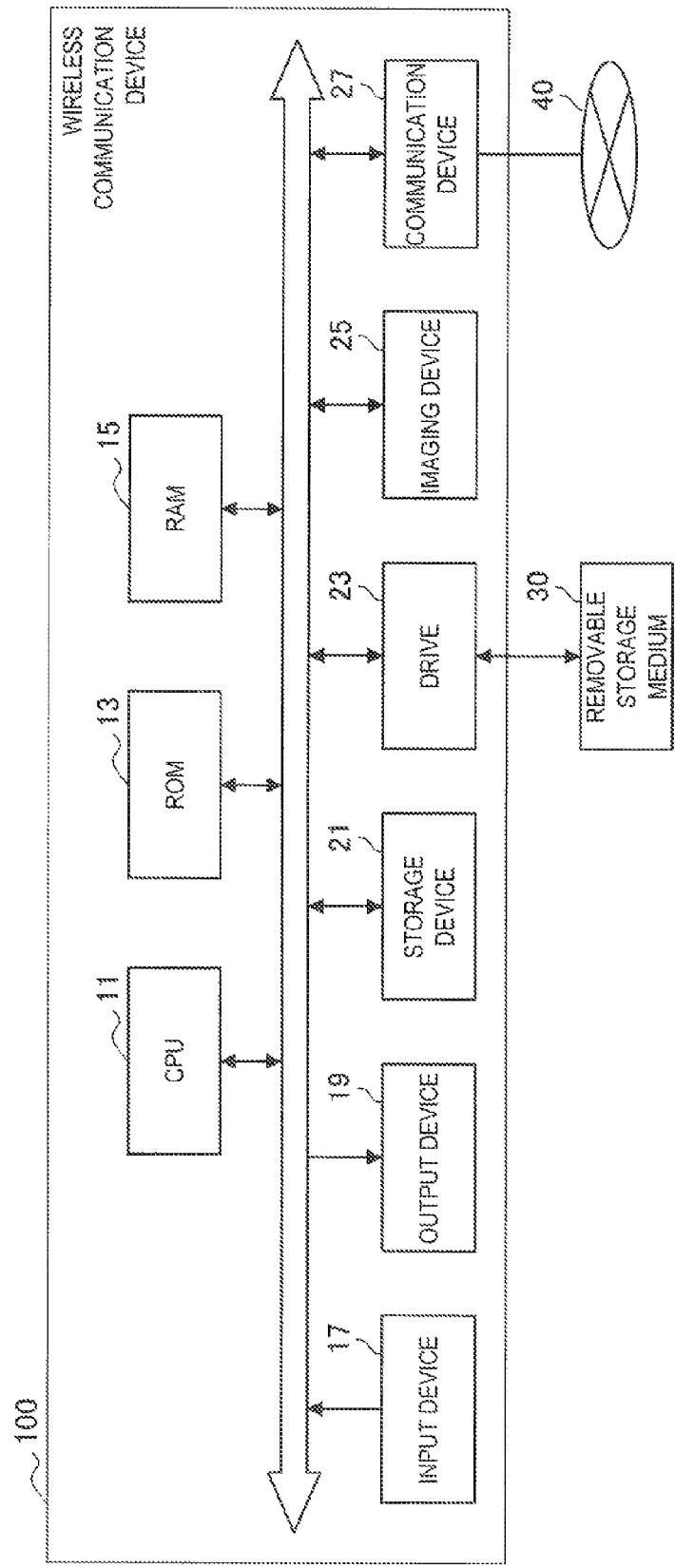
FIG. 44 is an explanatory diagram illustrating an example of a hardware configuration of a wireless communication device.

FIG. 44 is an explanatory diagram illustrating an example of a hardware configuration of the wireless communication device 100. Referencing FIG. 44, the wireless communication device 100 is provisioned with a Central Processing Unit (CPU) 11, Read-Only Memory (ROM) 13, Random Access Memory (RAM) 15, input device 17, output device 19, storage device 21, drive 23, imaging device 25, and communication device 27.

The CPU 11 functions as a calculation processing device and control device, and controls the overall operation within the wireless communication device 100 in accordance with various programs. In addition, the CPU 11 may be a microprocessor. The ROM 13 stores programs used by the CPU 11, calculation parameters, and other information. The RAM 13 temporarily stores programs used during execution of the CPU 11, parameters that vary during this execution, and other information. These units are interconnected by a host bus configured from a CPU bus or similar.

The input device 17 is configured from input methods for input of information by the user such as a mouse, keyboard, touch panel, button, microphone, switch, and lever, and from input control circuits to generate input signals on the basis of user input, and output these to the CPU 11. The user of the wireless communication device 100 may input various data into the wireless communication device 100 and specify processing operations by operating the input device 17.

The output device 19 includes display devices such as a liquid crystal display (LCD) device, an organic light emitting diode (OLED) device, and a lamp, for example. The output device 19 also includes audio output devices such as a speaker and headphone. The display device displays captured images or generated images, for example. Conversely, the audio output device converts audio data and so on into audio, and outputs this audio.

The storage device 21 stores data and is configured as an example of a storage unit of the wireless communication device 100 according to the present embodiment. The storage device 21 may include a storage medium, a recording device to record data to the storage medium, a reading device to read data from the storage medium, and a deleting device to delete data stored in the storage medium. This storage device 21 stores programs executed by the CPU 11 and various data.

The drive 23 is a storage medium reader-writer, and is installed internally or externally to the wireless communication device 100. The drive 23 reads information recorded to a removable storage medium 30 such as a mounted magnetic disk, optical disk, magneto-optical disk, or semiconductor memory, and outputs this to the RAM 15. In addition, the drive 23 may write information to the removable storage medium 30.

An imaging device 213 is provisioned with an imaging optical system such as an imaging lens and zoom lens to collect light, and signal converting elements such as Charge Coupled Devices (CCD) or Complementary Metal Oxide Semiconductors (CMOS). The imaging optical system collects light emitted from a subject, forms an image of the subject on a signal converting unit, and the signal converting elements convert the formed subject into electrical image signals.

The communication device 27 is, for example, a communication interface configured by a communication device or similar to connect to a network 40. In addition, the communication device 27 may be a communication device supporting wireless local area network (LAN), a communication device supporting Long Term Evolution (LTE), or a wired communication device that performs communication over a wired connection.

The network 40 is a wired or wireless transmission path for information sent from devices connected to the network 40. The network 40 may include, for example, the Internet, telephone line networks, public networks such as satellite communication network, various types of local area network (LAN) including Ethernet (registered trademark), wide area network (WAN), and so on. In addition, a network 12 may include private networks such as an Internet Protocol-Virtual Private Network (IP-VPN).

This concludes the detailed description of the preferable embodiments of the present disclosure with reference to the attached drawings, but the technical scope of the present disclosure is not limited to these examples. It is easy for a person having ordinary knowledge in the technical field of the present disclosure to conceive various modifications that are within the scope of the technical idea described in the claims, and so it is naturally understood that these modifications also fall within the technical scope of the present disclosure.

For example, examples of using NFC, which is an OOB mode, and examples using wireless communication (for example, wireless LAN communication), which is an in-band mode) for the communication for formation processing, invitation processing, provision discovery processing, and processing to drop one of the wireless communication devices were described, but the present disclosure is not limited to these examples. For example, according to the example using NFC, which is an OOB mode, for communication regarding this processing, wireless communication, which is an in-band mode, may be used in place of NFC. More specifically, both NFC and wireless communication may be used for the communication regarding this processing, or only wireless communication may be used, for example. In addition, according to the example using wireless communication, which is an in-band mode, for communication regarding this processing, NFC, which is an OOB mode, may be used in place of wireless communication, for example. More specifically, both NFC and wireless communication may be used for the communication regarding this processing, or only NFC may be used, for example.

In addition, examples were described in which one wireless communication device is brought into proximity to another wireless communication device by user operation, and this wireless communication device first sends information (state information, device information, service information, etc.), and then the other wireless communication device sends information. Conversely, examples were described in which the other wireless communication device sent information, and then the first wireless communication device sent information. However, the present technology is not limited to these examples. The order in which information is sent may be reversed regarding these examples.

Examples were described in which the wireless communication device is provisioned with an NFC interface or a read-only tag, but the present technology is not limited to these examples. The wireless communication device may be provisioned with a readable-writable tag. In this case, the readable-writable tag may send information corresponding to other wireless communication devices, and information from other wireless communication devices may be written. In addition, the NFC interface of the wireless communication device may also operate in card emulation mode. That is to say, the NFC interface of the wireless communication device may operate similar to the readable-writable tag.

The processing steps regarding the communication control processing according to the present disclosure does not necessarily have to be executed temporally in sequence as described in the flowcharts. For example, the processing steps regarding the communication control processing may be executed in a sequence different from that described in the flowcharts, or may be executed in parallel.

Further, the hardware such as the CPU, ROM, and RAM installed in the communication control device, base station, and terminal device may be created by a computer program for providing functions equivalent to each configuration of the communication control device, base station, and terminal device. In addition, a storage medium storing this computer program may be provided.

Additionally, the present technology may also be configured as below.

(1) A communication device including:
an obtaining unit configured to obtain first state information representing a state of a first wireless communication device regarding a direct connection between devices via wireless communication and second state information representing a state of a second wireless communication device regarding the direct connection; and a control unit configured to establish a connection between the first wireless communication device and the second wireless communication device via the wireless communication on the basis of the first state information and the second state information, wherein at least one of the first state information and the second state information is obtained via near-field communication.

(2) The communication device according to (1), wherein the first wireless communication device has a function of the direct connection, and wherein the control unit changes the state of the first wireless communication device.

(3) The communication device according to (2), wherein the state of the first wireless communication device is one of a first state in which the direct connection is established with other wireless communication devices in a group of wireless communication devices formed by the direct connection, a second state in which the direct connection is established with a wireless communication device in the first state in the group of wireless communication devices formed by the direct connection, and a third state in which the direct connection is not established, and wherein the control unit changes the state of the first wireless communication device from one of the first state, the second state, and the third state to the other state of the first state, the second state, and the third state.

(4) The communication device according to (3), wherein the control unit changes the state of the first wireless communication device from the first state or the second state to the third state when the state of the first wireless communication device is the first state or the second state, and the first wireless communication device and the second wireless communication device are not capable of communicating with each other in the group of wireless communication devices formed by the direct connection.

(5) The communication device according to (3) or (4), wherein the state of the first wireless communication device is capable of being the first state in the group of wireless communication devices formed by the direct connection, and the second state in a different group of wireless communication devices formed by the direct connection.

(6) The communication device according to (5), wherein the control unit changes the state of the first wireless communication device in a manner that the state of the first wireless communication device is the first state in a first group of wireless communication devices formed by the direct connection and the second state in a second group of wireless communication devices formed by the direct connection when the state of the first wireless communication device is the first state in the first group.

(7) The communication device according to (5) or (6), wherein the control unit changes the state of the first wireless communication device in a manner that the state of the first wireless communication device is the second state in a first group of wireless communication devices formed by the direct connection and the first state in a second group of wireless communication devices formed by the direct connection when the state of the first wireless communication device is the second state in the first group.

(8) The communication device according to (3) to (7), wherein the control unit selects a target pair of the state of the first wireless communication device and the state of the second wireless communication device that enable a connection between the first wireless communication device and the second wireless communication device, and changes the state of the first wireless communication device in a manner that the state of the first wireless communication device and the state of the second wireless communication device transition to the target pair.

(9) The communication device according to (8), wherein the control unit selects the target pair with higher priority from a plurality of the target pairs.

(10) The communication device according to (3) to (7), wherein the obtaining unit obtains a target pair of the state of the first wireless communication device and the state of the second wireless communication device that enable a connection between the first wireless communication device and the second wireless communication device, and wherein the control unit changes the state of the first wireless communication device in a manner that the state of the first wireless communication device and the state of the second wireless communication device transition to the target pair.

(11) The communication device according to (10), wherein the first wireless communication device is the communication device, wherein the obtaining unit obtains the second state information and the target pair via near-field communication, and wherein the control unit changes the state of the first wireless communication device on the basis of the target pair before sending the first state information to the second wireless communication device.

(12) The communication device according to any one of (3) to (11), wherein the second wireless communication device does not have the function of the direct connection, wherein the state of the second wireless communication device is a fourth state representing lack of the function to the direct connection, and wherein the control unit changes the state of the first wireless communication device from the second state or the third state to the first state when the state of the first wireless communication device is the second state or the third state.

(13) The communication device according to (1), wherein the first wireless communication device and the second wireless communication device do not have a function to the direct connection, wherein the state of the first wireless communication device and the state of the second wireless communication device are the fourth state representing lack of a function of the direct connection, and wherein the control unit causes the first wireless communication device and the second wireless communication device to establish a connection with the same access point.

(14) The communication device according to (1) to (13), wherein the control unit controls processing for starting a service between the first wireless communication device and the second wireless communication device after a connection is established between the first wireless communication device and the second wireless communication device via the wireless communication.

(15) The communication device according to (14), wherein the obtaining unit obtains information used for starting the service via near-field communication, and wherein the control unit controls the processing for starting the service on the basis of the information used for starting the service.

(16) The communication device according to (15),
wherein the information used for starting the service is obtained via near-field communication when the at least one of the first state information and the second state information is obtained via near-field communication.

(17) The communication device according to any one of (3) to (12),
wherein the obtaining unit further obtains first constraint information representing a constraint on the first wireless communication device regarding the direct connection, and second constraint information representing a constraint on the second wireless communication device regarding the direct connection, and
wherein at least one of a combination of the first state information and the first constraint information and a combination of the second state information and the second constraint information is obtained via near-field communication.

(18) The communication device according to (17),
wherein the first constraint information includes at least one of information representing that the first wireless communication device is capable of being in the first state in the group of wireless communication devices formed by the direct connection, and in the second state in a different group of wireless communication devices formed by the direct connection, information representing that a further wireless communication device is capable of being added to the group of wireless communication devices formed by the direct connection when the state of the first wireless communication device is the first state in the group, information representing whether or not the first wireless communication device is capable of operating as a terminal equivalent to an access point, and information representing whether or not the first wireless communication device is capable of establishing a connection between another wireless communication device and an access point.

(19) The communication device according to any one of (1) to (18),
wherein one of the first wireless communication device and the second wireless communication device is the communication device, and
wherein the second state information is obtained via near-field communication when the first wireless communication device is the communication device, and the first state information is obtained via near-field communication when the second wireless communication device is the communication device.

(20) The communication device according to any one of (1) to (10) and (12) to (18),
wherein the first state information and the second state information are both obtained via near-field communication.

(21) The communication device according to (20),
wherein the first wireless communication device and the second wireless communication device do not have a function to the direction connection,
wherein the communication device further includes a wireless communication unit for performing wireless communication, and
wherein the control unit establishes a connection between the first wireless communication device and the communication device, and a connection between the second wireless communication device and the communication device, and causes the wireless communication unit to transfer data from one of the first wireless communication device and the second wireless communication device to the other wireless communication device.

(22) The communication device according to any one of (1) to (21),
wherein the wireless communication is wireless local area network (LAN) communication, and
wherein the direct connection is compliant with a Wi-Fi Direct standard.

(23) A communication control method including:
obtaining first state information representing a state of a first wireless communication device regarding a direct connection between devices via wireless communication and second state information representing a state of a second wireless communication device regarding the direct connection; and
establishing a connection between the first wireless communication device and the second wireless communication device via the wireless communication on the basis of the first state information and the second state information,
wherein at least one of the first state information and the second state information is obtained via near-field communication.

(24) A program for causing a computer to function as:
an obtaining unit configured to obtain first state information representing a state of a first wireless communication device regarding a direct connection between devices via wireless communication and second state information representing a state of a second wireless communication device regarding the direct connection; and
a control unit configured to establish a connection between the first wireless communication device and the second wireless communication device via the wireless communication on the basis of the first state information and the second state information,
wherein at least one of the first state information and the second state information is obtained via near-field communication.

REFERENCE SIGNS LIST

100 wireless communication device
110 wireless antenna
120 NFC antenna
130 wireless LAN interface
140 NFC interface
150 memory
160 control unit

The invention claimed is:
1. A first communication apparatus, comprising:
a near field communication device configured to share at least a communication channel for wireless communication with a second communication apparatus; and
a wireless communication device configured to communicate by wireless communication through the communication channel with the second communication apparatus to form a group between the first communication apparatus and the second communication apparatus,
wherein the first communication apparatus is configured to determine whether or not to form a group of communication apparatuses based on a state of the first communication apparatus and a state of the second communication apparatus, and the first communication apparatus is configured to determine whether or not to change the state of the first communication apparatus or the second communication apparatus based on the state of the first communication apparatus and the state of the second communication apparatus.

2. The first communication apparatus according to claim 1, wherein said near field communication device is further configured to send a first role indication of the first communication apparatus to the second communication apparatus.

3. The first communication apparatus according to claim 2, further comprising a memory unit, wherein the first role indication is obtained from said memory unit.

4. The first communication apparatus according to claim 3, wherein said near field communication device is further configured to receive a second role indication of the second communication apparatus from the second communication apparatus.

5. The first communication apparatus according to claim 4, wherein said near field communication device is further configured to receive address information of the second communication apparatus from the second communication apparatus.

6. The first communication apparatus according to claim 5, wherein when the first role indication indicates P2P device and the second role indication indicates P2P device, said control unit is further configured to send a negotiation request to the second communication apparatus with said wireless communication device, using the address information, for negotiation about which apparatus operates as GO in the group.

7. The first communication apparatus according to claim 5, wherein when the first role indication indicates P2P device and the second role indication indicates GO, said control unit is further configured to send an invitation request to the second communication apparatus with said wireless communication device, using the address information, for joining a group of the second communication apparatus.

8. The first communication apparatus according to claim 1, wherein said near field communication device is further configured to share password information for authentication between the first communication apparatus and the second communication apparatus.

9. A first wireless communication device, comprising:
a host controller interface configured connect to a host controller, the host controller further connecting to a near field communication device for sharing at least a communication channel for wireless communication with a second wireless communication device; and
an antenna interface configured to communicate by wireless communication through the communication channel with the second wireless communication device to form a group between the first communication device and the second communication device,
wherein the first wireless communication device is configured to determine whether or not to form a group of wireless communication devices based on a state of the first wireless communication device and a state of the second wireless communication device, and the first wireless communication device is configured to determine whether or not to change the state of the first wireless communication device or the second wireless communication device based on the state of the first wireless communication device and the state of the second wireless communication device.

10. The first wireless communication device according to claim 9, wherein said near field communication device is further configured to send a first role indication of the first wireless communication device to the second wireless communication device.

11. The first wireless communication device according to claim 10, further comprising a memory unit, wherein the first role indication is obtained from said memory unit.

12. The first wireless communication device according to claim 11, wherein said near field communication device is further configured to receive a second role indication of the second wireless communication device from the second wireless communication device.

13. The first wireless communication device according to claim 12, wherein said near field communication device is further configured to receive address information of the second wireless communication device from the second wireless communication device.

14. The first wireless communication device according to claim 13, wherein when the first role indication indicates P2P device and the second role indication indicates P2P device, said control unit is further configured to send a negotiation request to the second wireless communication device with said antenna interface, using the address information, for negotiation about which apparatus operates as GO in the group.

15. The first wireless communication device according to claim 13, wherein when the first role indication indicates P2P device and the second role indication indicates GO, said control unit is further configured to send an invitation request to the second wireless communication device with said antenna interface, using the address information, for joining a group of the second wireless communication device.

16. The first wireless communication device according to claim 9, wherein said near field communication device is further configured to share password information for authentication between the first wireless communication device and the second wireless communication device.

17. The first communication apparatus according to claim 1, wherein said near field communication device is different from said wireless communication device.

18. The first communication apparatus according to claim 1, wherein the state of the first communication apparatus is one of P2P Unconfigured, Group Owner, P2P Client, and Legacy Device.

19. The first wireless communication device according to claim 9, wherein the state of the first communication apparatus is one of P2P Unconfigured, Group Owner, P2P Client, and Legacy Device.

* * * * *